(12) United States Patent
Kennedy

(10) Patent No.: US 8,893,711 B2
(45) Date of Patent: Nov. 25, 2014

(54) HIGH TEMPERATURE SOLAR SELECTIVE COATINGS

(75) Inventor: Cheryl E. Kennedy, Lafayette, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 1223 days.

(21) Appl. No.: 12/745,319

(22) PCT Filed: Oct. 18, 2007

(86) PCT No.: PCT/US2007/081838
§ 371 (c)(1),
(2), (4) Date: Sep. 1, 2010

(87) PCT Pub. No.: WO2009/051595
PCT Pub. Date: Apr. 23, 2009

(65) Prior Publication Data
US 2010/0313875 A1    Dec. 16, 2010

(51) Int. Cl.
*F24J 2/50* (2006.01)
*F24J 2/48* (2006.01)
*F24J 2/05* (2006.01)
*F24J 2/46* (2006.01)
*G02B 5/28* (2006.01)

(52) U.S. Cl.
CPC *F24J 2/485* (2013.01); *Y02E 10/44* (2013.01); *G02B 5/281* (2013.01); *F24J 2/055* (2013.01); *F24J 2/4652* (2013.01)
USPC ........... 126/652; 126/651; 126/714; 427/162; 427/597; 204/194.28

(58) Field of Classification Search
USPC .................. 126/652, 651, 714; 427/162, 597; 204/194.28
See application file for complete search history.

(56) References Cited

U.S. PATENT DOCUMENTS 4,098,956 A    7/1978  Blickensderfer et al.

4,252,865 A  *  2/1981  Gilbert et al. ................ 428/611

(Continued)

FOREIGN PATENT DOCUMENTS

| CN | 2004010097125 | 12/2004 |
|---|---|---|
| JP | 2004266023 | 9/2004 |
| WO | 2005121389 | 12/2005 |

OTHER PUBLICATIONS

G.L. Harding, Sputtered metal carbide solar-selective absorbing surfaces, J. Vac. Sci. Technol., 13, No. 5, 1070 (1976).

(Continued)

*Primary Examiner* — Avinash Savani
(74) *Attorney, Agent, or Firm* — John C. Stolpa; Michael A. McIntyre

(57) ABSTRACT

Improved solar collectors (40) comprising glass tubing (42) attached to bellows (44) by airtight seals (56) enclose solar absorber tubes (50) inside an annular evacuated space (54. The exterior surfaces of the solar absorber tubes (50) are coated with improved solar selective coatings {48} which provide higher absorbance, lower emittance and resistance to atmospheric oxidation at elevated temperatures. The coatings are multilayered structures comprising solar absorbent layers (26) applied to the meta surface of the absorber tubes (50), typically stainless steel, topped with antireflective Savers (28) comprising at least two layers 30, 32) of refractory metal or metalloid oxides (such as titania and silica) with substantially differing indices of refraction in adjacent layers. Optionally, at least one layer of a noble metal such as platinum can be included between some of the layers. The absorbent layers cars include cermet materials comprising particles of metal compounds is a matrix, which can contain oxides of refractory metals or metalloids such as silicon. Reflective layers within the coating layers can comprise refractory metal silicides and related compounds characterized by the formulas TiSi. $Ti_3SiC_2$, TiAlSi, TiAN and similar compounds for Zr and Hf. The titania can be characterized by the formulas $TiO_2$, $Ti_3O_5$. TiOx or $TiO_xN_{1-x}$ with x 0 to 1. The silica can be at least one of $SiO_2$, $SiO_{2x}$ or $SiO_{2x}N_{1-x}$ with x=0 to 1.

20 Claims, 23 Drawing Sheets

(56) References Cited

U.S. PATENT DOCUMENTS

| | | | |
|---|---|---|---|
| 4,312,915 A | 1/1982 | Fan | |
| 4,321,300 A | 3/1982 | Farrauto et al. | |
| 4,333,448 A | 6/1982 | Johnson | |
| 4,334,523 A * | 6/1982 | Spanoudis | 126/652 |
| 4,416,916 A | 11/1983 | Aykan et al. | |
| 4,429,005 A * | 1/1984 | Penn | 428/350 |
| 4,437,455 A | 3/1984 | Jefferson | |
| 4,582,764 A | 4/1986 | Allerd | |
| 4,594,995 A | 6/1986 | Garrison | |
| 5,214,530 A * | 5/1993 | Coombs et al. | 359/359 |
| 5,449,413 A * | 9/1995 | Beauchamp et al. | 136/257 |
| 5,523,132 A | 6/1996 | Zhang et al. | |
| 5,670,248 A | 9/1997 | Lazarov et al. | |
| 5,723,207 A | 3/1998 | Lettington et al. | |
| 5,776,556 A | 7/1998 | Lazarov et al. | |
| 5,912,045 A | 6/1999 | Eisenhammer et al. | |
| 5,980,977 A | 11/1999 | Deng et al. | |
| 6,060,154 A | 5/2000 | Adachi et al. | |
| 6,650,478 B1 * | 11/2003 | DeBusk et al. | 359/585 |
| 2004/0126594 A1 | 7/2004 | Rubbia et al. | |
| 2005/0189525 A1 * | 9/2005 | Kuckelkorn et al. | 252/582 |
| 2007/0231501 A1 * | 10/2007 | Finley | 427/531 |

OTHER PUBLICATIONS

Cankurtaran, et al., "Ultrasonic study of the temperature and pressure dependencies of the elastic properties of ceramic dimolybdenum carbide (α-Mo2C)", Journal of Materials Science, 2004, vol. 39, No. 4, pp. 1241-1248.

A.M.D. Sacks, C-A. Wang, A. Yang, and A. Jain, Carbothermal reduction synthesis of nanocrystalline zirconium carbide and hafnium carbide powders using solution-derived precursors, J. Mat. Sci, 39, 6057-6066 (2004).

A. Sayir, Carbon fiber reinforced hafnium carbide composite, J. Mat. Sci., 39, 5995-6003 (2004).

D.M.Mattox and R.R. Sowell, A Survey of Selective Absorbers and Their Limitations, Journal de Physique, C1, N1, 42, 19-32 (1981).

S. Santucci, A.R. Phani, M. DeBiase, R. Alfonsetti, G. Moccia, A. Terracciano, and M. Missori, Thickness dependence of C-54 TiSi2 phase formation in TiN/Ti/Si(100) thin film structures annealed in nitrogen ambient, J. Appl. Phys., 86, 8, 4304-4311 (1999).

M. Gasch, D. Ellerby, E. Irby, S. Beckman, M. Gusman and S. Johnson, Processing, properties and arc jet oxidation of hafnium diboride/silicon carbide ultra high temperature ceramics, J. mat. Sci., 39, 5925-5937 (2004).

P. Hvizdos, J. Dusza, W. Steinkellner and K. Kromp, Creep behavior of MoSi2 and MoSi2 + SiC composite, J. Mat. Sci., 39, 4073-4077 (2004).

K. Ito, M. Moriwaki, T. Nakamoto, H. Inui, and M. Yamaguchi, Plastic deformation of single crystals of transition metal disilicides, Mat. Sci. Eng., A233, 33-43 (1997).

C. Schroedter, Evaporation Monitoring System Featuring Software Trigger Points and on Line Evaluation of Refractive Indices, SPIE, 652, 15-20 (1986).

P.M. Martin, J.W. Johnston, and W.D. Bennet, Multilayer coatings and optical materials for tuned infrared emittance and thermal coating, Mat. Res. Soc. Symp Proc., 555, 3-12 (1999).

A.E.B. Presland, G.L. Price, and D.L. Trimm, Hillock Formation by Surface Diffusion on Thin Silver Films, Surf. Sci., 29, 424-434 (1972).

A.E.B. Presland, G.L. Price, and D.L. Trimm, the role of microstructure and surface energy in hole growth and island formation in thin silver films, Surf. Sci., 29, 435-446 (1972).

Eisenhammer, Quasicrystal films: numerical optimization as a solar selective absorber, Thin Solid Films, 270, No. 1, (1995).

Haugender, et al., Oxidation of quasicrstalline and crystalline AlCuFe thin films in air, This Solid Films, 307, No. 120, (1997).

Eisenhammer, et al., Preparation and properties of solar selective absorbers based on AlCeFE and AlCuFeCr thin films: industrial aspects, Mat. Res. Soc. Symp. Proc., 553, No. 435 (1999).

Gibbons, et al Chapter 12: Toward industrial applications, Physical Properties of Quasicrystals, Springer Series in Solid State Sciences, NY, p. 403 (1999).

R.E. Hahn and B.O. Seraphin, Sputtered metal carbide solar-selective absorbing surfaces, J. Vac. Sci. Technol., 12, 905 (1975).

International Search Report for International (PCT) Application No. PCT/US07/81838, dated Oct. 18, 2007.

Written Opinion for International (PCT) Application No. PCT/US07/81838, datedJune 30, 2008.

International Preliminary Report on Patentability for International (PCT) Application No. PCT/US07/81838, issued Apr. 20, 2010.

C.E. Kennedy, Progress in Development of High-Temperature Solar-Selective Coating, Proceedings of ISEC, 2005, Orlando, FL, (Aug. 6-12, 2005).

Q.C. Zhang and D.R. Mills, Very low-emittance solar selective surfaces using new film structures, J. Appl. Phys. 72 (7), pp. 3013-3021 (1992).

M. Farooq, A.A. Green, and M.G. Hutchins, Simplified Composite Multilayer Selective Solar Absorber Surfacees: A Comparison of V:Al2O3 and Ni:SiO2 Coatings, Towards a Renewable Future; Silver Jubilee Conference. Conference C73. Proceedings Solar Energy Society, Oxford, UK, pp. 297-300 (1999).

R. Blickensderfer, Metal Oxycarbonitride Solar Absorbers, Proc. DOE/DS7 Thermal power Systems Workshop on Selective absorber coatings, P. Call, SERI TP-31-061, Golden, CO, pp. 371-380 (1977).

R. Blickensderfer, D.K. Deardorff, and R.L. Lincoln, Technical Note: Spectral reflectance of TiNx and Zrnx films as selective solar absorbers, Solar Energy, 19, pp. 429-432 (1977).

H. Ihara, S. Ebiswa, and A. Itoh, Solar Selective Surface of Zirconium Carbide Film, Proc. 7th Inc. Vac. Cong. and 3rd Int. Conf. on Solid Surfaces, Electrotechnical Lab, Tanashi, Tokyo, Japan, pp. 1813-1816 (1977).

R. Wuhrer, W.Y. Yeung, M.R. Phillips, and G. McCredie, Study on d.c. magnetron sputter deposition of titanium aluminum nitride thin films: effect of aluminum content on coating, Thin Solid Films, 290-291, pp. 339-342 (1996).

G.B. Smith, P.D. Swift, and A. Bendavid, TiNx films with metallic behavior at high N/Ti ratios for better solar control windows, Applied Physics Letters, V 75, No. 5, pp. 630-632 (Aug. 3, 1999).

A. Schuler, V. Thommen, P. Reimann, P. Oelhafen, G. Francz, T. Zehnder, M. Duggelin, D. Mathys, and R. Guggenheim, Structural and optical properties of titanium aluminum nitride films (Ti1-xAlxN), J. Vac. Sci. Technol. A 19 (3) pp. 922-929 (May/Jun. 2001).

A. Morales and J.I. Ajona, Durability, performance and scalability of sol-gel front surface mirrors and selective absorbers, J. Phys. IV France 9, 3, p. 513-518 (1999).

P.M. Martin, Adhesion of Thin Films, Vacuum Technology & Coating, pp. 6-12 (Feb. 2004).

R. Pretorius, Prediction of silicide formation and stability using heats of formation, Thin Solid Films 290-291, pp. 477-484 (1996).

C.E. Kennedy, Advances in Concentrating Solar Power Collectors: Mirrors and Solar-Selective Coatings.

C.E. Kennedy, Progress Developing High-Temperature Solar-Selective Coatings, Proceedings of Es2007, Energy Sustainability 2007, Long Beach, CA, pp. 1-9 (Jun. 27-30, 2007).

C.E. Kennedy et al., Performance & Durability of Solar Reflectors & Solar Selective Coatings, Natl Ctr for Photovoltaics and Solar Program Review Mtg 2003.

C.E. Kennedy et al., Progress toward developing a durable high-temperature solar selective coating, 2006 SVC, 49th Annual Technical Conf. Proceedings (2005).

C.E. Kennedy et al., Advanced Absorber Materials powerpoint.

C.E. Kennedy, Developing a durable high-temperature solar selective coating, 17th Ascel, CSM (Apr. 28, 2006).

C.E. Kennedy, Advanced high-temperature solar selective coatings development, PhD proposal powerpoint (Jul. 12, 2005).

C.E. Kennedy et al., Development and testing of high-temperature solar selective coatings, 2004 DOE Solar Energy Technologies Program Review Meeting, NREL/CP-520-36581, Denver, CO (Oct. 25-25, 2004).

(56) References Cited

OTHER PUBLICATIONS

C.E. Kennedy, Review of Mid- to High-Temperature Solar Selective Absorber Materials, NREL/TP-250-31267.

C.E. Kennedy et al., Development and testing of high-temperature solar selective coatings powerpoint.

C.E. Kennedy, Progress to Develop an Advanced Solar-Selective Coating, 2008 14th Biennial CSP SolarPaces Symposium, Las Vegas, NV (Mar. 4-7, 2008).

C.E. Kennedy et al., Progress toward developing a durable high-temperature solar selective coating, 2006 SVC, Washington, DC (Apr. 24-27, 2006) powerpoint.

* cited by examiner

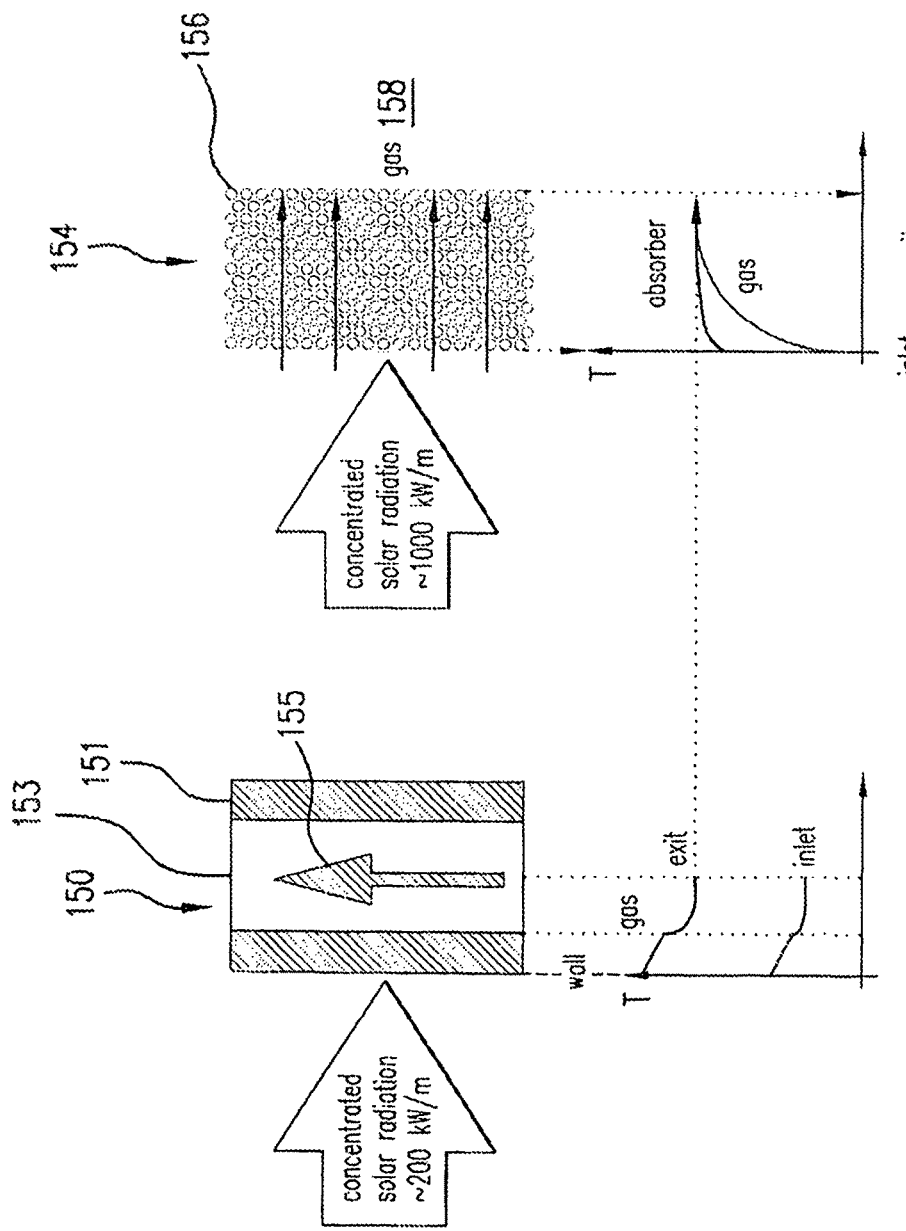

HIGH TEMPERATURE SOLAR SELECTIVE COATINGS

CONTRACTUAL ORIGIN

The United States Government has rights in this invention under Contract No. DE-AC36-99GO10337 between the United States Department of Energy and the National Renewable Energy Laboratory (NREL), a Division of the Midwest Research Institute.

TECHNICAL FIELD

Solar selective coatings containing multiple components to optimize the absorption of solar energy in the form of heat are disclosed. By applying such coatings to substrates such as the receiver tubes of solar collectors, solar energy can be absorbed at high operating temperatures and transferred to heat transfer fluids for the generation of steam or other purposes.

BACKGROUND

Trough solar systems use parabolic, single-axis tracking mirrors to concentrate sunlight 30-60 times onto an evacuated receiver tube, which runs the length of the trough at the focal line of the reflector, thus heating the heat-transfer fluid (i.e., synthetic oil) flowing through the receiver. Electricity is generated by passing the heated oil through a heat exchanger and using the steam generated to drive a commercial turbine generator. Collectors axe typically aligned on a north-south axis, and the trough tracks the sun from east to west during the day to maximize the sun's energy input to the receiver tube. Parabolic-trough solar technology has been demonstrated by nine utility-scale plants installed between 1984 and 1991 in California's Mojave Desert. These plants, referred to as Solar Electric Generating Systems (SEGS), represent 354 megawatts (MW) of installed electric-generating capacity that operate daily, providing power to the electricity grid. The SEGS experience has proven the parabolic-trough technology to be a robust and reliable power technology in an industrial-utility operating environment. Its key advantages are proven performance, manufacturing simplicity, use of standard equipment and materials, improvement in cost effectiveness via incremental steps, and low technical or financial risk to the investor.

Experience from the SEGS plants has shown that the reliability and lifetime of the parabolic-trough collector receiver tube or heat-collection element (HCE) is the most significant operating and maintenance issue for existing and future parabolic-trough plants. HCE designs presently use an evacuated receiver fabricated from stainless-steel tubing with a cermet coating (cermets are highly absorbing metal-dielectric composites containing fine metal particles in a dielectric or ceramic matrix), a Pyrex® glass envelope externally and internally coated with an antireflective (AR) coating, and conventional glass-to-metal seals. For perspective, each receiver tube is usually about 4 m (13.1 ft) long and 70 mm (2.25 in) in diameter.

The overall solar-to-electric efficiencies of parabolic-trough solar power plants can be improved and the cost of solar electricity could be reduced by improving the properties of the selective coating on the receiver and increasing the solar-field operating temperature to above 400° C. New, more-efficient selective coatings will be needed that have both high solar absorptance and low thermal emittance at such elevated temperatures. Although the present coatings are designed to be used in evacuated environments, the coatings need to be stable in air at elevated temperatures in case the vacuum is breached. Current coatings do not have the stability and performance desired for moving to higher operating temperatures. For efficient photothermal conversion, solar absorber surfaces must have low reflectance ($\rho=0$) at wavelengths $\lambda \leq 2$ μm and a high reflectance ($\rho \approx 1$) at $\lambda \geq 2$ μm. The reflectance cutoff may be higher or lower, depending on the operating temperature. For parabolic-trough applications, an improved spectrally selective surface should be thermally stable above 450° C., ideally in air, and have a solar absorptance ($\alpha$) greater than about 0.96 plus a thermal emittance ($\epsilon$) below about 0.07 at 400° C. Achieving the improved properties is very important if the parabolic trough systems are going to be operable at higher temperatures.

At this point, none of the existing prior art coatings used commercially have proven to be stable in air at 400° C. Designing and fabricating a solar-selective coating that is stable in air at temperatures greater than 450° C. requires high thermal and structural stabilities for both the combined and individual layers, excellent adhesion between the substrate and adjacent layers, suitable texture to drive the nucleation and subsequent growth of layers with desired morphology, enhanced resistance to thermal and mechanical stresses, and acceptable thermal and electrical conductivities. Other desirable properties of good continuity and conformability over the tube, as well as compatibility with fabrication techniques. The material should have a low diffusion coefficient at high temperature and be stable with respect to chemical interactions with any oxidation products, including any secondary phases present, over long periods of time at elevated temperatures. Selecting materials with elevated melting points and large negative free energies of formation may meet these objectives. Stable nanocrystalline or amorphous materials are the most desirable (and practical) for diffusion-barrier applications, especially in light of material and process limitations. However, there will likely be trade-offs in the microstructure between a highly oxidation-resistant coating (i.e., amorphous or nanocrystalline) and a solar-selective coating with both high absorption (i.e., columnar or porous microstructure) and low emittance (i.e., smooth or highly dense). High thermal stability is manifested by high melting points, single-compound formation, and lack of phase transformations at elevated temperature.

Solar-selective "absorber" coatings can be categorized into six distinct types (as shown in FIGS. 2A through 2F below): 2A) intrinsic, 2D) semiconductor-metal tandems, 2C) multi-layer absorbers, 2D) multi-dielectric composite coatings, 2E) textured surfaces, and 2F) selectively solar-transmitting coating on a black body-like absorber. Reviews of the literature revealed selected properties of some materials in these categories. Intrinsic absorbers use a material having intrinsic properties that result in the desired spectral selectivity and include: metallic W, $MoO_3$-doped Mo, Si doped with B, $CaF_2$, HfC, $ZrB_2$, $SnO_2$, $In_2O_3$, $Eu_2O_3$, $ReO_3$, $V_2O_5$, and $LaB_6$. Semiconductor-metal tandems absorb short-wavelength radiation because of the semiconductor band gap and have low thermal emittance as a result of the metal layer. Semiconductors of interest include Si (1.1 eV), Ge (0.7 eV), and PbS (0.4 eV). Multilayer absorbers use multiple reflections between layers to absorb light and can be tailored to be efficient selective absorbers. Metal-dielectric composites—called cermets—contain fine metal particles in a dielectric or ceramic host material. Textured surfaces can produce high solar absorptance by multiple reflections among needle-like, dendritic, or porous microstructures. Additionally, selectively solar-transmitting coatings on a black body-like absorber are also used, but are typically used in low-temperature applications.

Multilayer absorbers or multilayer interference stacks can be designed so that they become efficient selective absorbers (see FIG. 3). The selective effect arises because the multiple reflectance passes through the bottom dielectric layer (E) and is independent of the selectivity of the dielectric. A thin semitransparent reflective layer (D), typically a metal, separates two quarter-wave dielectric layers (C) and (E). The bottom-reflecting layer (D) has high reflectance in the infrared (IR) region and is slightly less reflective in the visible region. The top dielectric layer (C) reduces the visible reflectance. The thickness of this dielectric determines the shape and position of the reflectance curve. An additional semitransparent (i.e., thin) metal layer (B) further reduces the reflectance in the visible region, and an additional dielectric layer (A) increases the absorption in the visible region and broadens the region of high absorption. The basic physics of the multilayer absorber is well understood by those skilled in the art, and computer modeling can easily compute the optical properties given by an optimum multilayer design of candidate materials. Multilayer interference, stacks provide high solar absorption and low thermal emittance, and can be stable at elevated temperatures (up to about 400° C.), depending upon the materials used. Several multilayer absorbers using different metals (e.g., Mo, Ag, Cu, Ni) and dielectric layers (e.g., $Al_2O_3$, $SiO_2$, $CeO_2$, ZnS) are known for high-temperature applications.

Metal-dielectric composite coatings or absorber-reflector tandems have a highly absorbing coating in the solar region (i.e., black) that is transparent in the IR, deposited onto a highly IR-reflective metal substrate (FIGS. 4A through 4C below). The highly absorbing metal-dielectric composite, or cermet, contains fine metal particles in a dielectric or ceramic matrix, or a porous oxide impregnated with metal. These films are transparent in the thermal IR region, while they are strongly absorbing in the solar region because of interband transitions in the metal and the small particle resonance. When deposited on a highly reflective mirror, the tandem forms a selective surface with high solar absorptance and low thermal emittance. The high absorptance may be intrinsic, geometrically enhanced, or both. The absorbing cermet layer comprising inherently high-temperature materials can have either a uniform or graded metal content. The metal-dielectric concept offers a high degree of flexibility, and the solar selectivity can be optimized by proper choice of constituents, coating thickness, particle concentration, size, shape, and orientation. The solar absorptance can be boosted by suitable choices of substrates and AR layers, which can also provide protection (for example, from thermal oxidative degradation). A variety of techniques, such as electroplating, anodization, inorganic pigmentation of anodized aluminum, chemical vapor deposition (CVD), and co-deposition of metal and insulator materials by physical vapor deposition (PVD), can produce the composite coatings. A subclass of this category is a powdered semiconductor-reflector combination, where the solar-selective properties of semiconductor, inorganic metal oxides, organic black pigments, and metal-dust-pigmented selective paints can be considered. FIG. 4A shows a metal substrate with attached columns or rods of metal which are encased in a dielectric matrix.

In a graded cermet (FIG. 4B), the reflectance from the cermet is reduced by gradually increasing the metal volume fraction, hence the refractive index of the material, from top to bottom, as a function of depth from the surface to the base of the film. PVD or CVD techniques can be used to form most graded cermets. By controlling the PVD deposition parameters, the microstructure of the oxides can be deposited with a porous to columnar microstructure, and by codeposition the inclusions or pores can be tilled with metal by evaporation of sputtering.

A double-cermet film structure has been developed through fundamental analysis and computer modeling that has higher photothermal conversion efficiency than surfaces using a homogeneous cermet layer or a graded film structure. Solar radiation is effectively absorbed internally and by phase interference in double-cermet solar coatings. Further, it is easier to deposit the double-cermet selective coating than graded-cermet layer selective surfaces. The typical double-cermet layer film structure shown in FIG. 5 from surface to substrate consists of the following: an AR layer that enhances solar absorption; an absorbing layer composed of two homogenous cermet layers, a low-metal-volume fraction (LMVF) cermet layer on a high-metal-volume fraction (HMVF) cermet layer; and a metallic infrared reflector layer to reduce substrate emittance. Similar to the double-cermet structure, 4-layer cermets, where the cermet compositional gradient metal volume fractions (VF) vary from about 0.5 to 0.8 have been made, modeled and prepared with good spectral selectivity.

Surface texturing is a common technique used to obtain spectral selectivity by the optical trapping of solar energy. Properly textured surfaces appear rough and absorb solar energy while appearing highly reflective and mirror-like to thermal energy. The emittance values can be adjusted (higher or lower) by modifying the microstructure (microcrystallites) of the coatings with ion-beam treatments. Even single-material surfaces can exhibit selective properties if they have the proper roughness, because the selective properties depend on the ratios of mean height deviations and the autocorrelation distance to the wavelength. Needle-like, dendrite, or porous microstructures on the same scale as the wavelength of the incident radiation exhibit both wavelength and directional selectivity. This geometrical selectivity is not very sensitive, however, to the severe environmental effects (i.e., oxidation, thermal shocks) that can have catastrophic influence on the lifetime of conventional multilayer selective coatings.

In the art of thin-film growth, it is well known that columnar microstructure will grow depending on the material itself and the deposition conditions-substrate temperature, deposition rate, vacuum pressure, and angle of incidence during deposition. It has been determined that evaporation at oblique angles drastically changed the film properties. FIG. 6 illustrates this phenomenon, showing a substrate upon which a film is being deposited by vapor deposition, where angle $\alpha$ is the flux arrival angle measured from the substrate normal and angle $\beta$ is the columnar microstructure inclination angle, also measured from the substrate normal. It has been found that the direction and magnitude of the magnetic properties wave are dependent upon the angle of incidence, specifically when the substrate was tilted through a 45° angle between the evaporation flux and a substrate of Permalloy™ (alloy containing approximately 79 percent nickel and 21 percent iron) on large (3 $in^2$ substrates and the deposition geometry, as shown in FIG. 6. Recently, glancing angle deposition (GLAD), illustrated in FIG. 7, employing oblique angle vapor flux deposition and substrate motion has been used to engineer thin film microstructures on a nanometer scale in three dimensions. However, rotating large substrates such as the large receiver tubes used in solar collectors around their lengths as in this technique is not feasible.

The columnar microstructure can be tailored with a wide range of control dependent on the material and deposition conditions by controlling the substrate relative to the impinging flux. The surface of the microstructure must be protected from damage caused by surface contact or abrasion. Selection of a material having a high intrinsic absorption coefficient can further optimize the absorptance. Dense arrays of tungsten whiskers have good selectivity, as do textured stainless-steel. Textured copper, aluminum, nickel, and chrome were reported by other sources not to have the necessary thermal stability in air. Metals that are reportedly stable in air at high temperatures (>600° C.) include molybdenum, rhodium, platinum, tungsten, hafnium carbide, and gold. The oxides of nickel and cobalt have been observed to be stable in air above 800° C. Amorphous silicon, germanium, and GaAs have been textured with hydrogen peroxide or by reactive ion or sputtering etching to produce highly absorbing selective surfaces.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One embodiment provides methods for manufacturing solar selective absorbing materials, including the following steps:

a) providing a substrate comprising an infrared reflecting metal;

b) applying to the substrate a layer of an infrared reflecting material;

c) applying to the IR reflecting material at least one layer of a solar absorbent material;

d) optionally, applying to the layer of solar absorbent material another layer of IR reflective material, followed by another layer of solar absorbent material, which step can be repeated, and e) applying at least one surface layer of solar antireflective material, to produce a coated substrate having overall high solar absorbance and low IR emittance at elevated temperatures.

In this exemplary method, the layers of solar absorbent material and IR reflective material can be applied by various suitable methods including at least one physical vapor deposition method, at least one chemical vapor deposition method, electron beam methods and various sputtering methods, which can be ion beam assisted.

The surface layer of antireflective material can include at least two adjacent thin layers of different oxides or other suitable compounds of refractory metals or metalloids such as silicon, the layers having substantially different indices of refraction. The refractory metals for this surface layer can be selected from the group consisting of Group IVA metals (titanium, zirconium and hafnium), Group VA metals (vanadium, niobium and tantalum) and Group VI metals (chromium, molybdenum and tungsten). The topmost layer of antireflective material is normally silica, and can be textured by suitable physical or chemical means to increase solar absorption and minimize surface reflections. In certain embodiments, the texturing can be performed by depositing antireflective material at an acute angle to the surface of the final layer, by physical bombardment, or by chemical etching.

The solar absorbent materials can comprise oxides, nitrides, oxynitrides, or other suitable compounds of the refractory metals above.

The IR reflective materials can comprise silicides, borides, carbides, and other suitable compounds of the refractory metals above. At least one IR reflective layer can also comprise at least one noble metal selected from the group consisting of platinum, palladium, rhodium, ruthenium, indium, gold, and osmium.

In some embodiments, at least one of the solar absorbent and IR reflective layers can be formed by depositing materials to form cermet materials which comprise particles of metals or metal compounds in a matrix of at least one oxide of a refractory metal or metalloid. The metal compounds in such cermets can comprise a titanium silicide, characterized by the formula $Ti_xSi_y$, where x=1, 3 or 5 and y=1 to 4. Two or more layers of such cermets can be deposited, with each having a different index of refraction and volume fraction of metal (or metal compound) to the oxide of refractory metal or metalloid acting as matrix material.

In the coatings comprising cermets, at least one layer of the IR reflective material can comprise at least one noble metal as listed above.

The substrates for the methods can be selected from various suitable IR reflective metals and metal compounds, and generally will comprise at least one type of stainless steel. The substrates can be planar, curved or tubular, and in the latter form, can be employed as solar absorber tubes for solar collector receivers.

Further embodiments comprise solar selective coated substrates prepared by all the methods encompassed in the descriptions above. Representative embodiments include:

Solar selective coated substrates comprising an infrared reflecting substrate, at least one layer of solar absorptive material and at least one layer of antireflective material, with the substrate comprising at least one stainless steel, a plurality of layers of solar absorptive material comprising at least one refractory metal oxide, nitride or oxynitride and a plurality of layers of IR reflective materials comprising at least one refractory metal silicide, boride or carbide, topped with at least one layer of solar antireflective material which comprises at least one layer comprising at least one refractory metal oxide and at least one layer comprising at least one metalloid oxide, altogether producing a solar selective coated substrate having high solar absorptance and low IR emittance at elevated temperatures.

The solar absorbent material can comprise at least one titania or silica. The IR reflective materials adjacent to the absorbent layers can comprise a titanium, zirconium or hafnium silicide, boride or carbide, or at least one ternary compound comprising titanium, oxygen and nitrogen. The titania can comprise at least one of $TiO_2$, $Ti_3O_3$, $TiO_x$ or $TiO_xN_{1-x}$, with x=0 to 1. The silica can comprise at least one of $SiO_2$, $SiO_{2x}$ or $SiO_{2x}N_{1-x}$, with x=0 to 1. The titanium silicide can comprise at least one of $Ti_3Si$, $Ti_5Si_3$, $Ti_5Si_4$, $TiSi$ or $TiSi_2$. At least one of the IR reflective layers can comprise a noble metal selected from the group consisting of platinum, palladium, rhodium, ruthenium, indium, gold and osmium.

Certain embodiments are resistant to atmospheric oxidation at temperatures above about 450 deg. C. The coated substrates can have at least two layers of solar absorptive material having low indices of refraction, at least one layer of solar absorptive material having a high index of refraction adjacent to at least one of the low refractive index layers and at least two layers of the IR reflective material adjacent to the layers of absorptive material.

The topmost layer of the antireflective material can be textured to increase solar absorption and minimize surface reflection, and can comprise at least one silica having a low index of refraction. Texturing can be accomplished by any suitable method, including the deposition of antireflective material at an acute angle to the surface of the final layer of the solar selective coating, bombardment of the surface or etching.

At least one of the layers of solar absorbent and IR reflective materials can have the form of a cermet, comprising particles of at least one refractory metal silicide or a suitable metal in a matrix of at least one refractory metal oxide or silica, with the refractory metals selected from those listed above. The refractory metal silicide can be a titanium silicide, as characterized above. Suitable metals for the particles include the noble metals mentioned above. At least two layers of such cermets can be applied as at least one layer of solar absorptive material or IR reflective material, with each layer having a different index of refraction and volume fraction of metal to matrix material. In one embodiment, a layer of cermet closest to the substrate has a relatively low index of retraction and a relatively high, metal volume fraction, with at least one layer applied above that layer having a relatively high index of refraction and a relatively lower metal volume fraction. In embodiments comprising cermet layers, at least one layer of the IR reflective material can comprise a noble metal as described above.

An embodiment employing the solar selective coated substrates described above in solar energy applications comprises a collector receiver tube for a solar parabolic trough system, comprising a tubular glass envelope having connecting bellows at each end thereof secured by airtight seals and means for evacuating the envelope, the envelope concentrically enclosing a solar absorber tube therein, forming an annular space there between which can be evacuated, with the absorber tube being a solar selective coated substrate comprising stainless steel and at least one type of solar selective coating as described above. A related embodiment comprises a process of absorbing solar energy and healing a heat exchange fluid, comprising steps of passing a heat exchange fluid through at least one solar absorber tube as described above while the absorber tube, within a solar collector receiver tube, is exposed to sunlight.

The best mode currently envisioned is solar selective absorption materials comprising various layered combinations of metal infrared reflecting substrates, solar absorbent materials, IR reflective materials and solar antireflective (AR) materials selected and assembled to provide high solar absorption, low emittance and resistance to atmospheric oxidation at elevated temperatures. Suitable materials for preparing solar selective coatings include refractory metal silicides such as TiSi, refractory metal oxides such as $TiO_2$ (titania), silica, noble metals such as platinum and stainless steel substrates. Optimum results may be obtained by forming some of the layers from cermets, i.e., particles of refractory metal, silicides, other metal compounds or refractory or noble metals in matrices of suitable refractory metal oxides such as titania or metalloid oxides such as silica. As described below, a contemplated use is in tubular solar receiver tubes in solar collectors for commercial trough solar systems.

The selectively solar absorbent coatings applied to substrates in the various embodiments disclosed herein have many applications for the absorption of solar energy in the form of heat, which in turn can be transferred via a substrate to a heat transfer fluid for the generation of steam, heating of water or other fluids, and for many other industrial applications. Among present interests is the improvement of receiver tubes in commercial solar collectors to permit their operation at higher temperatures, facilitating the absorption of more solar energy per unit area of the receiver tubes and increasing the temperature of the heat transfer fluids used so as to produce steam at higher temperatures and pressures for the production of electrical power by turbines.

In addition to the exemplary aspects and embodiments described above, further aspects and embodiments will become apparent by reference to the drawings and by study of the following descriptions.

BRIEF DESCRIPTION OF DRAWINGS

Exemplary embodiments are illustrated in referenced figures of the drawings. It is intended that the embodiments and figures disclosed herein are to be considered illustrative rather than limiting.

FIG. 22 is a side view of a solar power tower tube receiver and graphs of temperature vs. locations within the receiver;

FIG. 23 is a side view of a solar power tower volumetric receiver and graphs of temperature vs. location within the receiver;

DETAILED DESCRIPTION

Figure 1:
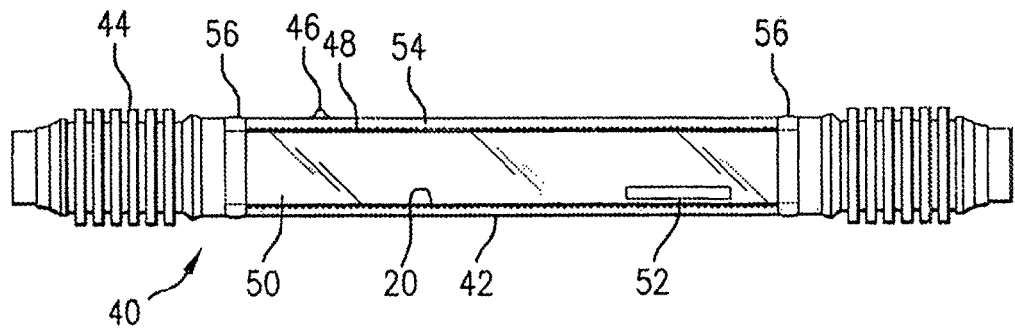
FIG. 1 is a side view of a conventional solar collector receiver tube for use in a parabolic-trough solar power plant.

Turning briefly to the drawings mentioned above as background, FIG. 1 shows a commercial solar collector 40 comprising a solar absorber tube 50 connected to bellows 44 at each end by glass-metal seals 56. The solar absorber tube 50 comprises a glass cylindrical tube 42 enclosing a solar absorber tube 50 mounted concentrically within tube 42, with a vacuum established in the annular space 54 between. Typically, the glass tube is made of Pyrex™ or similar high temperature glass, coated internally and externally with antireflective coatings (not visible or shown here). This space can be evacuated by suitable valves or other means 46. On the surface of the solar absorber tube 50 and within the evacuated space 54 between the outer tube 42 and the absorber tube 50 are mounted "getters" 52 near each end of collector 40 near bellows 44 to absorb any hydrogen present in this space and maintain the vacuum. The solar absorber 50 consists essentially of a coated substrate 20, typically stainless steel or other infrared-reflecting metal, with a solar selective coating 48 on the outer surface. Certain embodiments of solar selective coatings disclosed and claimed below can be used to enhance the performance of the solar absorbers and thus the solar collectors containing them.

Figure 2A:
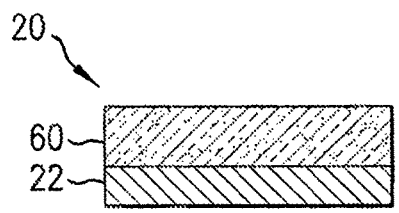
FIG. 2A is a sectional view of an intrinsic absorber solar coating.
Figure 2D:
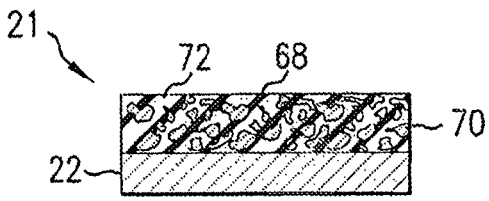
FIG. 2D is a sectional view of a metal-dielectric cermet solar absorbent coating.
Figure 2B:
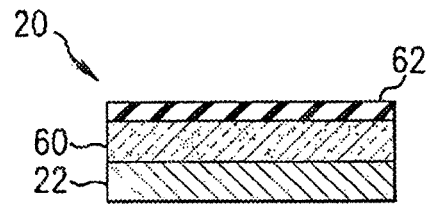
FIG. 2B is a sectional view of a semiconductor-metal solar coating.
Figure 2E:
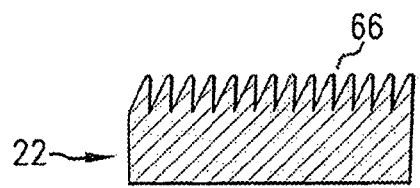
FIG. 2E is a sectional view of a metal solar absorbent coating with surface texturing.
Figure 2C:
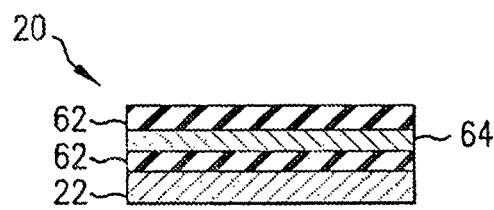
FIG. 2C is a sectional view of a multilayer solar absorbent coating.
Figure 2F:
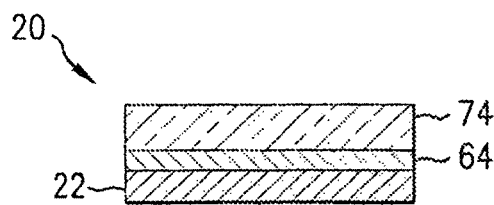
FIG. 2F is a sectional view of a solar-transmitting coating.

Existing solar selective or absorber coatings are illustrated in FIGS. 2A through 2F. FIG. 2A shows a coated substrate 20 comprising a substrate 22 of metal or other suitable material, with a single layer of material 60 which is intrinsically solar absorbent, which can include metals, doped metals, semiconductors, oxides and borides. FIG. 2B shows a coated substrate 20 described as a semiconductor-metal tandem, with a substrate 22 coated with an intrinsically absorbent material 60 as in FIG. 2A, typically a semiconductor, with a top AR layer 62, typically a dielectric with a low index, of refraction. Multilayer absorbers, as shown in FIG. 2C, can be coated substrates 20 comprising a substrate 22, multiple AR layers 62 of dielectric and a metal layer 64 in between these AR layers. FIG. 2D shows a coated substrate 21 having a metal substrate 22 topped with a layer of a cermet 68 containing particles 70 of at least one metal or metal compound in a matrix 72 of a dielectric such as alumina. FIG. 2E shows a metal substrate 22 which has been textured on the upper surface to provide projections 66 which can enhance the intrinsic absorbance of the metal and minimize reflectance. Similar texturing can be employed on various types of coatings applied to metal substrates (not shown here). FIG. 2F is a coated substrate 20 having a metal substrate 22 lopped by a thin layer 64 comprising a black body-like absorber such as a black enamel, and a top layer 74 of a selectively transmitting material such as a highly doped semiconductor.

Figure 3:
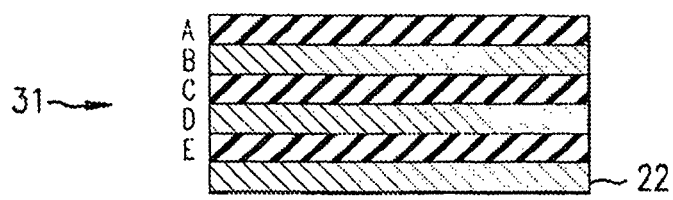
FIG. 3 is a sectional view of a multilayer metal-dielectric cermet solar absorbent coating.

FIG. 3 illustrates a multilayer absorber or multilayer interference stack 31 having a bottom dielectric layer E and an adjacent semi transparent reflective layer D comprising metal or other suitable materials. Layer D separates two quarter-wave dielectric layers, C and D. The bottom-reflecting layer D has a high reflectance in the IR region and is slightly less reflective in the visible region, while the lop dielectric layer C reduces the visible reflectance. Layer B, a semitransparent metal layer, further reduces reflectance in the visible region, while the top dielectric layer A increases the absorption in the visible region and broadens the region of high absorption. Such multilayer arrays can be applied to various substrates, including metal substrates as discussed in the above coated substrates and shown here as 22.

Figure 4A:
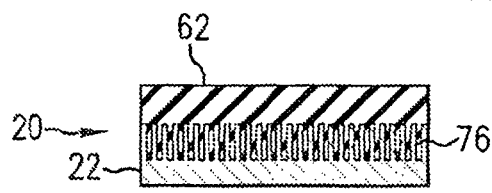
FIG. 4A is a sectional view of a metal-filled dielectric cermet coating on a metal substrate.

FIG. 4A illustrates a coated substrate 20 having a metal substrate 22 with protruding columns, pins or rods 76, having a top coating of a dielectric 62 which penetrates into the spaces between rods 76 and provides a top protective coating. This low cost method protects etched substrates of materials such as anodized aluminum or copper, and also traps incident light.

Figure 4B:
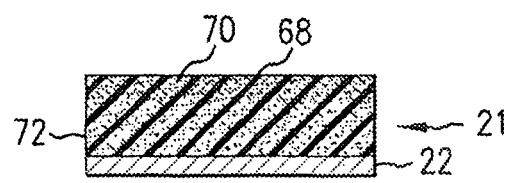
FIG. 4B is a sectional view of a graded metal-filled dielectric composite coating on a metal, substrate.

FIG. 4B illustrates a cermet coated substrate 21 having a metal substrate 22 covered with a layer of "graded" cermet 68 containing particles of metal 70 in a matrix 72, with the concentration or volume fraction of metal particles in the matrix decreasing from the bottom of the coating adjacent to substrate 22 to the upper surface.

Figure 5:
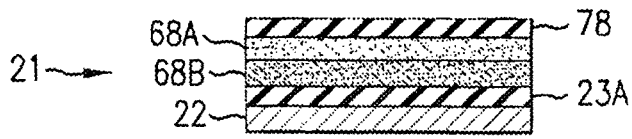
FIG. 5 is a sectional view of a dual layer cermet coating on a metal substrate, the cermet layers being topped with an antireflective layer.

FIG. 5 illustrates a "double cermet" coated substrate 21, built upon a metal substrate 22. Top layer 78 is an antireflective (AR) layer of a dielectric material such as silica. Below this are two homogeneous cermet layers 68A and 68B, which can have similar volume fractions of metal to matrix materials or different metal volume fractions, as shown here and described for the variable volume fractions of FIG. 4B. Metal substrate 22 serves as an infrared reflector layer to reduce substrate emittance. A separate metal layer 23A such as a noble metal can be provided between substrate 22 and the first layer of cermet 68B.

Figure 6:
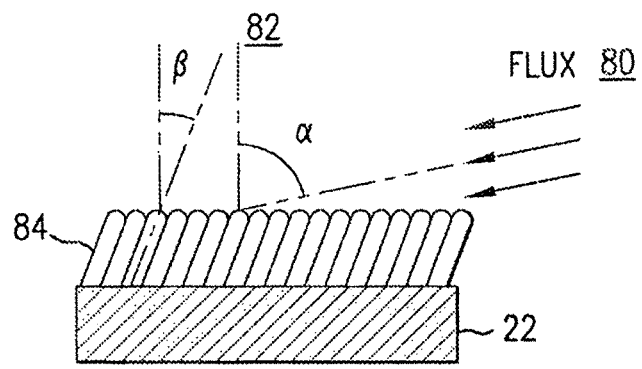
FIG. 6 is a schematic diagram illustrating the application of coatings to a substrate by employing an oblique incidence of vapor deposition.
Figure 7:
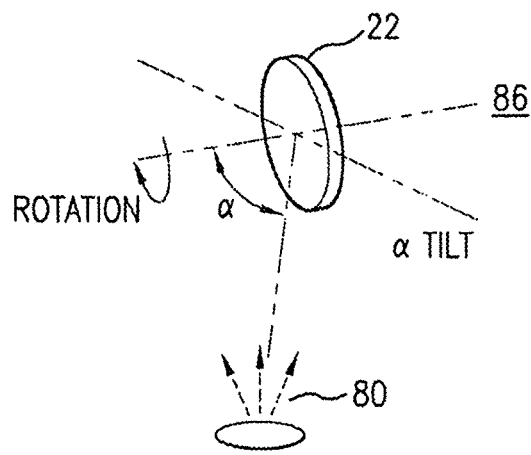
FIG. 7 is a schematic diagram illustrating the application of coatings to a substrate by vapor deposition using glancing angle deposition (GLAD)

FIG. 6 illustrates u process of applying a textured or columnar coating 84 on a metal substrate 22 by depositing the material via vapor deposition having a flux 80 directed at an oblique flux incidence angle α measured relative to the film normal line 82 perpendicular to the substrate 22 surface, producing a columnar film 84 oriented at an angle β, also measured relative to the normal line 82. The column inclination angle β falls between the film normal 82 and the vapor incidence angle α. The film 84 thus forms in columns, at an angle β to the substrate 22 which improves absorbance and reduces emittance. FIG. 7 illustrates a variation on the procedure of FIG. 6, known as glancing angle deposition (GLAD). Here, a substrate 22 is rotated about an axis 86 which is tilted at an oblique angle α relative to the flux 80 of material provided by vapor deposition. By controlling the angle of rotation, the rotation speed and the deposition rate, films with symmetrical and highly oblique flux distributions can be produced including, helical, "zig-zag," "staircase" and "post" microstructures.

It would be desirable to develop new, more efficient selective coatings which combine relatively high solar absorbance (greater than about 0.96) and relatively low thermal emittance (less than about 0.07) and are thermally stable above 500° C., ideally in air; such coatings will thus allow an increase in the solar fields operating temperatures from about 400° C. to over 450° C., leading to improved performance and reduced cost of solar parabolic troughs. Current coatings do not have the stability nor the performance desired for moving to the higher operating temperatures necessary to reduce the cost of parabolic trough solar power technology.

Cermets are highly absorbing metal-dielectric composites containing fine metal particles in a dielectric or ceramic matrix, or a porous oxide impregnated with metal. A double-cermet, film structure has been developed that reportedly has higher photothermal conversion efficiency than surfaces using a homogeneous cermet layer or a graded film structure. Optimization studies were done on 4-layer cermets with anti-reflection (AR) coatings, where the cermet compositional gradient metal volume fractions (VF) varied from 0.5 to 0.8. Independent of material, the 0.7 VF gave the best result, resulting in high absorption (α=0.97) and low emittance [ε (measured at 100° C.) of 0.13-0.05]. Similar to the double-cermet structure, this research has promise for concentrating solar power (CSP) applications, but more research is needed.

Combining several concepts, high temperature solar selective coatings could be developed from materials with intrinsic solar selectivity and high-temperature stability using multiple cermet layers along with the appropriate surface texturing and incorporating multiple anti-reflection (AR) coatings. The titanium, zirconium, or hafnium metal carbides, oxides, and nitrides materials have some of the highest melting points in nature, with HfC having the highest melting point at 3316° C. These materials also have high degrees of spectral selectivity, high hardness, improved wear, corrosion, and oxidation resistance. Solar-selective cermets made with $ZrO_2$ could be of high interest, as $ZrO_2$ has three phases depending on the temperature. The high-temperature tetragonal and cubic phases can be stabilized at room temperature by adding different concentrations of $Y_2O_3$, $Al_2O_3$, $CeO_2$, and other materials. Cermets made with $SiO_2$ and $TiO_2$ plus noble metals such as Au, Pt, and Pd have been found to be solar selective $ZrO_2$ and $TiO_2$ cermets are of interest because of their high indices of refraction and chemical, mechanical, and thermal stabilities. Titanium, nitride (TiN) and titanium aluminum nitride ($Ti_{1-x}Al_xN$), with x=0 to 1, exhibit high hardness, improved wear, corrosion, and oxidation resistance. $Ti_{1-x}Al_xN$ is oxidation resistant at high temperatures in air (750°-900° C.), whereas TIN oxidizes at 500° C. The normal emittance of TiN reportedly ranges from 0.40 to 0.14. Single-layer $Ti_{1-x}Al_xN$ films deposited by reactive magnetron sputtering on copper and aluminum reportedly achieved absorbance values (100° C.) of 0.80, but no emittance values were reported. Varying the aluminum and nitrogen content in these compounds changes the hardness, color, optical properties, composition, microstructure, and pore and grain size. The optical properties of the titanium, zirconium, or hafnium metal carbides, oxides, and nitrides have a high degree of flexibility, and with further research, multiple layer cermets with noble metals could be viable high-temperature absorbers for solar selective coatings.

Thermodynamically stable quasicrystal-forming alloys (i.e., AlCuFe, AlCuRu, and AlMnPd films) can be used as selective absorbers. Quasicrystals exhibit high thermal and chemical stability; reflectance from 300 nm to 20 µm is about 0.6 and is reportedly nearly independent of wavelength. Quasicrystals themselves show no selective properties, but thin (10-12 nm) film stacks on a highly reflective substrate or in a cermet reportedly show the desired properties. Theoretically, quasicrystals can be expected to achieve high solar absorptance (>0.9) and low thermal emittance (<0.05 at 400° C.) with high-temperature stability (500° C.). While more research is needed on quasicrystal thin films and cermets, these promising materials could also be suitable for solar selective coatings.

Solar-selective coatings made with multiple cermet layers of quasicrystals or zirconium, yttrium, hafnium, or titanium oxides, nitrides, and silicides that incorporate surface texturing and multiple AR layers are likely to be successful and meet optical and durability requirements for concentrating solar power (CSP). Potential coatings were modeled with specialized optical modeling software and the most promising selective coatings were identified for laboratory prototyping. Prototype samples are being manufactured on NREL's multi-chamber vacuum system, and a limited number of samples have been optically characterized to optimize the samples. A number of samples will also be selected for high-temperature durability testing.

Optical Modeling

As a first step, the modeling program Essential Macleod™ was used to optically model the potential high-temperature selective surfaces. A. Macleod, *Essential Macleod: Optical Coating Design Program*, 8.14.19, Tucson, Ariz.: Thin Film Center (2007). Essential Macleod was used to synthesize solar selective designs, refine existing ones, and extract optical constants of the steel substrate used in the design. The program allowed the identification and selection of the coating thicknesses and compositions required to deposit the most promising candidates.

Multilayer coatings were modeled because they were significantly easier to model than cermets, with the expectation of converting the best multilayer designs into cermets later. The material properties of candidate materials for the solar selective coating designs were reviewed, and are listed below in Table I. Materials with low thermal stability and high reactivity were culled, and coatings incorporating materials with more suitable properties were modeled. The original concept of a $ZrO_2$/Pt selective coating did not work as well as hoped and can be seen in FIG. 8, so other combinations of oxides and metals were modeled. Combinations including $HrO_2$, $Y_2O_3$, $ZrO_2$ with Pt, Ta, and W were modeled, as shown in FIG. 9 below. Some materials of interest (e.g., AlN, HfN, $Ta_2O_5$, TiB, TiC, $Ti_{1-x}Al_xN$, $Ti_xO_yN_z$, YN, ZrB, ZrC, ZrN, and quasicrystals) have not yet been modeled because optical constants have not yet been found. To model, these coatings, the dielectrics will need to be deposited, characterized, and the refractive indexes determined. Six metals were examined, and in order of reflectivity, Au, Ag, Ta, Mo, W, and Ir had the highest-reflectance in the near infrared (NIR) to IR, after eliminating metals with high mobility. These reflectance values were essentially uniform from about 2500 nm to 20,000 nm, with Ta the highest at 0.98 and Ag lowest at 0.945. Incorporating these metals and compounds into cermets would likely improve the absorption properties.

Figure 10:
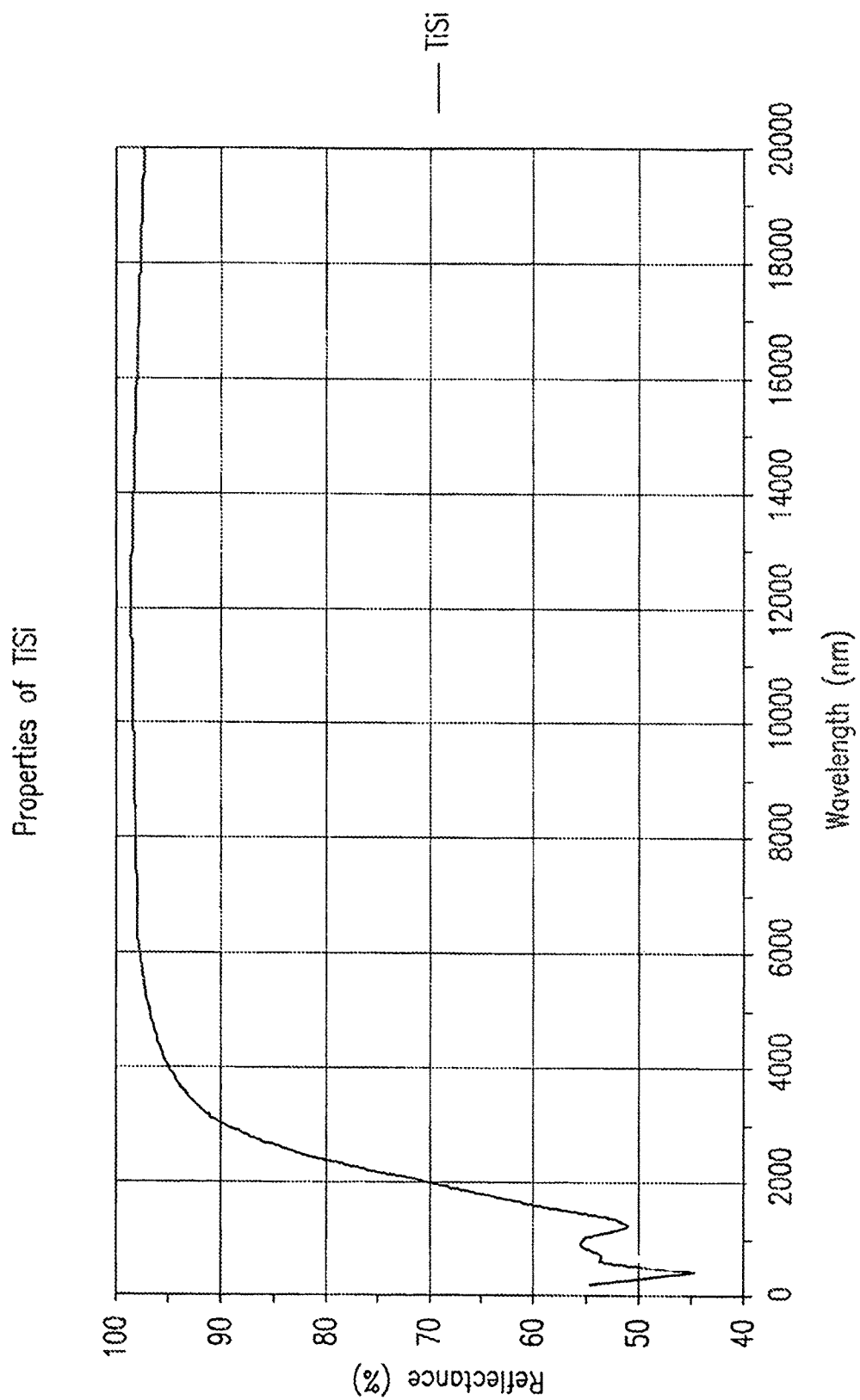
FIG. 10 is a graph of percent reflectance vs. wavelength for a TiSi coating.
Figure 11:
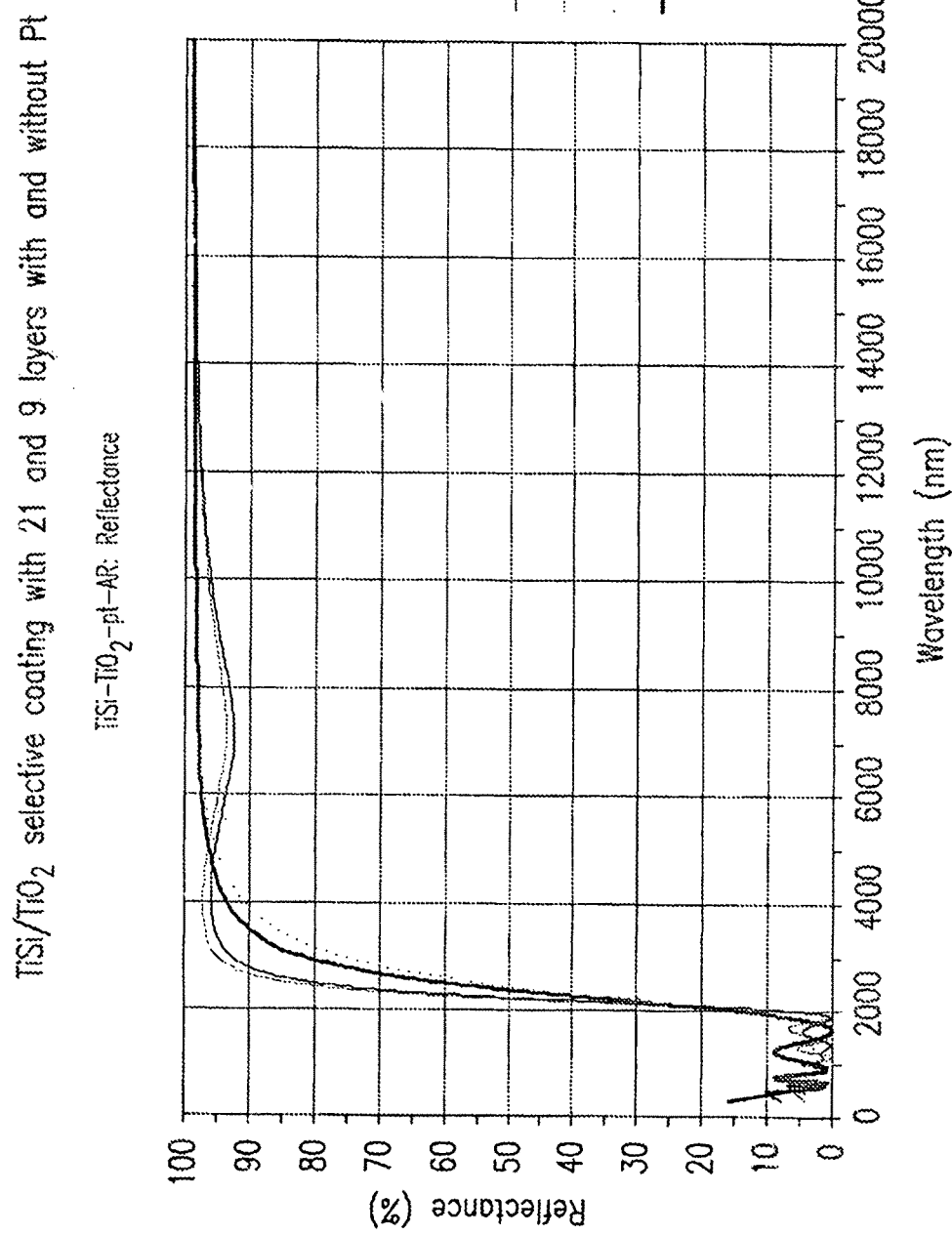
FIG. 11 is a graph of percent reflectance vs. wavelength for several versions of modeled TiSi/titania solar selective coatings, with and without platinum layers, with 21 or 9 layers.

A low-emittance, high-temperature material (TiSi) was found that, when modeled, gave solar selective coatings with excellent emittance. The reflectance properties of TiSi are shown in FIG. 10.

Figure 8:
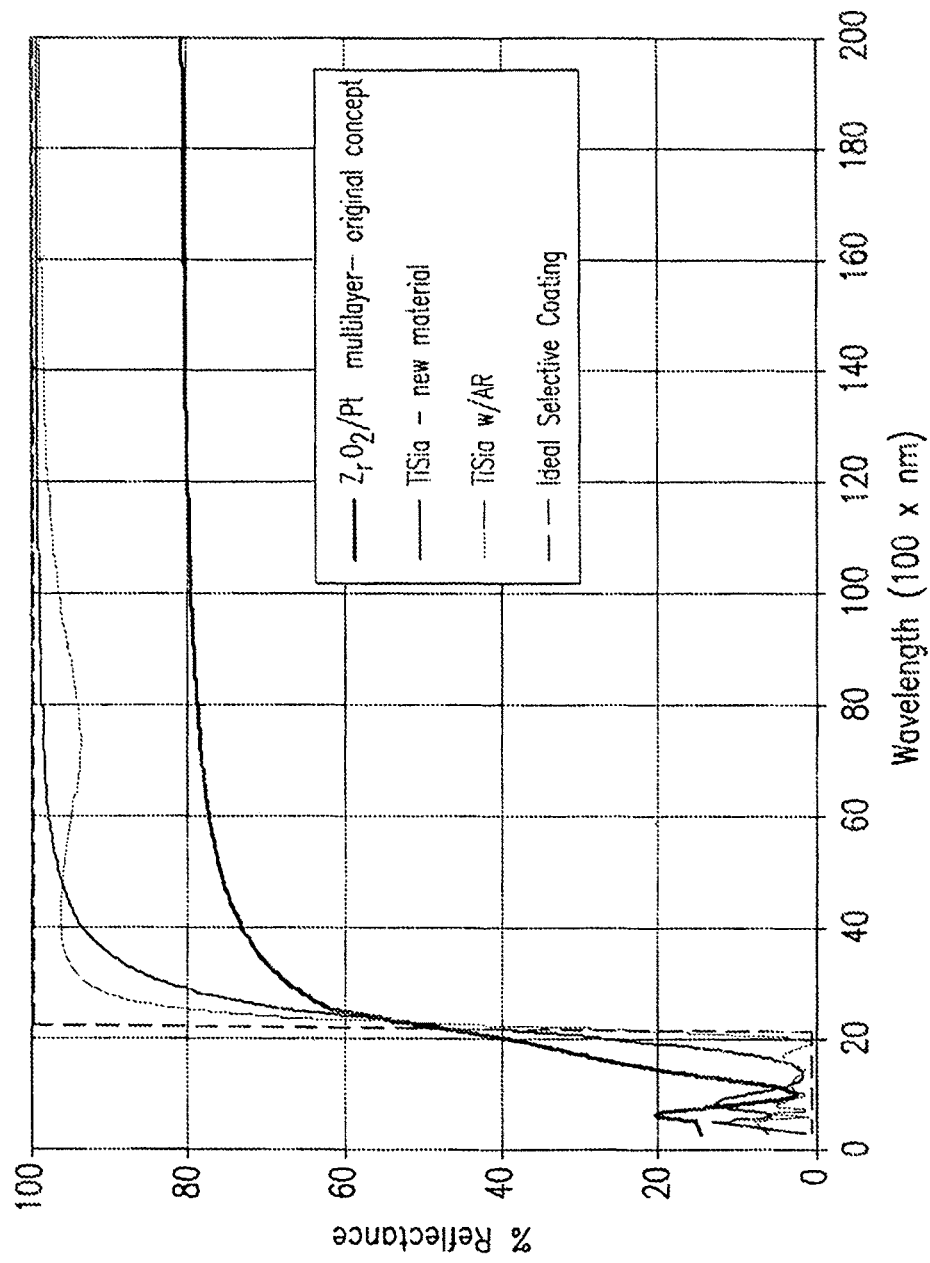
FIG. 8 is a graph of percent reflectance vs. wavelength for initial modeling of the solar selective coating concept and an ideal solar selective coat.
Figure 9:
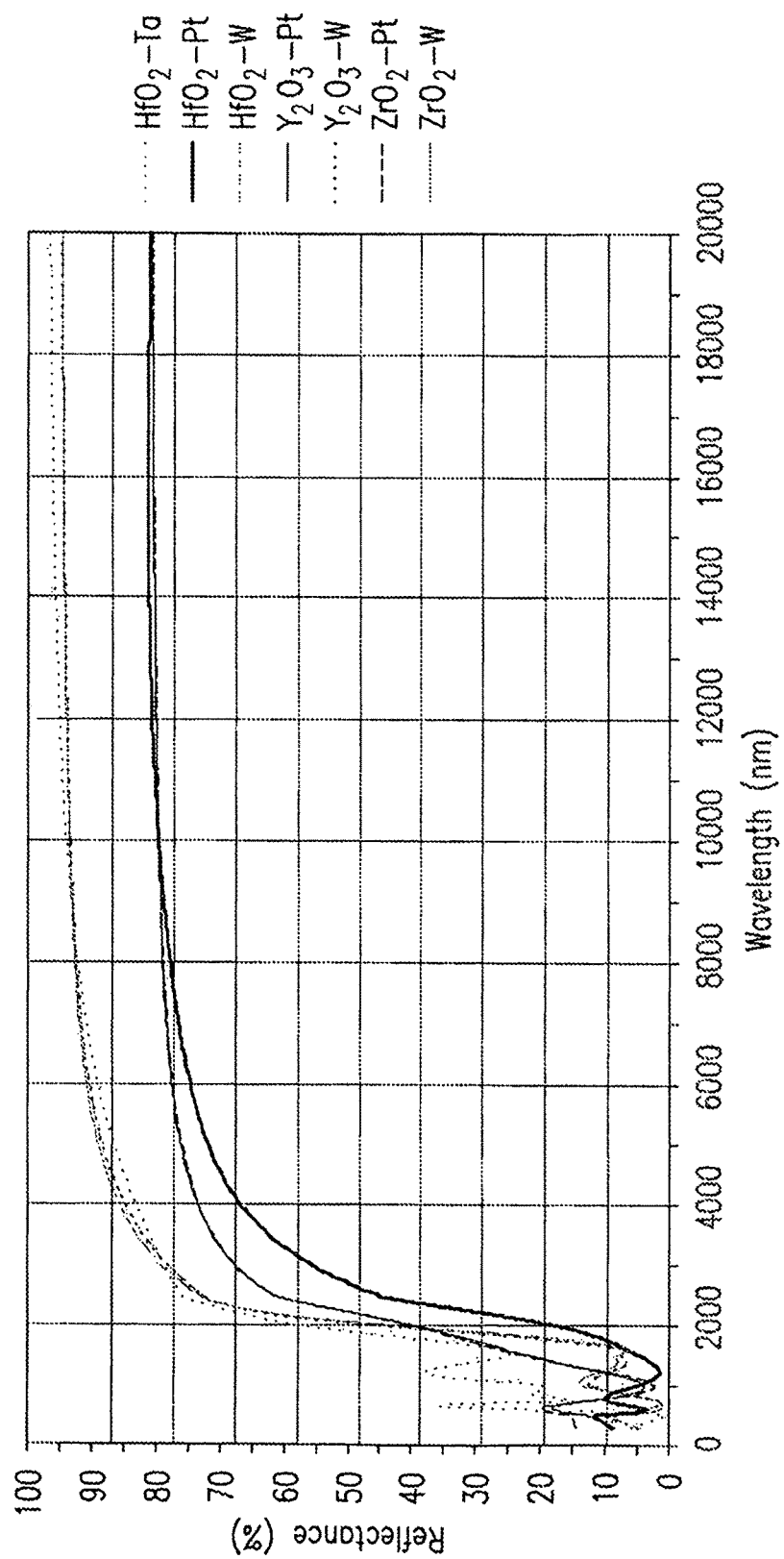
FIG. 9 is a graph of percent reflectance vs. wavelength for initial modeling of solar selective coatings using various combinations of metal oxides and metals.
Figure 12:
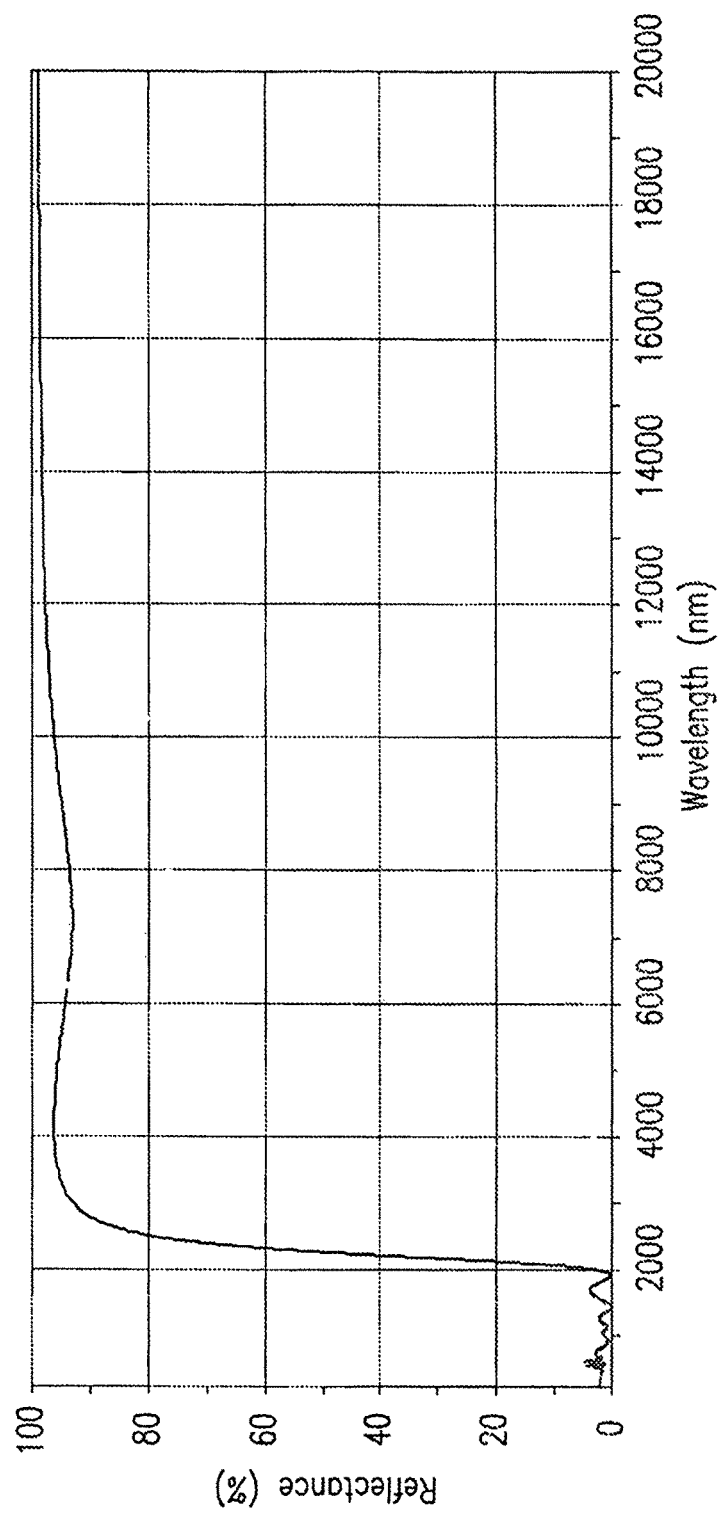
FIG. 12 is a graph of percent reflectance vs. wavelength for modeled TiSi+titania/silica solar selective coatings with 9 layers including platinum, after finer modeling.

However, the absorptance of modeled coatings was initially lower than desired, as shown in FIG. 8. The modeled coating with TiSi improved the optical properties over a $ZrO_2$+platinum multilayer coating. Adding an AR layer improved the absorption of the coating with TiSi, but lowered the emittance. Titanium silicide in its various stoichiometrics (TiSi, $TiSi_2$, or $Ti_2Si$) is an ohmic contact material in Si technology with a refractive index of 2.21 and resistivity of about 13 to 16 ohm-cm. It is stable to about 450° C., corrosion and oxidation resistant, and the material is typically formed at about 900° C. As shown in FIG. 12 and Table II, with further refinement, it was possible to simplify the design to nine layers and three materials [NREL #6], i.e., TiSi, $TiO_2$, and $SiO_2$, which were significantly easier to deposit than the original 21-layer stack (see Design TiSi—$TiO_2$-AR4b in Table III). Including Pt in the stack improves the absorption but also increases the emittance [NREL#4B (9L)], as may be seen in Design TiSi—$TiO_2$-pt-AR4, table IV.

Figure 13:
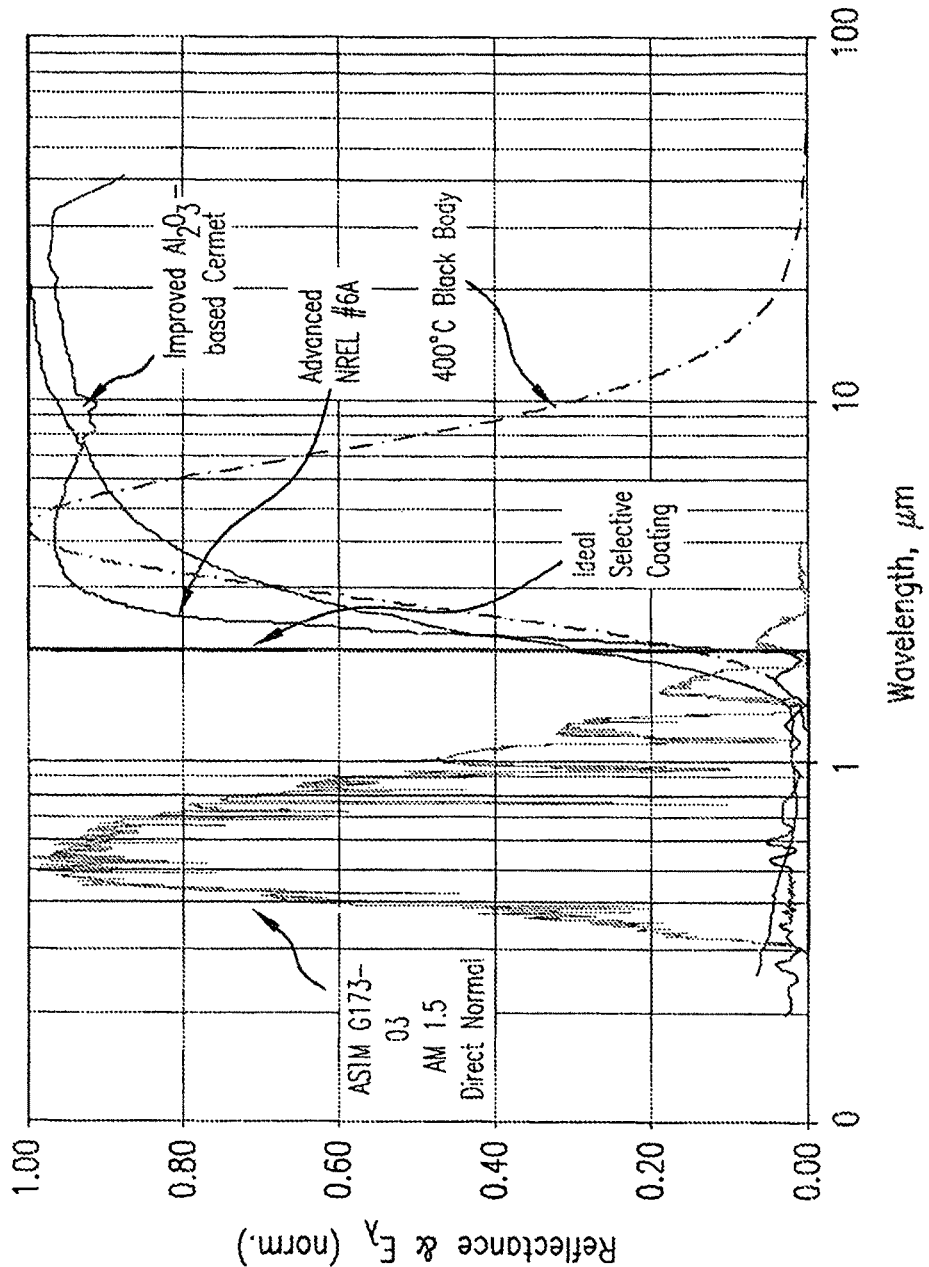
FIG. 13 is a graph of comparative reflectances and $E_\lambda$ (nom)—the nominal energy versus wavelength for the modeled coating compared to a commercial alumina-based cermet coating and an ideal selective coating.

As shown in FIG. 13, finer modeling refinements of the AR layers with a tighter spread between data points between 300 and 500 nm resulted in absorptance, $\alpha=0.959$ and emittance, $\epsilon=0.071$ at 400° C. for the 9-layer, 4-material stack which includes Pt: [NREL #6B]. Finer refinement was completed for the three-material, nine-layer stack without Pt [NREL #6] that reduced the thickness of the TiSi layers while retaining the optical properties of NREL #6A of absorptance, $\alpha=0.957$ and emittance, $\epsilon=0.061$ at 400° C. This basically exceeds the goal specifications by about one percent overall, because one percent in emittance is worth about 1.2 percent in absorptance. The key issue becomes the application of optimum coatings. Further improvements can be achieved by incorporating improved AR coatings, cermets, and textured surfaces, and using formulations and coating structures to handle tradeoffs between low emittance and high absorptance for particular applications.

Based upon Applicant's research and review of the relevant literature, solar-selective coatings made with multiple cermet layers of refractory metal compounds that incorporate surface texturing and multiple AR layers are likely to be successful and meet the CSP optical and durability goals. Designs of solar-selective coatings with multiple layers were optically modeled using thin-film design software. Multilayer coatings were modeled because they were significantly easier to model than cermets, with the expectation of later converting the best multilayer design into a cermet. Materials with low thermal stability and high reactivity were eliminated, and materials with the most suitable properties were modeled. Modeling was necessarily limited to materials with optical constants in the software's database. Some materials of interest, e.g., the refractory metal carbides, borides, and ternary compounds, do not have published optical constants. To have modeled them would have required either finding the constants in the literature or depositing and measuring the optical properties of the compositions of interest, then introducing the optical constants into the software database. The original concept of a $ZrO_2$/Pt multilayer did not work as well as hoped, as can be seen in FIG. 8, because the emittance of the modeled coating was too high.

Figure 14:
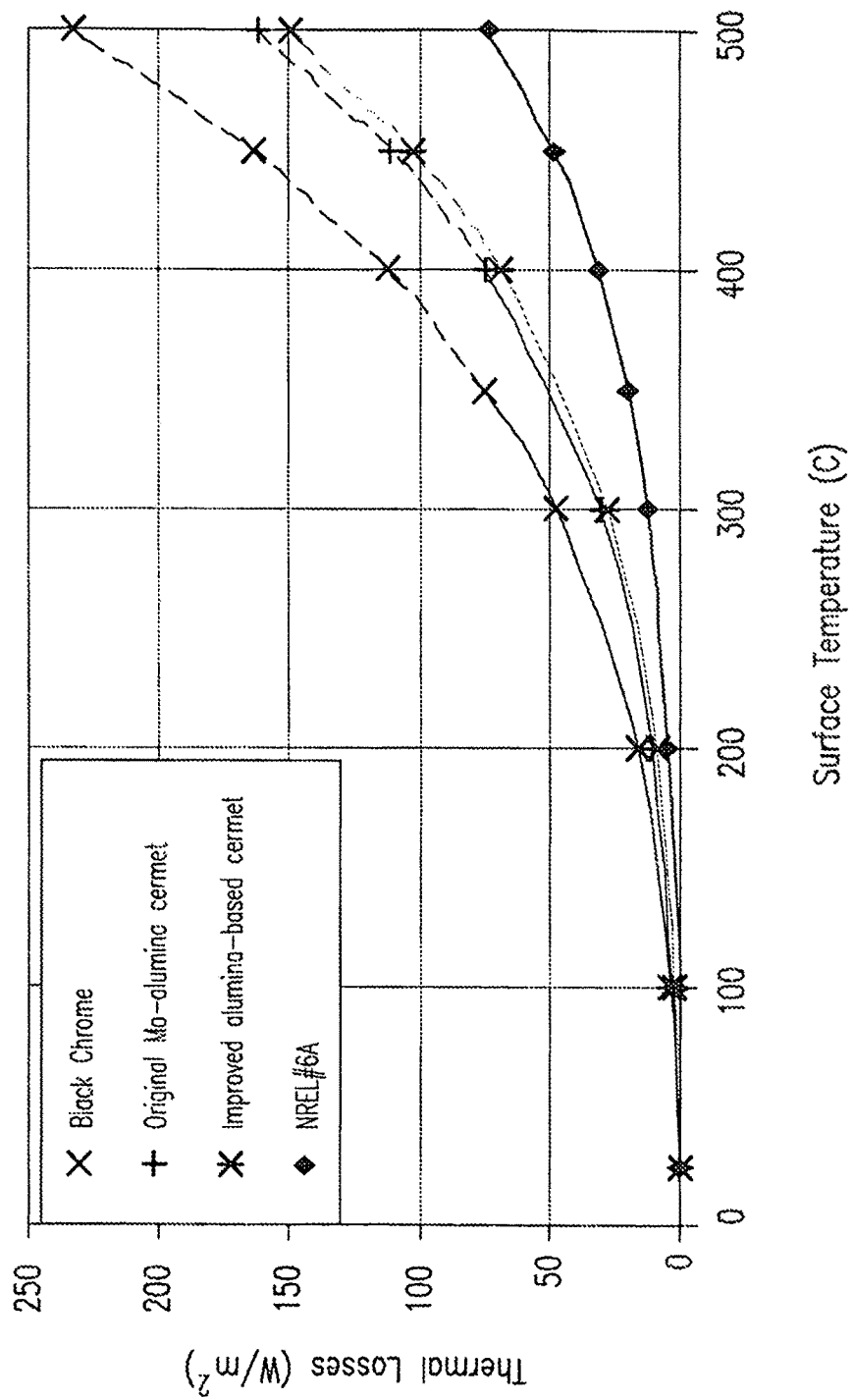
FIG. 14 is a graph of thermal losses with increasing surface temperature for the modeled coating of FIG. 13.

A low-emittance, high-temperature refractory metal-silicon binary compound material, TiSi-a, was found for the primary reflective layer that, when modeled, gave solar-selective coatings with excellent emittance. However, the absorptance of these modeled coatings was lower than desired. The addition of AR layers composed of very thin (quarter-wave) refractory metal-oxygen compounds (or dielectric material) with high indices of refraction ($TiO_2$) and low-index of refraction ($SiO_2$) improved the absorptance. Titanium dioxide ($TiO_2$) is one of the most important high-index materials for optical coatings in the visible and near infrared, because it is the highest retractive index film material for the visible region and it is hard and stable in combination with other oxides. Silica is one of the most important low index materials for optical coatings in the ultraviolet, visible and near infrared wavelength range because it has one of the lowest indices of refraction, is very stable, and easy to deposit. In combination they are very important AR coatings; for example, when $TiO_2$ is paired with $SiO_2$ films, multilayer combinations totaling in excess of 50 layers have been deposited that show excellent durability and little stress. As shown in Table V, additional AR layers further improved the absorptance, but increased the complexity of the design (NREL#4A and 4B). The difference between the A and B models is that one layer of the low-emittance, high-temperature TiSi material is replaced by a noble metal, Pt, in B. The noble metal has the advantage of raising the absorption, but the disadvantage of also slightly raising the emittance. Further modeling increased the absorptance and reduced the number of layers used in the design (NREL#5), to a construction that is significantly easier to deposit. Finer refinements to the design were developed by modeling the AR layers with a tighter spread between data points between 300 and 500 nm and reducing the thickness of the primary TiSi reflective layer for the multilayer stack (See NREL#6A). The comparison between the modeled reflectance for NREL#6A and the measured reflectance of a commercially manufactured improved $Al_2O_3$-based cermet with an ideal solar-selective, coating is shown in FIG. 14, compared to the solar spectrum on the black body curve at 400 deg. C. The improvement can be seen in the sharp knee at the cutoff wavelength for the modeled costing compared to the commercial coating's sloped curve at the cutoff wavelength.

Figure 15:
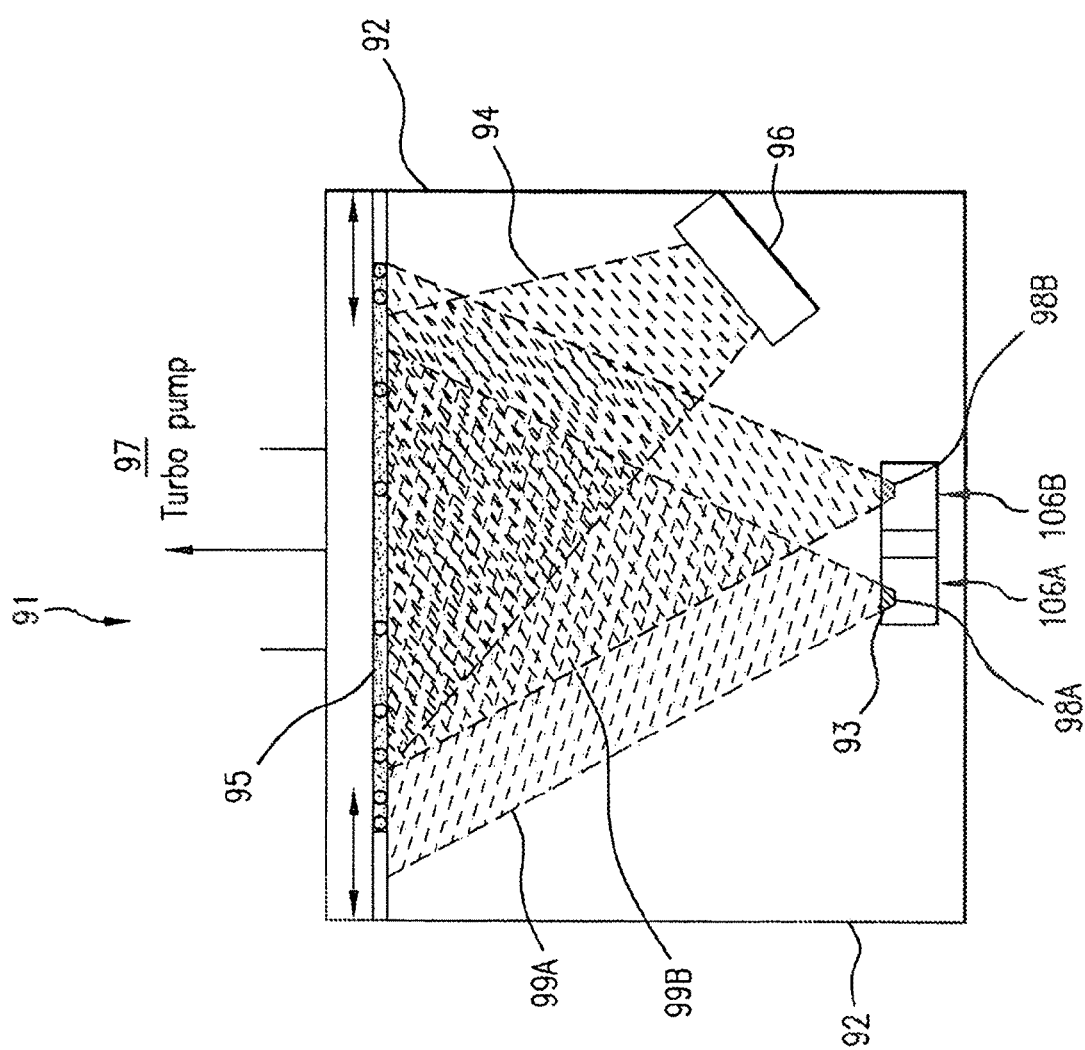
FIG. 15 is a schematic diagram of the operation of an IBAD electron beam chamber arranged for codeposition of coatings on a flat substrate.

As shown in Table VI, with further refinement, a simple multilayer design was found that resulted in absorptance, $\alpha=0.959$ and emittance, $\epsilon=0.061$ at 400° C. for materials with high thermal stability that should be stable in air up to at least 500° C. but more likely as high as 800° C. In addition, because only three materials were used, (i.e., TiSi, $TiO_2$, and $SiO_2$) that are oxides and silicides of the refractory metal, Ti, or silica, the coating should be fairly simple to deposit. As shown in FIG. 15, all of the modeled designs using the binary compound TiSi as the reflective layers had lower radiation losses than the existing commercial coatings.

Solar-selective coatings with optical properties exceeding Applicant's present goals (absorptance of at least 0.959 and emittance of 0.061 or less at 400° C.) were modeled with the three materials. The modeled performance exceeded the goal specification by about one percent overall, as an improvement of one percent in emittance is approximately equivalent to a 1.2 percent improvement in absorptance. Further modeling refinements and improvements completed with the software included eliminating the very thin (<5 nm) layers that are difficult to deposit. Further planned improvements include incorporating a hydrogen permeation layer, and optimizing the entire HCE (air/glass/AR coating, vacuum, AR coating/solar-selective coating/stainless steel) structure in solar collector applications. Modeling a cermet solar-selective coating and incorporating texturing can also be performed to optimize such structures, although depositing a cermet with the TiSi, $TiO_2$, and $SiO_2$ may be challenging. Incorporating improved AR coatings, cermets, and texturing the surface should further improve the solar-selective coating; however, trade-offs exist, between simultaneously obtaining both low emittance and high absorptance. Preparing commercial coatings will require a modest amount of research and development along these lines.

Figure 26:
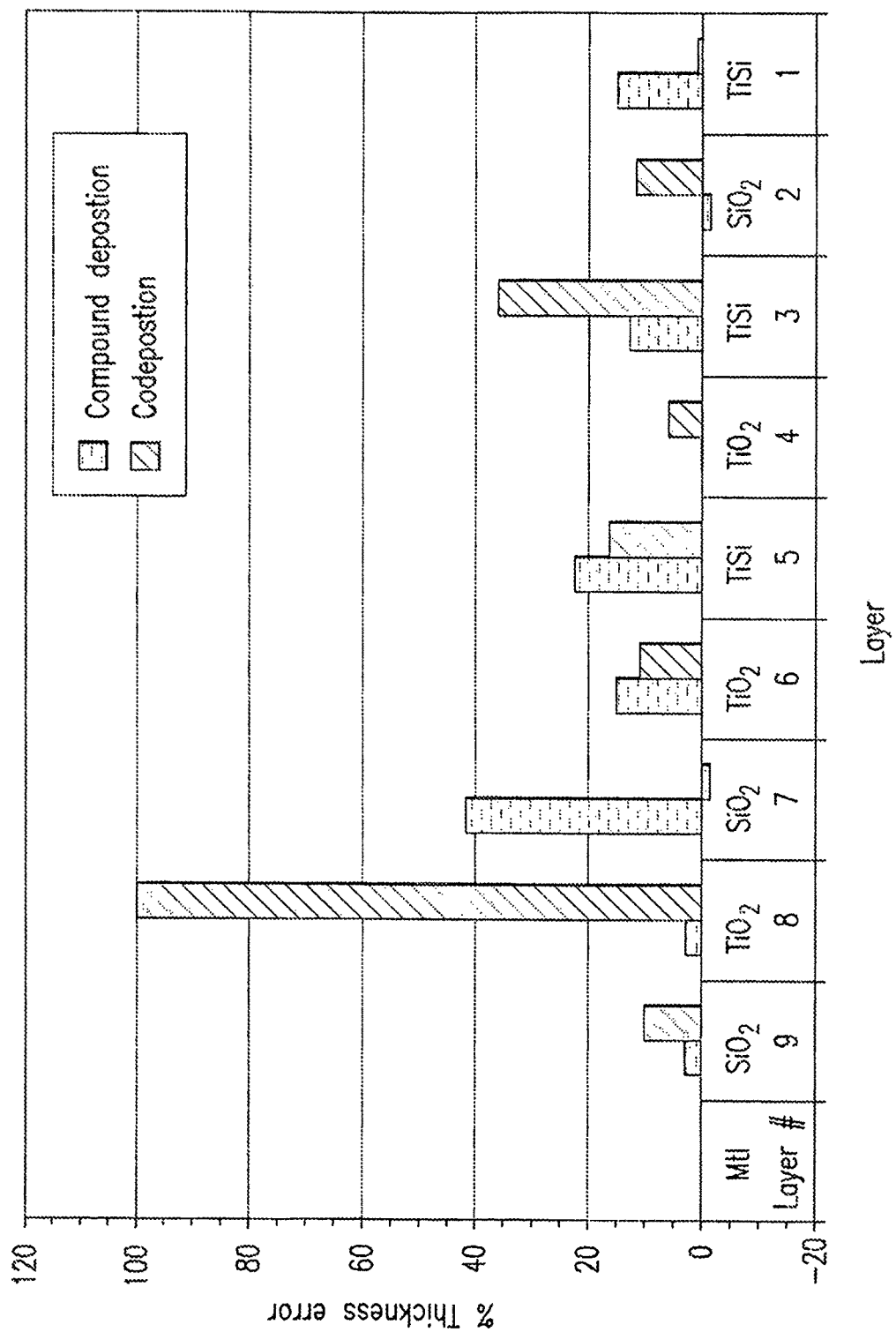
FIG. 26 is a bar graph of percent thickness errors for various solar selective coatings deposited by compound and co-deposition.
Figure 27:
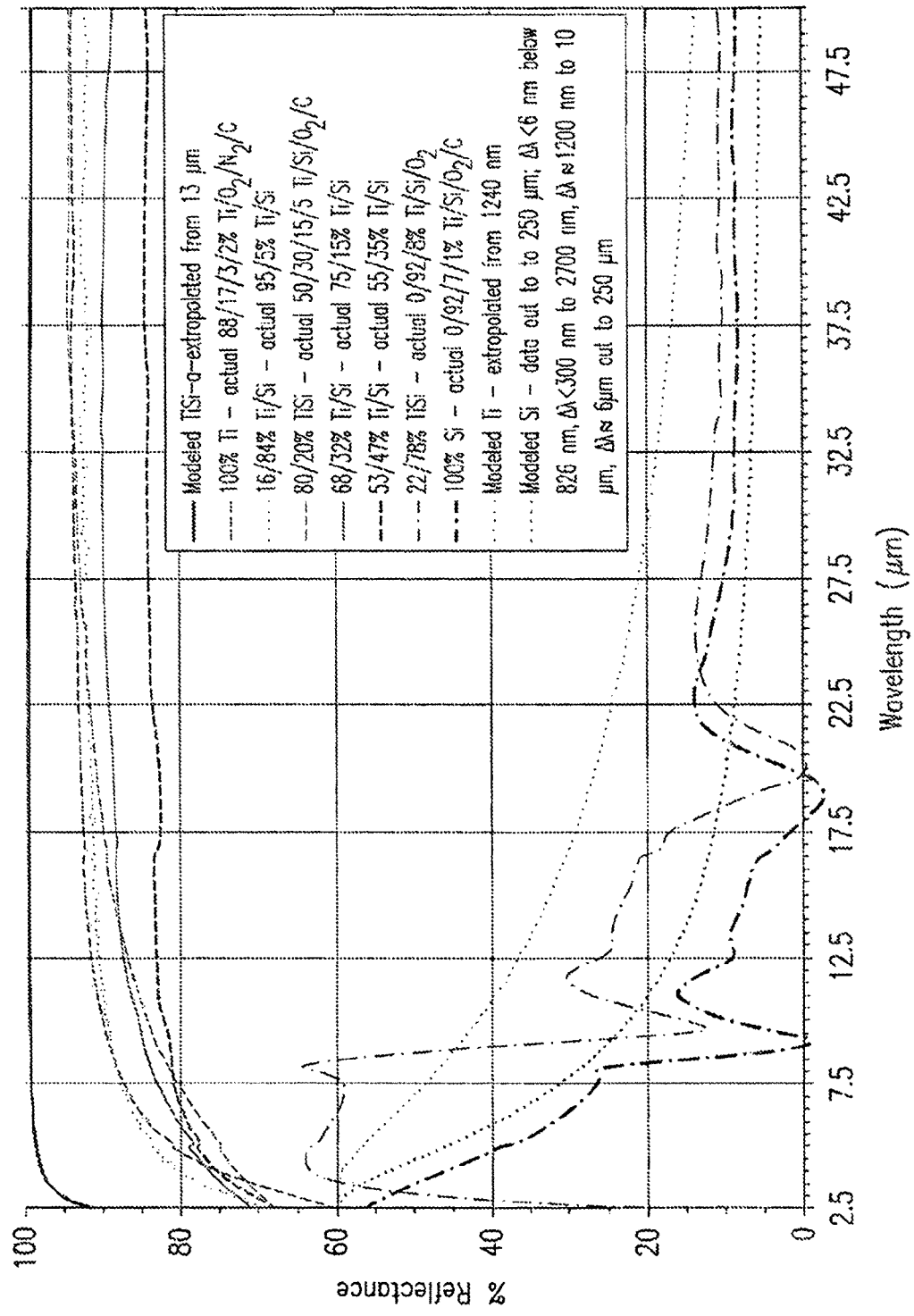
FIG. 27 is a graph of percent reflectance vs. wavelength of co-deposited TiSi individual layers on glass compared with different Ti and Si composition ratios.

The primary reflective layers of the solar-selective design are binary compounds, and the modeling software does not differentiate between TiSi-a and the different TiSi compound phases (i.e., $Ti_3Si$, $Ti_5Si_3$, $Ti_5Si_4$, and $TiSi_2$), which have different properties (See FIGS. 10 and 27.) The reflectance values of the binary compounds vary significantly depending on the ratios of the two constituent materials. The errors between the modeled properties and those of the deposited coatings can easily be explained by combining the errors in layer thickness and the errors in composition (See FIGS. 25 and 26). Any composition errors in the TiSi layer could be resolved by a two-part approach. First, perform a rigorous analysis to determine the optimum composition that gives the highest reflectivity. Second, use the Effective Heat of Formation model, described by Pretorius and thermal gravimetric analysis (TGA) to determine the optimum thin-film phase-formation sequence. Similarly, the present optical modeling software includes only $TiO_2$ and $SiO_2$ in its database and did not include the substoichiometric $TiO_x$ and $SiO_x$ compositions, which have widely different properties. Titanium oxide can be sputtered or evaporated, where the starting composition is either $Ti_3O_5$ or $Ti_2O_3$. Titanium and oxygen form a number of stable phases, the most practical being $TiO$, $TiO_2$, $Ti_2O_3$ and $Ti_3O_5$. However, titanium also forms half a dozen substoichiometric compounds with oxygen that tend to be reduced at high temperatures. All of these stoichiometrics can be evaporated and subsequently oxidized to the final stable phase, $TiO_2$. In conventional evaporation processes, $SiO_2$ grows stoichiometrically if one uses $SiO_2$ as the starting material, even without an additional oxygen inlet during the deposition. Only a small amount of oxygen in the $10^{-5}$ mbar range is required to avoid absorption losses in the ultraviolet wavelength range. Silicon and oxygen form a number of stable phases, the most practical being $SiO$, $SiO_2$, and $SiO_x$ (compounds with X<1.8 are yellow, and with 1.8<X<2 are clear), Rigorous analyses should be run for the $TiO_2$ and $SiO_2$ layers to determine optimum compositions which give the best solar-selective coatings for different applications. An optical coating is only as good as the optical monitoring and control during deposition. In most cases to achieve high yield for demanding requirements it is necessary to minimize the optical thickness errors below 1%, particularly at sensitive turning points. As can be seen from FIG. 26, NREL's initial monitoring and control errors exceeded 5% for the deposited thin film thickness, therefore the coatings measured performance was as expected inferior to the modeled coating. To resolve the thickness errors, the deposition monitor and control will be upgraded with the addition of an optical monitor, providing positive feedback between the quartz crystal monitor and the optical monitor, and automating the coating process. Automation will remove human error from the coating deposition process and by providing steeling and cutting at sensitive turning points, mid-course corrections can be made for any thickness errors in order to deposit a coating that matches the model. Depositing these optimized individual materials into the solar-selective coating without the thickness and composition errors should result in a deposited solar-selective coating having critical values closer to those of the coatings modeled. The use of ion assist can produce a highly absorbing solar-selective coating with low emittance while providing excellent oxidation resistance, but optimum parameters need to be determined for specific applications.

Deposition:

The microstructure and the material stability obtained depend on the technology used to deposit the coating. The material properties of deposited thin-film layers of compounds and single elements differ substantially from the bulk properties of the same materials. The choice of coating materials is influenced by the various design requirements, including the optical, mechanical, chemical, and electrical properties desired. Material preparation and form are selected according to the available or preferred deposition process(es) and its parameters. The deposition, parameters are responsible for the microstructure, which, in turn, determines the optical and mechanical properties of the film layer.

There are a number of available processes which can be used to deposit optical coatings. The most common occur under vacuum and are classified as physical vapor deposition (PVD) and chemical vapor deposition (CVD). In PVD processes, the thin film condenses directly into the solid phase from the vapor. Physical is intended to indicate the absence of chemical reactions in the film formation; but this is an over-simplification because chemical reactions are actually involved. CVD is reserved for a family of techniques where the growing film differs substantially in composition and properties front the components of the vapor phase.

PVD can be classified based on the methods used to produce the vapor and the energy involved in the deposition and growth of the film; but the two main processes are evaporation and sputtering. In thermal evaporation, the material to be deposited the evaporant is heated to the temperature at which it vaporizes. The vapor condenses as a solid onto the substrates that are maintained between ambient and temperatures below the melting point. Molecules travel virtually in straight lines between the source and the substrate, and deposition is line-of-sight; the laws governing the deposition thickness are similar to the laws governing illumination. The vapor is produced by heating the evaporant in thermal evaporation and by bombarding the evaporant with a beam of electrons in electron-beam evaporation. In sputtering, the vapor is produced by bombarding a target with energetic particles, mostly ions, so that atoms and molecules are ejected from the target. Such vapor particles have much more energy than those involved in evaporation, and this energy influences the condensation and film-growth processes. In particular, the microstructure of the films deposited by sputtering is usually more compact and solid than those deposited by evaporation. In other variations of PVD, the condensation of evaporated material is supplied with additional energy by direct bombardment by energetic particles. In ion-beam-assisted deposition (IBAD), the energy is supplied by an ion gun. Such processes, together with sputtering, are known as energetic processes. The major benefit of energetic processes is an increase in film packing densities. The dielectric chemistry can be controlled by activated reactive evaporation (ARE) or reactive sputtering with the introduction of gases (e.g., $O_2$, $N_2$, $CO_2$) into the process that react with the evaporant, resulting in deposited materials with widely different material properties and ranges of refractive indices.

In thin-film deposition, a good general rule is that the lower the process pressure and the more energetic the process, the more control exists over the film properties, but the higher the cost of the equipment and the coating. The IBAD electron-beam (e-beam) chamber (illustrated in FIG. 15) in the NREL multichamber vacuum system Was used to begin proof-of-concept based on the versatility and lower cost for initial material prototyping. The e-beam gun uses 7-cc crucibles to deposit six materials sequentially or can co-deposit two different materials simultaneously. Dielectrics can be evaporated directly or reactively, and an ion gun can be used to improve the quality, composition, and density of the coating. However, there are necessarily trade-offs in the microstructure between a highly oxidation-resistant coating (i.e., amorphous or nanocrystalline) and a solar-selective coating with both high absorption (i.e., columnar or porous microstructure) and low emittance (i.e., smooth or highly dense).

The IBAD chamber 92 shown in FIG. 15 includes a large vacuum chamber 92 with an oscillating large area substrate 95 located at the rear (upper portion in figure). A turbo pump 97 (not shown here) maintains the low vacuum pressure. The dual E-beam evaporant plumes 98A and 98B are ejected from crucibles in E-beam guns 106A and 106B. This arrangement permits codeposition of materials with different precursor materials placed in the two crucibles 93 placed in the evaporators. Operation of the two E-beam guns produces two evaporator beams 99A and 99B which deposit materials on substrate 95. When the ion gun 96 is activated during this process, a broad ion beam 94 is generated and ion assisted codeposition takes place.

Figure 16:
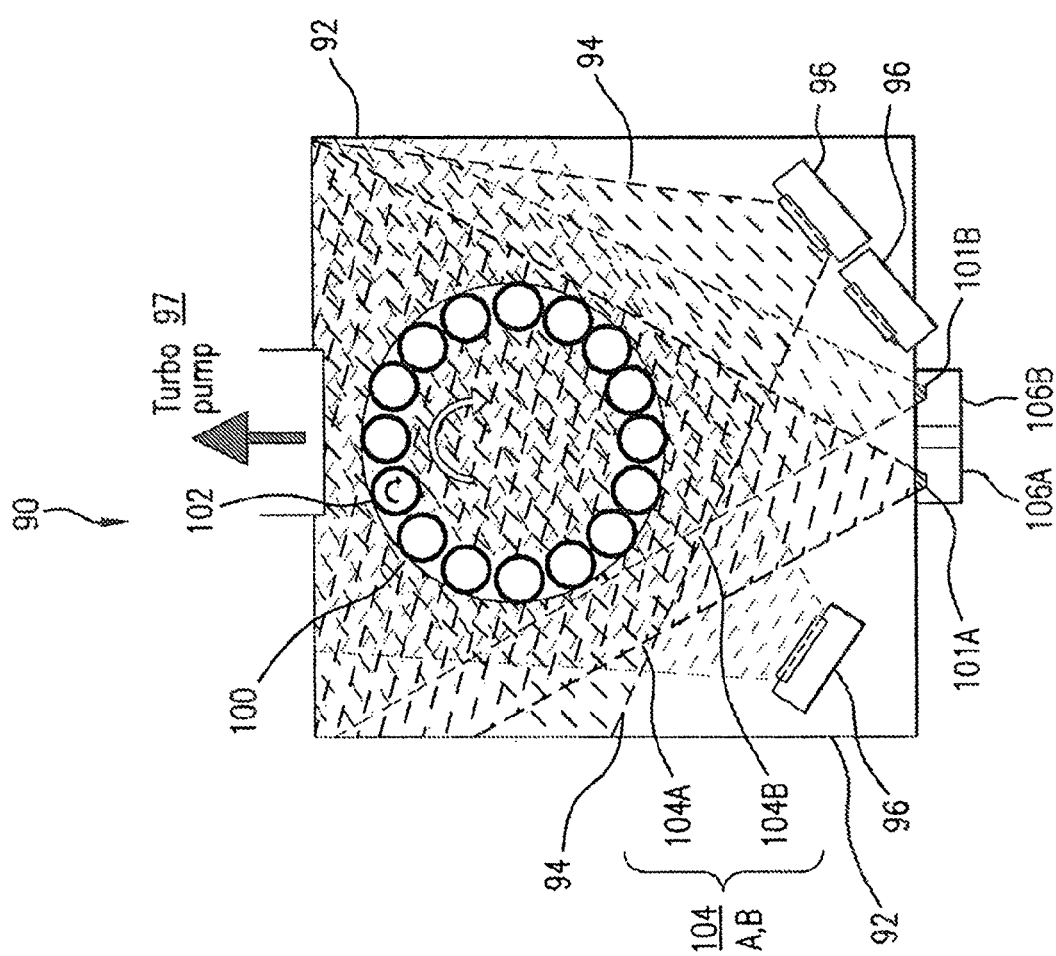
FIG. 16 is a schematic diagram of the operation of an IBAD electron beam chamber arranged for the deposition of coatings on substrates rotated in a carousel device.

A different configuration of an IBAD chamber 90 is shown in FIG. 16, operating within a similar vacuum chamber 92 and using the turbo pump 97. Dual E-beam guns 106A and 106B are provided, with crucibles 101A and 101B. The operation of the E-beam guns produces overlapping evaporant plumes 104A and 104B. Three ion guns 96 are provided to superimpose ion beams on the plumes to modify the morphology of the coating. Rather than a planar target as in FIG. 17, a receiver tube substrate carousel 100 is provided, containing a set of individual receiver tubes 102. This part of the apparatus is configured so that the carousel can be rotated while the individual tubes are also rotated, in both cases clockwise (or counter clockwise) to achieve uniformity around the receiver tubes.

The material to be evaporated is in the form of solid slugs, pellets or powders of metal or dielectric material. There are two electron guns, each having a power from a few tens to hundreds of kW. An electron beam gun consists of a source of electrons (a hot filament) that are accelerated using a high voltage power supply. Electron beams can be generated by thermionic emission, field emission or the anodic arc method. The generated electron beam is accelerated to a high kinetic energy and focused towards the source material using electromagnetic force and diverted through an angle of 270°, using a permanent magnet into a crucible where the material evaporates. When the accelerating voltage is between 20 kV-25 kV and the beam current is a few amperes, 85% of the kinetic energy of the electrons is converted into thermal energy as the beam bombards the surface of the ingot. The surface temperature of the material increases, resulting in the formation of a liquid melt. Although some of the incident electron energy is lost in the excitation of X-rays and secondary emission, the liquid material evaporates under vacuum. The source material itself is contained in a copper crucible which is cooled by water circulation. The evaporation rate may be on the order of $10^{-2}$ g/cm$^2$ sec.

The optimum compositions of the reflective layers and level of ion assist needed to produce highly absorbing solar-selective coatings with low emittance while providing excellent oxidation resistance can be determined for specific applications. PVD e-beam and IBAD techniques were selected to give greater control over the film properties of the initial prototype. While it would be possible to deposit coatings on solar collector receiver tubes by IBAD as illustrated in FIGS. 15 and 16, it would probably be a fairly expensive process. The intention is that after a high-temperature solar-selective coating is proven by e-beam, the coating will be demonstrated with the lower cost, more commercial method of pulsed DC reactive sputtering.

Planar magnetron sputtering is a vacuum process used to deposit thin films; it provides a plate of the material of which the coating is to be made (called the target) with uses powerful magnetron magnets arranged behind it which create a magnetic trap for charged particles, such as argon ions, in front, of the target. When the magnetron drive power supplies are turned on they put the target at a negative voltage of typically −300V or more, across a low-pressure gas (usually argon at about 5 millitorr) to create a "plasma," which consists of electrons and gas ions in a high-energy state which attracts the argon ions to the target surface at high speed. When they hit it, two important processes take place: atoms are knocked out of the target surface by the ions with enough energy to travel to, and bond with, the substrate—this is sputtering. These sputtered atoms are not charged negatively or positively, so they go straight out of the magnetic trap. The surface also releases electrons. These are held in the magnetic trap, where their energy is used to produce more argon ions. This means that the ions which are attracted to the surface are constantly replenished, so that the magnetron can operate continually. The magnetic field vastly improves the deposition rate by maintaining a higher density of ions, which makes the electron/gas molecule collision process much more efficient.

The sputtering process is run in an inert gas (usually argon) to make sputtered metal thin films. To make a compound thin film (such as $SiO_2$, AlN, or TiC) by reactive sputtering, the appropriate reactive gas is added to the sputtering process. Ideally, the reactive gas would react only with the growing film to make a thin film of the required compound. Unfortunately, reactions occur within the sputter target surface as well. This "target poisoning" complicates reactive sputtering and reduces the thin film growth rate. When a sufficiently thick oxide layer builds up on the target, surface, a positive charge builds up on the surface of the target. Since the target/electrode has a negative voltage of several hundred volts applied to it, the electrons that normally strike the target and neutralize the positive charge build up and are repelled from the target because their energies are much less than the applied potential. This charge build, up process continues until a large potential develops and arcing occurs. During an arc event, large clusters of material are ejected from the target surface and impact the growing film to form inclusions which degrade the optical, electrical, and corrosion-resistance properties of the coating.

An available improvement is pulsed D.C. magnetron sputtering, in which alternating (microsecond time scale) positive and negative voltages are applied to the target. During the negative cycle, ions are accelerated from the plasma toward the target surface as in regular sputtering. Some of these ions sputter atoms from the target and some are implanted into the oxide layer as before. However, when the voltage applied to the target surface is switched to the positive phase of the cycle, ions in the plasma are repelled froth the target surface and electrons are attracted and accelerated toward the target and insulating oxide layer. The electrons that are collected by the target electrode then recombine with the buried positive ions in the oxide and neutralize the charge buildup, thus preventing arc events from occurring and improving the quality of the deposited coating by reducing the number of inclusions in the film.

Figure 17:
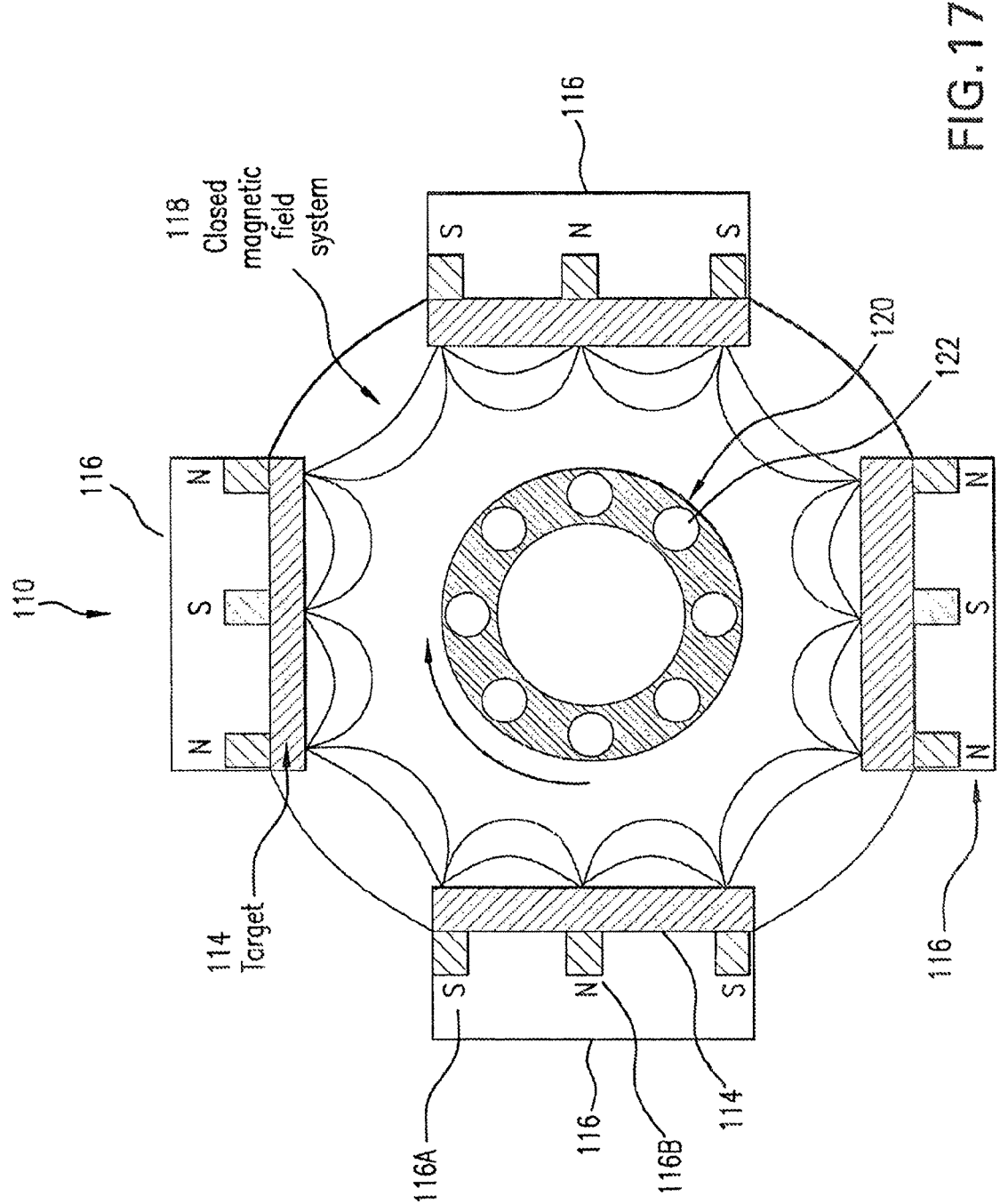
FIG. 17 is a schematic diagram of the operation of a CFUBS magnetron system.

Magnetron sputtering is a well-established PVD technique. It is used to deposit different coatings such as metallic ceramic thin films and compounds for a wide range of applications The main drawback of this technique is the low ionization degree, especially of the sputtered material (a few percent) often resulting in a porous microstructure of the films and low adhesion to the substrate or adjacent layers. Additionally, it is well-known that the coating substrate interface plays a key role with respect to the general functionality of coated parts. Closed Field Unbalanced Magnetron Sputtering (CFUBMS) is a further improvement that uses unbalanced magnetrons in an arrangement whereby neighboring magnetrons are of opposite magnetic polarity, as illustrated in FIG. 17. Using this arrangement, the deposition zone in which the substrates are located is surrounded by linking magnetic field lines. This traps the plasma region, prevents losses of ionizing electrons and results in significant plasma enhancement. Use of this system produces magnetrons with good operating characteristics while simultaneously generating dense plasma close to the substrate. This is important, as less than a hundred volts applied to the substrate during coating can attract ions out of the plasma with enough energy to cause the coating to form a dense microstructure and improve the adhesion but not so much energy that the coating is sputtered off. It is this bombardment with very large numbers of low energy ions which gives the coatings their exceptional properties of high adhesion nature to substrate and adjacent layers, high hardness, low friction coefficients, and exceptional wear resistance. An effective method of deposition could be CFUBMS because of the ability to control the material properties (stoichiometry and morphology) and uniformly coat the receiver tubes, as illustrated in FIG. 17. A suitable arrangement could include dual twin magnetron systems with facing magnetrons of opposing magnetic polarity using similar materials (four magnetrons total—i.e., two for Ti and two for Si) and dual four magnetron systems (eight magnetrons total—i.e., four Ti and four Si) where the arrangement of the polarity of the magnetrons is closed to enhance the plasma.

FIG. 17 shows a CFUBMS system 110 having targets 114 comprising materials to be sputtered, e.g., Ti and Si, located on the inner surfaces of four separate magnetrons 116. The magnetrons 116 include magnetic poles 116A and 116B of alternating polarity. The operation of these magnetrons sets up a closed magnetic field 118, as indicted by the force lines in FIG. 19. A sample holder 120 provides several receptacles tor the substrates. The sample holder is rotated clockwise (or counter clockwise) during the sputtering operation to uniformly coat the substrates.

Figure 18:
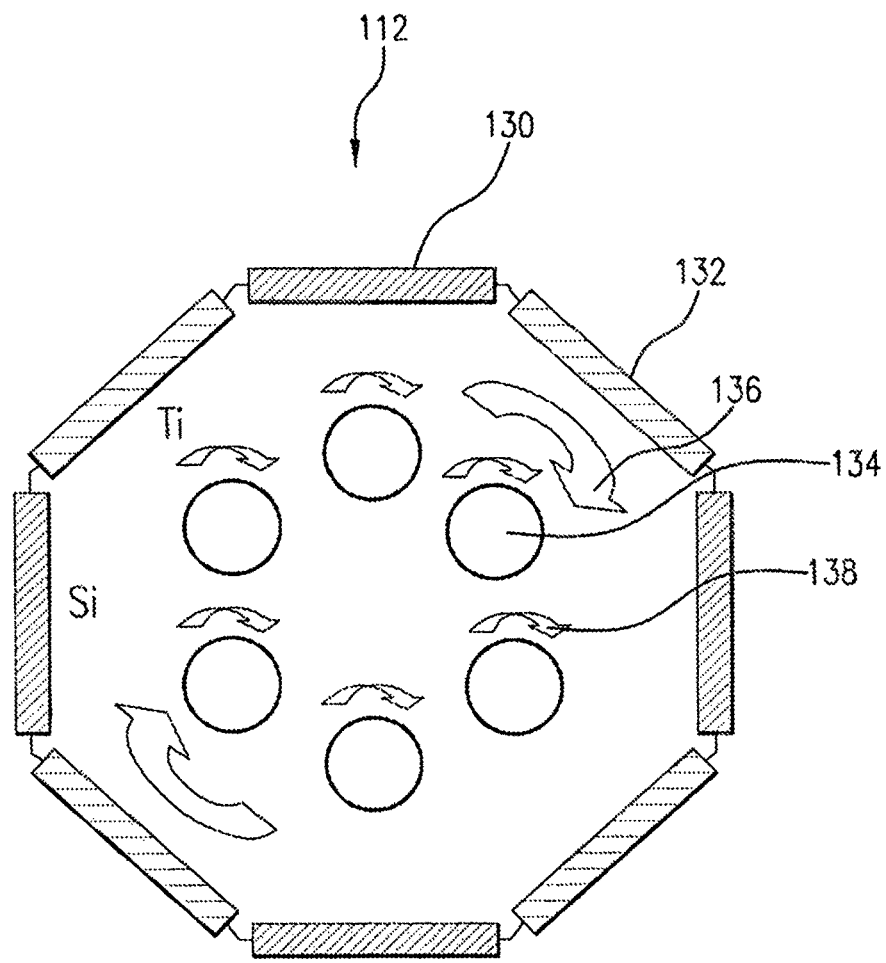
FIG. 18 is a schematic diagram of the operation of a CFUBMS magnetron system with receiver tubes for single chamber deposition.

FIG. 18 shows a CFUBMS apparatus 112 having a series of targets 130 and 132 (composed of different materials such as Ti and Si) around the periphery of an equilateral polygon such as the octagon shown. A carrier substrate holds sample receiver tubes 134 which rotate clockwise individually as shown at 138, while the carrier substrate also rotates clockwise as shown at 136, to coat the receiver tubes uniformly. In order to deposit coatings on receiver tubes, each layer could be applied in an inline deposition system where each layer or process has a dedicated deposition chamber. Conversely, tubes could be sputtered in a single chamber where each layer is deposited sequentially in a CFUBMS system as in FIG. 20.

A new method called High Power impulse Magnetron Sputtering (HIPIMS), a modification of the conventional D.C. magnetron sputtering, is a very recent addition to the family of "plasma" techniques, in which the coating is produced by bombarding the surface to be coated with carefully prepared atoms and ions. HIPIMS was first developed in 1995, and has been shown to produce excellent plasmas, with a combination of ion properties which should produce hard wearing, corrosion resistant coatings and has recently drawn much attention from industry and academia. Due to its high plasma density, exceeding $10^{19}$ m$^{-3}$, and ionization of a large fraction of the sputtered material, HIPIMS should be seen as an alternative technique for ion assisted film growth and surface engineering.

The increase in plasma density is achieved by increasing the applied power, which is limited by the thermal load of the target. The solution to this problem is to apply high power in short, very high-power pulses with a low duty factor (ratio between pulse-on time and the total time) into the plasma. The pulses are 1000 A or higher up to 3 kV, but only 100 microseconds long; this keeps the average power down (kW range) and makes HIPIMS usable on even small laboratory plasma systems. The plasma density during the pulses is very high and this gives very high ionization compared to DC magnetron plasmas. Since the thermal load of the target is limited by the average power rather than the peak power, the peak power during the active discharge can be very high. The applied peak voltage can be up to 2.4 kV, resulting in a peak discharge current of the order of A cm$^{-2}$ on the target surface. The ionization fraction reaches values of 30-70 percent, and peak values of over 90 percent for Ti have been reported in the literature, but it is believed to be strongly material dependent. The high degree of ionization opens new opportunities, since the ions may be controlled by the use of both electric and magnetic fields. HIPIMS, particularly in combination with CFUBMS, could be a useful technique if it is determined that coatings with the best combinations of high absorption, low emittance, and high oxidation resistance for particular applications are produced with a high ion flux.

In the production of optical coatings, PVD is the deposition process most frequently used, but CVD is the predominant method used in the electronic device field, and use in the optical field is gradually increasing. The film material is produced by the chemical reaction between the starting components the precursors of the vapor that surrounds the substrates. The reaction may be induced by the substrate temperature or, as more usually done, in a plasma-induced process. A carrier gas that, flows through the system usually introduces the precursors to ensure a constant supply of reactant and to allow sufficient dilution such that film growth is not overwhelmed by the reaction rate. A reaction that proceeds rapidly tends to produce a film that is poorly packed and poorly adherent. To overcome this problem, pulsed processes have been adopted. A related process is plasma polymerization or plasma-enhanced (or induced) CVD (PECVD). PECVD is used to deposit dense organic layers with stable optical properties over curved or irregular surfaces with good uniformity.

Another technique used in optical coatings is the sol-gel process, where a solution undergoes a transition to a gel. The sol-gel process usually starts with a metal alkoxide hydrolyzed with water and appropriate solvent(s). The solution is usually slightly acidic to control reaction rates and to help form a polymeric material with linear molecules. The optical component is dipped into the gel and heat treated to remove the liquid and pores. The higher the temperature, the more dense the coating; complete densification can occur at temperatures as high as 1000° C.

Altering the solar selective coating deposition process from a PVD to a CVD or a sol-gel process could substantially lower the cost of the receiver tubes or other coated substrates; however, difficulties may be encountered in replicating the necessary material properties to give high absorption and low emittance. Therefore, sol-gel coatings may not be appropriate for deployment in evacuated tube-type systems, although advantageous in other applications.

Further embodiments of the methods and products disclosed above include using dielectric absorbing layers and AR coatings, and reflective layers from the refractory metals family; solar selective coatings made from refractory and noble metal cermets; incorporating a highly porous top AR layer; incorporating a hydrogen permeation layer; incorporating optimized AR coatings on the glass envelope of solar collector receiver tubes and similar devices; and depositing the coating by sputtering (i.e., DC, RF, pulsed DC, reactive, CFUBMS, HIPIMS) or a combination of sputtering, e-beam and IBAD techniques.

Figure 19:
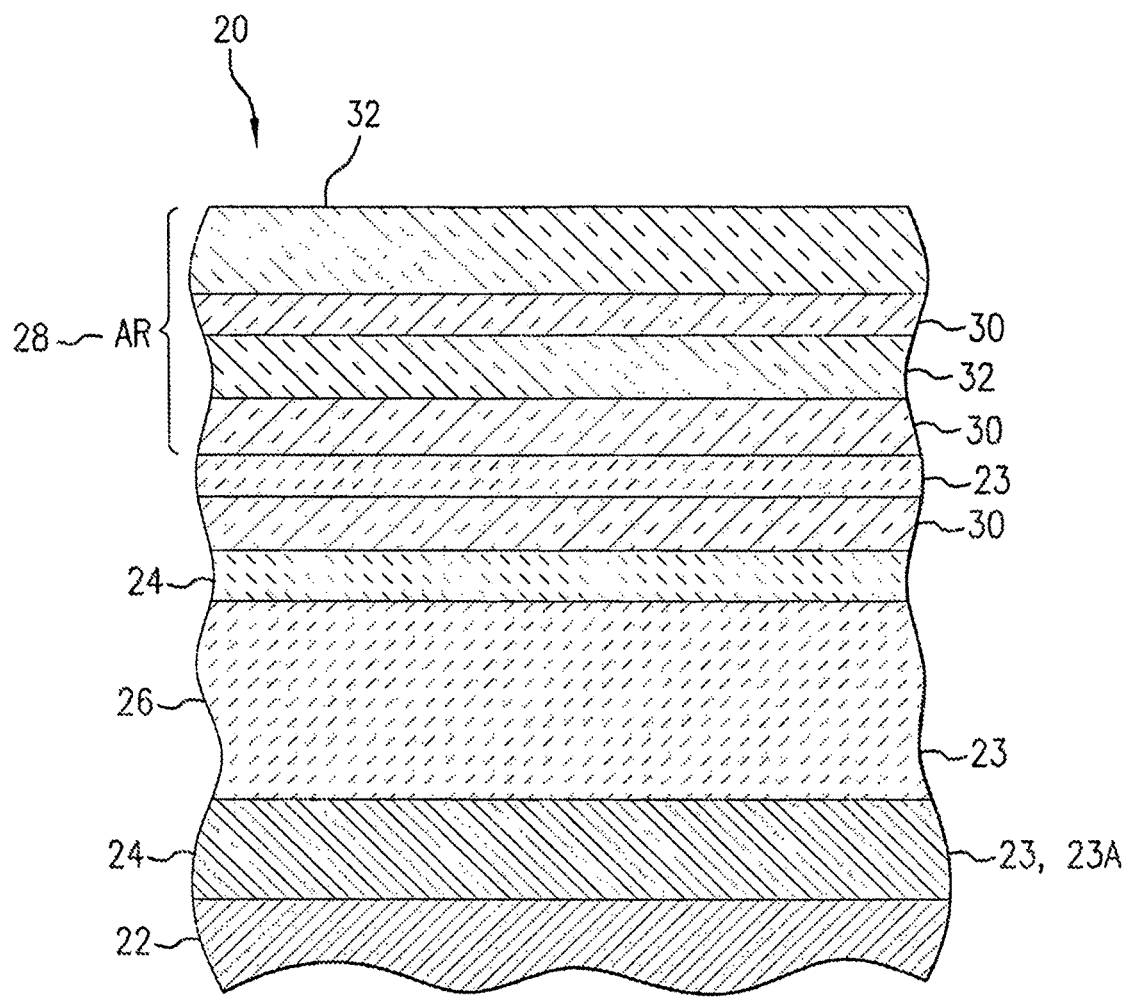
FIG. 19 is a sectional schematic diagram of a multilayer solar selective coating applied to a substrate.

FIG. 19 is a sectional schematic view of an embodiment of a coated substrate 20 comprising a multilayer solar selective coating applied to a substrate 22, which will generally be a high temperature stainless steel or an IR reflective metal and can comprise at least one stainless steel. In general, numerals indicating functionality appear on the left side of FIGS. 19 and 20, with exemplary materials labeled on the right. A thin layer of IR reflective material 24 can optionally be deposited directly on the substrate, and can be a noble metal (23A) such as platinum or a refractory metal silicide such as TiSi (23). Whether or not this initial thin layer is provided, the next layer to be deposited upon substrate 22 can be a solar absorbent material (26), comprising a relatively thick layer of a refractory metal silicide such as TiSi or other suitable compounds including, $Ti_3SiC_2$, TiAlSi, TiAlN and similar compounds of Zr and Hf. At least one series of alternating layers 30 or 32 of a refractory metal oxide such as titania or a metalloid oxide such as silica are deposited next, interspersed with additional solar absorbent materials including alternating layers of a refractory metal oxide such as titania (30) and a metalloid oxide such as silica (32) plus an additional layer of a refractory metal silicide (23), The coating's upper portion is a thin antireflective layer 28 comprising at least two layer pairs of a refractory metal oxide such as titania 30 and a metalloid oxide such as silica 32, with the silica layer uppermost. The indices of refraction of the layers 30 and 32 making up the antireflective layer 28 should differ from one layer to another, with high and low indices alternating. All these layers can be applied sequentially by any suitable means, especially those described above. Among the materials selected for the various layers, a "high" index of refraction is considered to be above about 2.1, a "medium" index about 1.65 and a "low" index less than about 1.5. Generally the numerical difference between the highest and lowest indices of material used will be about 1.4 (or less).

Although not to scale, FIG. 19 illustrates generally the relative physical thicknesses of certain of these layers, especially the relatively thick substrate, the optional thin IR reflective layer applied thereto, the thicker solar absorbent layers initially applied to the substrate, and the relatively thin layers making up the topmost antireflective layer 28. In designing affective solar selective coatings, the optical thickness of the layers must also be considered.

In descriptions of multilayer coatings, optical thickness displays the thickness of the layer in optical thickness units. Geometric thickness displays the thickness of the layer in geometric thickness units, while physical thickness displays the thickness of the layer in physical thickness units. The optical thickness of a transparent medium is the same as the optical path length, which is its geometric thickness multiplied by the refractive index. This is the quantity which determines the phase delay for light passing through the medium and is thus relevant, e.g., in interferometers. The software displays the thickness of the layer in terms of optical thickness units in either Full Wave Optical Thickness (FWOT) or Quarter Wave Optical Thickness (QWOT) (Quarterwave=0.25). The display convention (in FIGS. 19 and 20) was set to FWOT. To convert from optical thickness units to physical thickness units (like nm) the wavelength may be converted only into those quantities that are linearly proportional to wavelength. For example, 1 nm is $10^{-9}$ meter and so the scale factor for nm is $10^{-5}$ nm divided by 1 m, that is $10^{-9}$.

An anti-reflection coating (AR) coating is a dielectric coating applied to an optical surface to reduce the optical reflectivity of that surface in a certain wavelength range. In most cases, the basic operational principle is to introduce one or more additional optical interfaces so that the reflected waves from all the different interfaces largely cancel each other by destructive interference. In the simplest case, an antireflection coating designed for normal (perpendicular to surface) incidence consists of a single quarter-wave layer of a material with the refractive index of which is close to the geometric mean value of the refractive indices of the two adjacent media. One then obtains two reflections of equal magnitude from the two interfaces, which cancel each other by destructive interference. If no such optical media can be found, or if anti-reflective properties are required for a very broad wavelength range (or for different wavelength ranges simultaneously, or for different angles), more complicated designs may be used, which usually have to be developed using numerical techniques. A general trade-off of such multilayer designs is between a low residual reflectivity and a large bandwidth. Apart from those properties, the tolerance to growth errors is of interest.

The reflection is minimized when $n_1 = \sqrt{n_o n_s}$, when $n_1$ is the refractive index of the thin layer, and $n_o$ and $n_s$ are the indices of the two media. Such AR coatings can reduce the reflection for ordinary glass from about 4 percent per surface to around 2 percent. Practical AR coatings rely on an intermediate layer not only for its direct reduction of reflection coefficient, but also use the interference effect of a thin layer. If the layer's thickness is controlled precisely such that it is exactly one-quarter of the wavelength of the light (a quarter-wave coating), the reflections from the front and back sides of the thin layer will destructively interfere and cancel each other. This eliminates the reflection from the surface, and all the light is transmitted through.

In practice, the performance of a simple one-layer (n=1.5) interference coating is limited by the fact that the reflections only exactly cancel for one wavelength of light at one angle, and by difficulties in finding suitable materials. For ordinary glass (n=1.5), the optimum coating index is n=1.23. Few useful substances have the required refractive index indices. Magnesium fluoride ($MgF_2$) is often used, since it is hardwearing and can be easily applied to substrates using physical vapor deposition, even though its index is higher than desirable (n=1.38). With such coatings, reflection as low as 1 percent can be achieved on common glass and better results can be obtained on higher index media.

Further reductions in reflections are possible using multiple coating layers, designed such that reflections from the surfaces undergo maximum destructive interference. By using two or more layers, broadband antireflection coatings which cover the visible light range (400-700 nm) with maximum reflectivities of less than 0.5 percent are commonly achievable. The reflection in narrower wavelength bands can be as low as 0.1 percent.

Reflectance, $$R = \rho^2 = \left(\frac{\eta_1 - \eta_2}{\eta_1 + \eta_2}\right)^2$$

with the form $n=c/v=\eta-1\kappa$ where n is the refractive index, $\eta$ is the real part of the refractive index (often simply used as the refractive index because $\eta$ is real in an ideal dielectric material) and $\kappa$ is known as the extinction coefficient, R is the reflectance, and $\rho$ is the amplitude reflectance coefficient. For example, a single layer of $SiO_2$ and $TiO_2$ multilayer stack, n ($SiO_2$)=1.46 and n ($TiO_2$)=3.02, and using the above formula simplifies to $$R = \left(\frac{3.02 - 1.46}{3.02 + 1.46}\right)^2 = 0.121.$$

For a double layer of the $SiO_2$ and $Ti_2$ multilayer stack, $R=(0.121)^2=0.015$.

Figure 20:
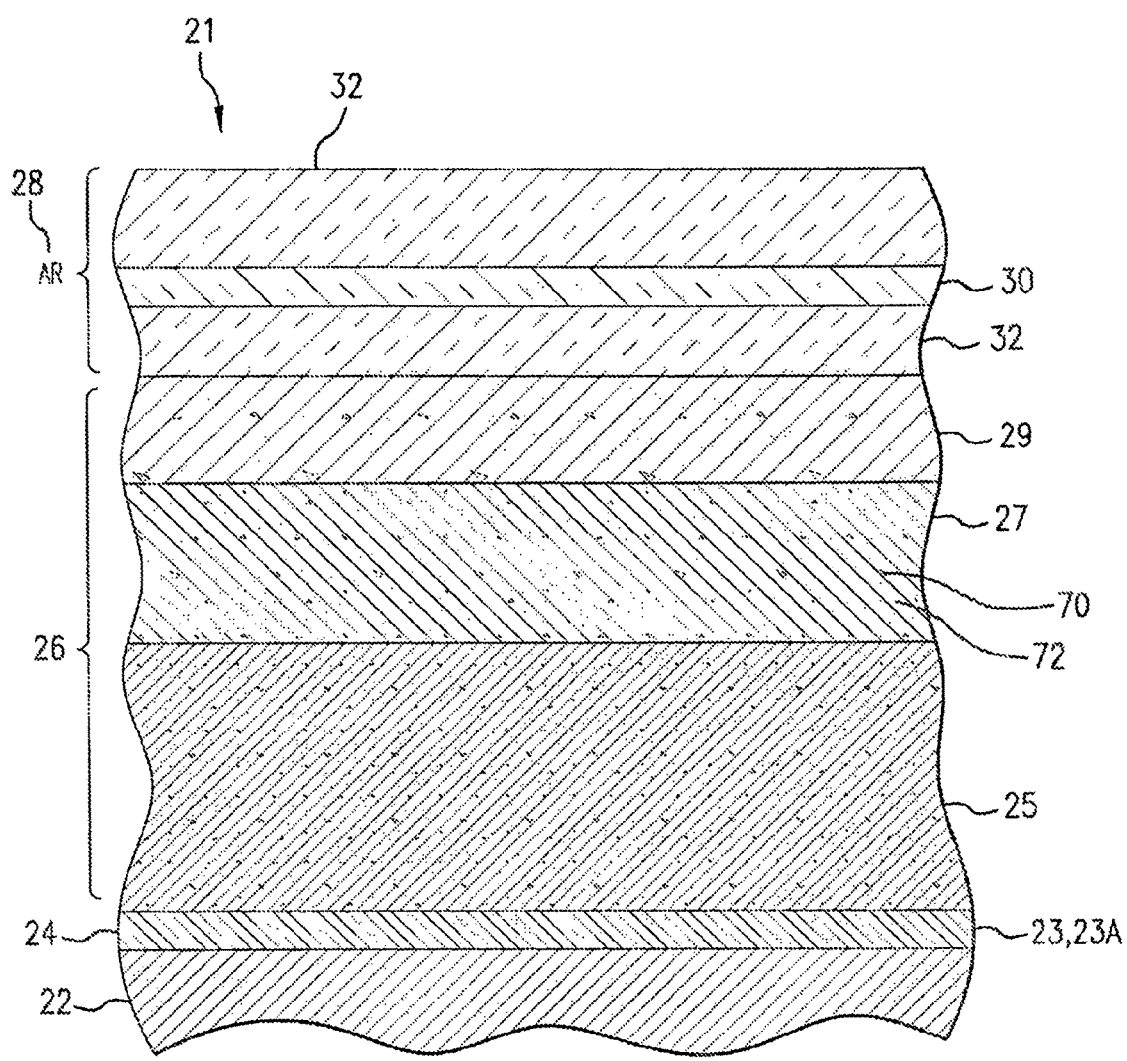
FIG. 20 is a sectional schematic diagram of a multilayer solar selective coating comprising cermet materials and applied to a substrate.

FIG. 20 is a sectional schematic diagram of an embodiment of a coated substrate 21 comprising a solar selective multi-layer coating comprising similar materials to those of the coated substrate 20 discussed above and illustrated in FIG. 19, but containing them in at least one layer in a cermet form, as described above for FIGS. 4B and 5. Substrate 22 can be as described as for FIG. 19, and a thin layer of an IR reflective material 24 such as a refractory metal silicide such as TiSi (23) or a noble metal (23A) such as platinum can optionally be applied first as in FIG. 19. At least two layers of cermet materials can be applied next, each having differing properties to achieve the desired balance between solar absorbance and emittance. As shown, an initial, relatively thick, cermet layer 25 comprises particles (70) of a refractory metal silicide or noble metal such as platinum dispersed in a dielectric matrix (72) comprising, e.g., an oxide or nitride of a refractory metal such as Ti or metalloid such as Si or other suitable materials. This particular layer comprises an oxide matrix having a relatively low index of refraction and a relatively high volume fraction of metal silicide particles to matrix, e.g. about two parts particles to matrix. The next cermet layer 27, also relatively thick, can comprise similar materials, but with the cermet matrix having a relatively high index of refraction and with a medium volume fraction of particles to matrix, e.g. about one part particles to one part matrix. Another cermet layer 29, containing similar materials but thinner than the previous layers, can optionally be added, comprising a matrix with a relatively high index of refraction and having a relatively low volume fraction of metal or metal compound to the oxide matrix, e.g. about one part particles to four parts matrix.

Volume fractions $\phi_i$, are used instead of mole fractions $\gamma_i$ when dealing with mixtures with a large disparity between the sizes of the various kinds of molecules (i.e., cermets) because they express the relative amounts of the various components. In any ideal mixture, the total volume is the sum of the individual volumes prior to mixing. However, volumes can contract or expand upon mixing in non-ideal cases and the additivity of volume is no longer guaranteed; the molar volume then becomes a function of both concentration and temperatures. If $v_i$ is the volume of one molecule of component i, its volume fraction in the mixture is defined as $$\phi_i \equiv \frac{N_i v_i}{V},$$

where the total volume of the system is the sum of the volume contributions from all the chemical species $$V = \sum_j N_j V_j.$$

The volume fraction can also be expressed in terms of the numbers of moles by transferring Avogadro's number $N_A=6.023\times10^{23}$ between the factors in the numerator. The volume fraction is then defined by $$\phi_i \equiv \frac{n_i V_i}{V}$$

where $n_i=N_i/N_A$ is the number of moles of i and $V_i$ is the molar volume, and $$V = \sum_j n_j V_j.$$

As with mole fractions, the dimensionless volume fractions sum to one by definition, i.e., $$\sum_i \phi_i \equiv 1.$$

Partial molar volumes are applicable to real mixtures, including solutions, in which the volumes of the separate, initial components do not sum to the total. For real mixtures this is generally the case, because there is usually a contraction or expansion on mixing due to changes in interstitial packing and differing molecular interactions in distinction to the paradigm of ideal mixtures. Even so, the total volume is the sum over the partial molar volumes times the numbers of moles, because the volume is a homogeneous function of degree one in the amounts of the various chemical species present. That is, $V(\lambda n_1, \lambda n_2, \ldots, \lambda n_2)=\lambda V$, where $\lambda$ is the partial molar volume.

For example, if the amount of everything in the system is doubled at constant temperature and pressure, the volume doubles because all the molecular circumstances remain the same throughout. Thus, $$V = \sum_j n_j \overline{V}_j,$$

in which the partial molar volume is defined as $$\overline{V}_i \stackrel{def}{=} \frac{\partial V}{\partial n_i}$$

and $n_i$ is the number of moles of component i. As noted, T and P are held constant when taking these partial derivatives. These quantities can be measured experimentally, they are not constants but vary with the composition of a system.

As with the previous coated substrate 20, this solar selective coating is topped with an antireflective layer 28 comprising at least one layer each of oxides of a refractory metal such as titanium and a metalloid such as silicon, with the titania layer 30 having a high index of refraction and the silica layer 32 having a low index of refraction. In this particular embodiment, the top silica layer 32 can be applied in a relatively, low density, porous fashion. As described above for coated substrate 20, the top layer of silica or titania can be texturized to improve performance.

In this context, where layers relatively thin compared with the substrate (which may be a sheet or tube of stainless steel), are applied, the layers which are relatively thick may be physically from about one to about 140 times as thick as the thinnest layers, e.g. the optional IR reflective layers 24 of noble metal or refractory metal silicides or the thinnest layers of the top antireflective layer 28, which may range in physical thickness from about 4 to about 85 nm. The thicknesses of these layers may also be compared in terms of optical thickness, defined in comparison to the wavelength of the incident light, as discussed above. The optical thickness of the component layers of the top antireflective layer can range from about 0.02 to about 0.19 FWOT, for example. The refractive indices of the materials in the various layers can vary from about 1.46 to abut 3.02 individually, with the contrasts in refractive index between adjacent layers being a factor which helps to achieve the desired optical effects.

Alternate AR and Absorber Layer Materials:

High and low index dielectrics can be used to replace the $TiO_2$ and $SiO_2$ in the AR coating and absorbing layers because of their flexibility when designing optical coatings. For AR coatings, one should ideally have a pair of materials with a large refractive index contrast, so that fewer layers are required. The refractory metal oxide compounds ($HfO_2$, $Ta_2O_3$, $TiO_2$, $Y_2O_3$, and $ZrO_2$) are of interest as the high refractive index materials in the AR coating and absorbing layers because of their high indexes of refraction and chemical, mechanical, and thermal stability and high melting points. Refractory metal or metalloid oxides ($SiO_2$, MgO, $Al_2O_3$, and $Ta_2O_5$), fluorides ($AlF_2$, $MgF_2$, and $YF_3$), nitrides (TiN, TaN), and oxynitride ($SiO_xN_y$ and $AlO_xN$) compounds are of interest for AR coatings because of their low indices of refraction and can be used as the high-index of refraction material in both AR coating and absorbing layers. The refractive index of the materials can be varied by changing the coating composition, stoichiometry, and morphology. For example, the refractive index of various deposited materials can be tailored to any value from 1.47 ($SiO_2$) to 2.3 ($Si_3N_4$) by controlling the film stoichiometry via varying the oxygen and nitrogen partial pressures. Zirconia ($ZrO_2$) and hafnia ($HfO_2$) are among the oxide compounds whose tendency for inhomogeneous index gradients can be reduced by the introduction of additives such as $TiO_2$, $SiO_2$, MgO, $Y_2O_3$ and others to modify the crystalline growth behavior. The combinations produce improved optical and mechanical properties over the separate pure materials. The addition of a small percentage of $Y_2O_3$ can lower the refractive index of the combination by about 0.03, or 1.5 percent below that for pure $ZrO_2$; increasing amounts of additives will change the refractive index more significantly. Porous coatings have lower densities, thus also a lower refractive index than dense coatings. For example, $SiO_2$ has a refractive index of 1.46 and porous $SiO_2$ has a value of 1.05. The addition of a porous $SiO_x$ AR layer can reportedly increase the solar absorptance from 0.90-0.97 to 0.98.

A list of potential dielectrics based on descending order of refractive index, (based upon numerous sources) includes: $Si>Fe_2O_3>Cu_2O>Bi_2O_3>SiC>CuO>TiO_2>MnOTiO_2>Mn_2O_3>MgOTiO_2>Cr_2O_3>Ta_2O_5MnO>CeO_2>MnOWO_3>FeCr_2O_4>MnO>Ta_2O_5>CuO$
$WO>AlN>ZrO_2>ZrO_2La_2O_3+TiO_2>ZrO_2Pr_2O_3+TiO_2>ZrO_2TiO_2>WO_3>Sb_2O_3>Si_3N_4>Y_2(MoO_4)_3>SbO_2>Nd_2O_3>SiO>SnO_2>La_2O_3ZrO_2SO_2>Pr_2O_3>HfO_2>Sc_2O_3>BeO>Y_2O_3>ThO_2>2MnOSiO_2>PbF_2>BIF_3>MgO>MnOSiO_2>MgOAl_2O_3>AlO_xN_y ZrO_2Pr_2O_3+Al_2O_3>MnOSiO_2>Al_2O_3SiO_2>Al_2O_3>CeF_3>TiN>NdF_3>LaF_3>BO_3(AlO)_3>HfF_4>SmF_3>SiO_2>Si_2O_3>ThF_4>YbF_3>YF_3>LuF_3>SiO_2>B_2O_3>SiO_xF_y>SrF_2>CaF_2>MgF_2>LiF>Na_3AlF_6>NaF_3>AlF_3>NaF$> porous $CaF_2$> porous $SiO_2$. Porous; hybrid compounds (e.g., $Al_2O_3SiO_2$, CuOWO, $MgOAl_2O_3$, $MgOTiO_2$, $MnOSiO_2$, $MnOTiO_2$, $MnOWO_3$, $Ta_2O_5$–MnO, $ZrO_2SiO_2$, $ZrO_2TiO_2$, $ZrO_2La_2O_3+TiO_2$, $ZrO_2Pr_2O_3+Al_2O_3$, or $ZrO_2-Pr_2O_3+TiO_2$); ternary compounds (e.g., $AlO_xN_y$, $BO_3(AlO)_3$, $FeCr_2O_4$, $Na_3AlF_6$, $SiO_xF_y$, $Si_xN_yO_z$, or $Y_2(MoO_4)_3$); and graded refractive index layer systems can be used to provide intermediate refractive indices that give another degree of freedom in designing AR coatings with simple and robust designs.

Refractory Metal-Oxygen Compounds:

Crystalline $TiO_2$ films exist in three phases: anatase (tetragonal, $E_g$=3.2 eV), rutile (tetragonal, most stable), and brookite (orthorhombic); the physical, chemical, and optical properties of titania have been modified by additions of V, W, Cr, Sb, Ce, and Mn oxides. $ZrO_2$ is an attractive candidate for high-temperature applications because of its high melting point and excellent, corrosion resistance. $ZrO_2$ has three phases depending on the temperature; the monoclinic phase is formed from room temperature to 1150° C., the tetragonal phase is stable between 1150°-2370° C., and the cubic phase is formed at temperatures above 2370° C. Tetragonal $ZrO_2$ can be stabilized into the high-temperature tetragonal and cubic phase at room temperature with different concentrations of $Y_2O_3$, $Al_2O_3$, $CeO_2$, and other additive materials. The complete formation of the fluorite (cubic) phase is necessary for zirconia to be stable at high temperatures; this requires a minimum of 8 mole percent $Y_2O_3$ (8YSZ) at high temperatures to 15 mole percent $Y_2O_3$ (15 YSZ) at low temperatures to achieve a 100 percent cubic structure. YSZ (yttria-stabilized zirconia) is reportedly stable in air in a gas furnace up to 2200° C. for 26 hours: with repeated cycling.

Refractory Metal-Nitrogen Compounds:

Aluminum nitride (AlN) is attractive because of its high thermal conductivity enabling heat to be removed rapidly, good electrical and mechanical properties, and low coefficient of thermal expansion (CTE) to avoid thermal stresses. Titanium nitride (TiN) can have a variable index of refraction depending on the composition and the method of deposition. TiN forms a single compound and oxidizes at 500° C., but reportedly does not have good barrier properties. The normal emittance of TiN reportedly ranges from 0.40 to 0.14. Compared to a melting point, of 1668° C. for Ti, Ta is higher at 3017° C. Tantalum nitride ($TaN_x$) has a variety of phases that all have very high melting points and elevated heats of formation which demonstrate excellent structural strength at elevated temperatures. The stoichiometric TaN (x=1) phase has a melting point $T_M$ of about 3090° C., a heat of formation $\Delta H_r$ (298 K) of about −60 kcal/mol, and has better barrier properties; it reportedly fails by diffusion at grain boundaries, but at higher temperatures than TiN. Interstitial nitrogen increases the melting temperature and hardness of α-Hf single-phase material, and tire brittle-to-ductile transition (BDT) temperature reportedly increases with N concentration.

Tungsten (W) and its nitrides is another highly refractory material with excellent mechanical and physical properties, because $WN_X$ is chemically and thermodynamically stable. Additionally, it is easily deposited in the amorphous form and thus has diffusion-barrier stability because potential diffusion paths through grain boundaries have been eliminated. Like $TaN_X$ stoichiometry plays an important role in the properties of tungsten nitride materials. Highly metal-rich amorphous $WN_X$ (x<<0.5) films tend to recrystallize into W and $W_2N$ phases at temperatures as low as 450° C. and nitrogen-rich amorphous $WN_x$ (x>1) films such as WN possess elevated recrystallization temperatures (about 600° C.), but significantly higher resistivity. Amorphous $W_2N$ is the phase with the best thermal stability, mechanical robustness, conductivity, and diffusion barrier properties; however, because of high processing temperatures (>500° C.), its integration into metallization structures may be limited.

Substoichiometric compounds of $TiN_x$, and $ZrN_x$ reportedly had the best combination of high solar absorptance and low thermal emittance. $TiN_x$ and $ZrN_x$ had nearly identical optical properties, but the absorptance was lower and the emittance higher for $HfN_x$. Solar absorbers could be made by reactively sputtering the nitrides of zirconium, yttrium, cerium, thorium, and europium (i.e., ZrN, YN, CeN, ThN, and EuN), which are transparent in the infrared, abrasion resistant, inert, very hard, and stable at temperatures in excess of 500° C. for long periods of time.

Refractory metal- or Transition metal-carbon compounds may be of interest for use as the dielectric layers because they are extremely hard, have good chemical and mechanical stability, corrosion resistance, high melting points, high electrical and thermal conductivity and brittle-to-ductile fracture at high temperatures. It is known that Chromium, iron, molybdenum, stainless steel, tantalum, titanium, and tungsten carbides have been, direct-current (DC) reactively sputtered on bulk and evaporated copper. The carbides on bulk copper reportedly have α=0.76-0.81 and ε=0.02, and on sputtered copper, α=0.84-0.90 and ε=0.035-0.06.

Molybdenum carbide on bulk-sputtered metal reportedly had the highest optical properties: α=0.90 and ε=0.035. The mechanical properties of $Mo_2C$ change with temperature and it is not as hard as the cubic transition metal carbides (e.g., TiC and TaC). Titanium carbide (TiC) has a very high melting point (>3000° C.), high hardness, and high electrical conductivity, but it oxidizes at relatively low temperatures. Selective coatings with TiC were particularly unstable and their appearance changed when stored for a few days at room temperature, according to Ritchie. However, bleeding nitrogen in during the first two minutes of sputtering reportedly improved the adhesion, friction, and wear properties of the titanium carbide.

Zirconium carbide (ZrC) and hafnium carbide (HfC) have high melting points (about 3550° and 3900° C., respectively), solid-state phase stability, good thermomechanical and thermochemical properties (high free energy of formation and low volatility), high hardness and wear resistance, but reportedly have high emissivity, and high current capacity at elevated temperatures. HfC oxidizes to $HfO_2$ and forms a heterogeneous structure with three distinct layers: a residual carbide with dissolved oxygen in the lattice; a dense oxide interlayer containing carbon (HfC x/2 $O_Y$) (with, y=2−x) that is an oxygen barrier with a very low diffusion coefficient; and a porous outer layer of $HfO_2$. HfC is reported to be thermodynamically stable upon heating at 2200° C. in a reducing environment for four hours without any microstructure changes, phase transformations or reactions, or strength degradation. Boron carbide ($B_4C$) is the third-hardest known material after diamond and cubic boron, nitride, with a melting point of 2540° C. It is a p-type semiconductor with a bandgap between 1.2 and 1.8 eV, a very low thermal conductivity, and is thermally stable, oxidation and chemically resistant. The carbides are of interest for CSP applications, especially with AR layers added to increase absorption and a temperature-stable IR reflective layer to improve durability. In terms of α and ε∈ for the refractory metal carbide compounds, in descending suitability: $Mo_2C$>TaC≥CrC≥WC≥TiC and in terms of oxidation resistance: $Cr_2C_3$>ZrC≈NbC≈VC>TiC>TaC>WC>$Mo_2C$>HfC. However, the high emissivity of HfC and ZrC and the lower oxidation resistance may preclude their use in a selective coating.

Ternary alloys or compounds (i.e., titanium, zirconium, or hafnium metal carbides, oxides, and nitrides) have high degrees of spectral selectivity as absorber layers. The group IV metal compounds are of the general formula $MC_xO_yN_z$, with M=Ti, Zr, or Hf, and x+y+z<2. In tandem absorber-reflector films substoichiometric compounds of $ZrC_xN_y$ (on silver) reportedly had the best combinations of high solar absorptance and low thermal emittance. Adding carbon to form zirconium carbonitride ($ZrC_xN_y$) increased the solar absorptance by 6 percent. Oxygen, either as suboxides ($TiO_x$ and $ZrO_x$) or substituted into the nitrides and carbonitrides ($ZrO_xN_y$ or $ZrC_xO_yN_z$) lowered absorptance and raised emittance. The selective optical properties of sputtered $ZrC_xN_y$ on aluminum-coated oxidized stainless-steel are reported to be thermally stable from room temperature to 600° C. (likely in vacuum). Sputtered selective absorbers with the structure $Al_2O_3$/$ZrC_xN_y$/Ag reportedly have good optical selectivity, with α/$ε_C$ (325° C.)=0.91/0.05 at an operating temperature of 700° C. in vacuum and 175° C. in air. Sputtered $ZrO_x$/$ZrC_x$/Zr absorbers reportedly have α/ε(20° C.)=0.90/0.05 and are thermally stable in vacuum on stainless-steel and quartz substrates up to 600° C. and 800° C., respectively. More recent research incorporated the selective properties of pores and created a temperature-stable (400° C.), solar-selective coating with a void volume of 22-26 percent deposited by reactive evaporation of Ti, Zr, and Hf with nitrogen and oxygen onto copper, molybdenum, or aluminum substrates with a $SiO_2$ AR layer. The optical properties of thin surface films of metal oxynitrides (niobium, tantalum, vanadium, zirconium, titanium and molybdenum) made by converting a substrate coated with a metal-halide slurry to metal oxide or oxynitride by heating with oxygen and nitrogen have a high degree of flexibility, and with further research could be viable-high-temperature absorbers for the Concentrating Solar Power (CSP) program.

Hybrid compound multilayers ($Rh_2O_3$—CuO/Pt) solar-selective coatings exhibit high absorptivity, low emissivity, and resistance to degradation between temperatures of 300° C. and 600° C. A particular solar selective coating consists of a hybrid compound absorbing layer with a composition of 55-65 percent Ag, 34.3-44.7 percent CuO, and 0.3-0.7 percent rhodium oxide ($Rh_2O_3$); a diffusion layer (between the absorbing layer and the substrate) of cerium oxide ($CeO_2$); and a metallic or glass substrate. Films such as these reportedly maintained their solar absorptance of 0.9 and their thermal emittance of 0.1 for 2000 hours at 500° C. in air. Changing the multilayer solar-selective coating to an hybrid compound absorbing layer with a composition of 50-75 percent Ag, 9-49.9 percent CuO, 0.1-1 percent Rh/$Rh_2O_3$, and 0-15 percent Pt (at the expense of the Ag); an interlayer of Ag or Ag/Pt (between the absorbing layer and the substrate); a metallic or glass substrate; and at least one AR layer of $CeO_2$, reportedly improved the resistance to degradation. Silver films agglomerate at temperatures of 300° C. and above, but the addition of an overcoat reportedly stabilizes the silver and helps to prevent diffusion. These coatings reportedly have a useful operating range of 300° C. to 600° C. and were tested to about 700° C. in air for 2845 hours. Solar-selective coatings made with 15-35 percent CuO, 5-15 percent cobalt oxide (CoO), and 60-75 percent manganese oxide ($Mn_2O_3$) over Pt-coated stainless-steel substrates reportedly have improved stability, with absorptance values between 0.88 and 0.92 and emittance values of 0.06-0.12. They are resistant to degradation up to 700° C. for 700 hours in air and have a useful operating range of 300°-600° C. The combinations of properties available from the different materials in the hybrid compound absorbing layer make these materials and hybrids of other absorbing materials of interest to the applications involving concentration of solar power.

Alternate Reflective Layer Embodiments:

Refractory and noble metals are of interest based on their melting points. Refractory transition metals are those possessing high melting points and boiling points. A more specific definition uses only the melting point as a criterion, with a cutoff of 1925 deg. C. If this definition were strictly followed, eleven metals would be called refractory metals from the Groups IV through VIA of the periodic table, including titanium, zirconium, hafnium, vanadium, niobium, tantalum, chromium, molybdenum and tungsten. Sometimes elements from Group VIIA, namely rhenium, ruthenium and rhodium are also included, especially those in low formal oxidation states. Another, more restrictive definition states that the pure metal must have a body-centered cubic (BCC) crystal structure and that the ratio of the melting point of the metallic oxide to that of the base metal must be less than one; it has also been suggested that a cutoff melting point temperature of 2200 deg. C. be used to define: the "true" refractory metals.

Noble metals are any of several metallic chemical elements that have outstanding resistance to oxidation, even at high temperatures; the grouping is not strictly defined, but usually is considered to include rhenium, ruthenium, rhodium, palladium, silver, osmium, iridium, platinum and gold; i.e., the metals of Groups VIIb, VIII and Ib of the second and third transition series of the periodic table.

The metals W, Mo, Ir, Os, and Ta are prime candidates for high-temperature applications, but W, Mo, Os, and Ta have very poor oxidation resistance. The metals Ag, Al, Cr, Cu, and Ni while providing low emittance, are not suitable for CSP applications because these metals diffuse at fairly low temperatures. The diffused metals roughen the film-reflector interface; a quasi-liquid mixture rises through the pores formed in the interface region and oxidizes on the surface of the film. This destroys the selective properties and mechanical stability of the film. Cermets of dielectrics such as $Al_2O_3$ and $SiO_2$ plus additives of noble metals such as Au, Pt, and Pd have been found to be solar-selective. RF-sputtered Pt—$Al_2O_3$ cermets with graded and uniform Pt compositions with $Al_2O_3$ AR layers and $Al_2O_3$—Pt—$Al_2O_3$ compositions were reported as stable in air at 600° C. with α/ε (100° C.)=0.90-0.97/0.08. Cermets made with Au, Pt, Pd, Ir, or V and MgO, $MgF_2$ $CeO_2$, or $SiO_2$ cermets are expected to be thermally stable over 400° C.

Refractory metal-silicon compounds other than TiSi could be used as the reflective layer in other embodiments of solar selective coatings. Refractory metal disilicides are of interest for selective coatings because of their high melting temperatures, intrinsic oxidation resistance, relatively low density, high thermal conductivity, and low vapor pressure. The melting temperature is near 2300° C. for the silicides. $TiSi_2$ has two crystalline phases: the base-centered orthorhombic $Ti_5Si_3$ phase with the C49-type crystal structure that forms at 600° C. and whose resistivity is higher [i.e., 60-70 micro ohms (μΩ)]; and the face-centered orthorhombic $TiSi_2$ phase with C54-type crystal structure that forms at higher temperatures and has lower-resistivity (15-20 μΩ). $TiSi_2$ thin films with the C54 crystal structure are attractive because they have the unique physical property of lower resistance with large thermal stability. By reducing temperature gradients and thermal stresses in the material, high-conductivity materials have improved thermal-shock resistance. Coatings with higher conductivity or lower resistivity allow more energy to be conducted away from the stagnation point where the concentrated solar energy is incident on the tube and allows the energy to be radiated into the lower-temperature regions of the tube. $TiSi_2$ has the highest conductivity, but the lowest density (4.10 g cm$^{-3}$) and melting temperature (~1540° C.), in the group IV-VI transition-metal disilicides. Oxidation resistance at 1200° C. is not as good as for $MoSi_2$ (the CIIb-type crystal structure), but is much better than for $NbSi_2$ and $TaSi_2$ (the C40-type crystal structure).

$TiSi_2$ has the highest conductivity, but the lowest density (4.10 g cm$^{-3}$) and melting temperature (about 1540° C.), among the group IV-VI transition-metal disilicides. Oxidation resistance at 1200° C. is not as good as for $MoSi_2$ (the CIIb-type structure), but is much better than for $NbSi_2$ and $TaSi_2$ (the C40-type structure). $MoSi_2$ exhibits the highest oxidation resistance and lowest density, has high stiffness, thermal conductivity, and strength at elevated temperature, but only modest toughness. Alloying $MoSi_2$ with titanium improves the oxidation resistance at temperatures around 800 K because titania is a very stable oxide according to its low standard-formation free energy. $MoSi_2$—$TiSi_2$ pseudobinary alloys reportedly improve the oxidation resistance because the scale formed on the surface is a silica-based oxide and improves the mechanical properties of $MoSi_2$-base alloys. In addition, composites of a $MoSi_2$ in SiC grid are reported to have increased fracture toughness compared to $MoSi_2$.

$WSi_2$ closely resembles $MoSi_2$ with respect to physical properties such as melting point ($WSi_2$ $T_M$ about 2160° C. and $MoSi_2$ $T_M$ about 2020° C.), lattice constant ($WSi_2$ α=0.3211 and c=0.7808 and $MoSi_2$ α=0.3202 and c=0.7851), and electronic structure. Of the hexagonal C40 crystal, structures, $CrSi_2$ is deformable at the highest temperature, <900° C., whereas $NbSi_2$ and $TaSi_2$ are deformable at significantly lower temperatures. Although $NiSi_2$ may be of little importance because of its crystal structure phase transformations, $CoSi_2$ melts at 1326° C., has a low density (4.95 g cm$^{-3}$), and its oxidation resistance is as excellent as $MoSi_2$. Chromium, iron, molybdenum, stainless steel, tantalum, titanium, and tungsten silicides were DC reactively sputtered on bulk and evaporated copper by several workers. Titanium silicides reportedly had the best optical performance, with α=0.87 and ε=0.045 and the reflectance of the $WSi_2$ and $TiSi_2$ coatings at 10.6 μm was 0.90 or greater. Refractory metal disilicide thin films have been deposited by reactive processing techniques such as DC magnetron sputtering, IBAD, and CVD. In terms of α and εε suitability for the refractory metal disilicide compounds: $TiSi_2$ (α=0.87 and ε=0.045)>$TaSi_2$>$CrSi_2$>$MoSi_2$$WSi_2$ and in terms of oxidation resistance: $MoSi_2$≈$CoSi_2$>$WSi_2$>$TiSi_2$ (oxidizes at 1200° C.>>$NbSi_2$≈$TaSi_2$>>$NiSi_2$. The properties of the refractory metal-silicon compounds, alloys, and composites make the ternary Group IV metal silicides with the general formula $M_3Si_2$, with M=Ti, Zr or Hf, of interest to the CSP program.

Ternary silicon carbide ($Ti_3SiC_2$) has an excellent combination of properties in electrical and thermal conductivity, high melting point, oxidation resistance, and is reportedly resistant to thermal shock. It also possesses high strength and toughness, low density, damage tolerance arts stress-strain characteristics. Polycrystalline $Ti_3SiC_2$ oxidizes in air in the temperature range from 900 to 1400 deg. C. The scale that is formed is dense, adherent, and layered. The outer layer is pure $TiO_2$ and the inner layer is a mixture of $TiO_2$ and $SiO_2$. The combination of properties of $Ti_3SiC_2$ make the ternary Group IV metal silicon carbides with the general formula $M_3SiC_2$, with M=Ti, Zr or Hf, of interest to the CSP program.

Titanium aluminum nitride ($Ti_{1-x}Al_xN$) (with $x \leq 1$) has high hardness, improved wear, corrosion, and oxidation resistance. $Ti_{1-x}Al_xN$ is oxidation resistant at high temperatures in air (750°-900° C.). Single-layer $Ti_{1-x}Al_xN$ films deposited by reactive magnetron sputtering on copper and aluminum achieved $\alpha$ (100° C.)=0.80, but no emittance values were reported. Higher absorptance can be reached by designing a multilayer absorber based on $Ti_{1-x}Al_xN$ films in combination with an AR coating, or by using gradient layers. The microstructure is columnar, so a cermet made with pores with a diameter on the order of 30 nm is also possible, Varying the aluminum and nitrogen content changes the hardness, color, optical properties, composition, microstructure, and pore and grain size. These materials have a high degree of flexibility in the optical properties and, with further research, could be a practical high-temperature absorber for the CSP program.

Refractory- or Transition-metal diborides ($MB_2$, where M=Hf, Zr, Ti) could be used in solar selective reflective layers because they have melting temperatures greater than 3000° C. and enhanced oxidation resistance. $HfB_2$ and $ZrB_2$ have the lowest densities (i.e., about 12 and 6 g/cm$^3$, respectively) and highest melting points (i.e., about 3040° C. mid 3250° C., respectively). $ZrB_2$ also reportedly has excellent resistance to thermal shock and oxidation compared to other non-oxide ceramics. Composites with SiC have high thermal conductivity, good shock resistance, modest thermal-expansion coefficients, good dimensional stability, and improved toughness. Incorporation of silicon can aid Hf reactivity by forming a liquid phase at 1410° C. or below that can scavenge excess carbon to form the desired SiC. The major phase detected after oxidation at 1627° C. in air on $ZrB_2$ is $ZrO_2$ and on $HfB_2$; the addition of 20 vol. percent of $TaSi_2$ to $ZrB_2$ reportedly improves the oxidation resistance of this material. Refractory metal diborides $VB_2$, $NbB_2$, $TaB_2$, $TiB_2$, $ZrB_2$, and $LaB_6$, coatings have been deposited by DC magnetron sputtering by Martin, Vac. Tech. Coat., 6 (April 2004). The coatings have potential applications as abrasion and chemical protection and as solar thermal control at very high temperatures; The melting temperatures for bulk $NbB_2$, $TaB_2$, $TiB_2$, and $LaB_6$ are 3040° C., 3040°, 3230°, and 2720° C., respectively. The reflectance of the coatings at 10.6 µm was 0.90 or greater, except for $TaB_2$, which had the lowest reflectance at 0.86. Bulk $ZrB_2$ films prepared by CVD are reportedly solar-selective, with $\alpha/\epsilon$ (100° C.)=0.67-0.77/0.080.09, $ZrB_2$ oxidizes slowly at 400° C. in air, requiring a protective coating at higher temperatures. $Si_3N_4$ AR coatings increase the solar absorptance to 0.88-0.93, while only increasing the emittance at 100° C. from COS to 0.10. High-temperature aging studies at 400° C. and 500° C. in air show that $Si_3N_4Zr\ B_2$ coatings are stable up to 1000 hours. Aging studies in air at 600° C. show slight increases in the emittance after 300 hours because of oxidation of the $Si_3N_4$. $ZrB_2$ is a stable, high-temperature selective-solar absorber that, with an improved AR protective coating, could be of use for CSP applications. In terms of highest to lowest reflectance for the refractory metal diboride compounds:

$NbB_2 > VB_2 > TiB_2 > LaB_6 > ZrB_2 \approx TaB_2$, and in terms of highest to lowest oxidation resistance (temperature): $CeB_6 > HfB_2 > ZrB_2 > TiB_2 > Ni_4B_3 > NiB > NbB_2 > TaB_2 > Co_2B > MgB_4 > CoB > MnB_2 > CrB_2 > MgB_2 > MnB > CrB > Fe_2B > PeB > AlB_2$.

Cermet Structure Embodiments

Multiple cermets based on refractory metal-silicon and oxide compounds and other embodiments are of interest because multiple cermets have higher photo-thermal conversion efficiency and are easier to deposit than graded-cermet layer selective surfaces. The typical double-cermet layer film structure from surface to substrate consists of the following: an AR layer that enhances solar absorption; an absorbing layer composed of two homogenous cermet-layers, a low-metal-volume fraction (LMVF) cermet layer on a high-metal-volume fraction (HMVF) cermet layer; and a metallic infra-red reflector layer to reduce substrate emittance. Double W—AlN cermet solar coatings with $\alpha/\epsilon_C$ (350° C.)=0.92-0.94/0.08-0.10 were deposited by two-target reactive DC sputtering and are stable at 500° C. in vacuum for 1 hour. Similar to the double-cermet structure, 4-layer cermets, where the cermet compositional-gradient metal volume fractions (VF) vary, have been modeled and prepared with good spectral selectivity. Optimization studies were done on anti-reflected 4-layer V—$Al_2O_3$, W—$Al_2O_3$, Co—$SiO_2$, Cr—$SiO_2$, and Ni—$SiO_2$ cermets, where the cermet compositional-gradient metal VF varies from 0.5 to 0.8. Independent of material, a 0.7 VF gives the best result, resulting in $\alpha/\epsilon$ (100° C.)=0.97/0.13-0.05.

To convert the multilayer structure, described in Table II, into a multiple cermet will require depositing the TiSi reflective layer into a $TiO_2$ or $SiO_2$ matrix. This will be difficult and will require modifications to the deposition process and/or ceramic matrix because it will be difficult to deposit the $TiO_2$ and $SiO_2$ without oxidizing the TiSi. This might require separating the oxide and TiSi depositions by baffling. Sputtering the TiSi from a sputtering target with the optimum TiSi composition and/or depositing the $TiO_2$ and $SiO_2$ by reactive sputtering or evaporation from substoichiometric oxides might also help. Other options include depositing the cermet with different dielectrics as the ceramic matrix instead of the $TiO_2$ and $SiO_2$ with the TiSi reflective if needed.

Hydrogen Barrier Embodiments:

in solar collectors, hydrogen permeation and build-up from the heat transfer fluid through the stainless steel tube and solar selective coating into the evacuated receiver annulus can result in substantial increases in receiver glass temperatures, degradation of the receiver performance, and thermal losses from the receiver. The receiver lifetime can be increased by changing the composition of the steel tube and using additional hydrogen barrier coatings to reduce hydrogen permeation rates into the vacuum space and immobilizing the hydrogen. In many designs it is desirable to reduce the permeation rate by a factor of over 1000 in comparison to the bare metal. Barriers based upon $Al_2O_3$, SiC, $ZrO_2$, $TiO_2$, $Y_2O_3$, and $Cr_2O_3$—$SiO_2$ have been demonstrated to provide permeation reduction factors from 1000 to 1,000,000 in laboratory situations by various workers. The rate controlling mechanism may actually be associated with the character and population defects rather than the intrinsic character of the surface coatings. Dense coatings appear to be relatively robust, both mechanically and in the presence of $H_2$. The ternary compound TiAlN coating structure evolves from TiN to AlN when the Al content increases from 0 to 70 percent.

The oxidation behavior of deposited TiAlN coatings with different Al concentrations oxidation resistance increases and then decreases with increasing Al content; the addition of 40 percent Al reportedly leads to the best oxidation resistance and hydrogen barrier permeation performance at temperatures between 300 and 800° C. Annealing Cr-alloyed steel parts under high vacuum conditions, to produce Cr enriched protective surface films without measurable Cr-depleted zones next to the film, reportedly increases the hydrogen permeation and corrosion resistance. Dense coatings of many of the materials of interest as AR and absorber coatings will also provide hydrogen permeation resistance to the steels. Dense hydrogen permeation coatings should be deposited as a hydrogen permeation coating prior to the deposition of solar selective coatings for solar collector applications.

Substrate Materials

The solar selective coating may be deposited on stainless steel receiver tubes for solar collectors. It may be deposited on stainless steel grades including 316, Ti (321), Kb (347), and alloys (Monel 400) for the use of high temperature molten salts as heat exchange fluids. The coating may also be deposited on stainless steel (304), glass, copper, or aluminum tubular or flat substrates.

Stainless steel, grade 304L is more readily available in most product forms, and so is generally used in preference to 321 if the requirement is simply for resistance to intergranular corrosion after welding. However, 304L has lower hot strength than 321 and so is not the best choice if the requirement is resistance to an operating environment over about 500° C., especially for molten salt application. Grade 321 equivalent to Grade 304 in the annealed condition and superior if a weldment in these grades has not been post-weld annealed or if the application involves service in the 425-900° C. range. It is subject to pitting and crevice corrosion in warm chloride environments, and to stress corrosion cracking above about 60° C. It is considered resistant to potable water with up to about 200 mg/L chlorides at ambient temperatures, reducing to about 150 mg/L at 60° C. It has good oxidation resistance in intermittent service to 900° C. and in continuous service to 925° C. These grades perform well in the 425-900° C. range, and particularly where subsequent aqueous corrosive conditions are present. 321H has higher hot strength, and is particularly suitable for high temperature structural applications. These grades would work better with flat plate collectors and hot water applications, but not with molten salt storage.

Grade 316 is the standard molybdenum-bearing grade, second in importance to 304 amongst the Austenite-stainless steels. Austenite is the name given to the gamma phase of steel alloys. Generally Austenitie Steel can be defined as steel with a Face Centered Cubic Structure. Its face-centred cubic (FCC) structure has more open space than the body-centered cubic structure, allowing it to hold a higher proportion of carbon in solution. The molybdenum gives 316 better overall corrosion resistance properties than Grade 304, particularly higher resistance to pitting and crevice corrosion in chloride environments. It has excellent forming and welding characteristics. It is readily brake or roll formed into a variety of parts for applications in the industrial, architectural, and transportation fields. Grade 316L, the low carbon version of 316, is immune from sensitization (grain boundary carbide precipitation). Grade 316H, with its higher carbon content, has applications at elevated temperatures, as does stabilized grade 316Ti. The Austenite structure gives these grades excellent toughness, down to cryogenic temperatures. Grade 316 has good oxidation resistance in intermittent service to 870° C. and in continuous service to 925° C. Continuous use of 316 in the 425-860° C. range is not recommended if subsequent aqueous corrosion resistance is important. Grade 316L is more resistant to carbide precipitation and can be used in the above temperature range. Grade 316H has higher strength at elevated temperatures and is sometimes used for structural and pressure-containing applications at temperatures above about 500° C.; it could be used in trough receiver tube.

Grades 321 and 347 are the basic Austenite 18/8 steel (Grade 304) stabilized by titanium (321) or niobium (347) additions. These grades are used because they are not sensitive to intergranular corrosion after heating within the carbide precipitation range of 425-850° C. Grade 321 is the grade of choice for applications in the temperature range of up to about 900° C., combining high strength, resistance to scaling and phase stability with resistance to subsequent aqueous corrosion. Grade 321H is a modification of 321 with a higher carbon content, to provide improved high temperature strength. A limitation with 321 is that titanium does not transfer well across a high temperature arc, so is not recommended as a welding consumable. In this case grade 347 is preferred—the niobium performs the same carbide stabilization task but can be transferred across a welding arc. Grade 347 is therefore the standard consumable for welding 321; because of this 347 would be a better substrate for the receiver tubes. Grade 347 is only occasionally used as parent plate material. Like other Austenite grades, 321 and 347 have excellent forming and welding characteristics, are readily brake or roll formed and have outstanding welding characteristics. Post-weld annealing is not required. They also have excellent toughness, down to cryogenic temperatures.

Monel 400 is a nickel-copper alloy that is resistant to sea water and steam at high temperatures as well as to salt and caustic solutions. The alloy is characterized by good general corrosion resistance, good weldability and moderate to high strength. It has excellent, resistance to rapidly flowing brackish water or seawater. It is particularly resistant to hydrochloric and hydrofluoric acids when they are de-aerated. The alloy is slightly magnetic at room temperature. The alloy is widely used in the chemical, oil and marine industries and is corrosion resistant in an extensive range of marine and chemical, environments; from pure water to nonoxidizing mineral acids, salts and alkalis. This alloy is more resistant than nickel under reducing conditions and more resistant than copper under oxidizing conditions; however, it does show better resistance to reducing media than oxidizing. It has good mechanical properties from subzero temperatures up to about 480° C. It has good resistance to sulfuric and hydrofluoric acids. Aeration, however, will result in increased corrosion rates. It may be used to handle hydrochloric acid, but the presence of oxidizing salts will greatly accelerate corrosive attack. Resistance to neutral, alkaline and acid salts is shown, but poor resistance is found with oxidizing acid salts such as ferric chloride. It has excellent resistance to chloride ion stress corrosion cracking. This grade would work better with steam applications, but/not with molten salt storage.

Alternative Applications Embodiments

Figure 21:
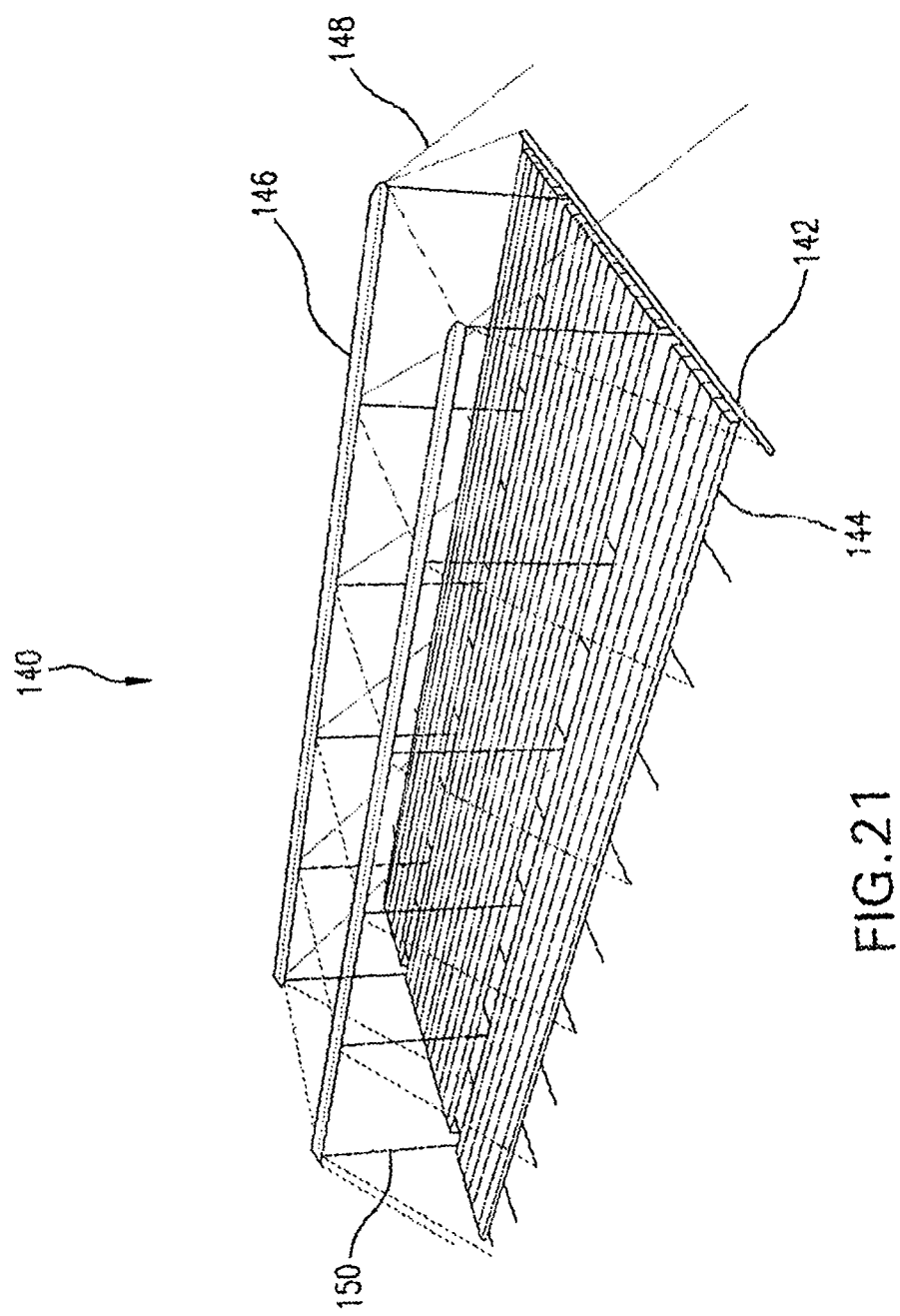
FIG. 21 is a perspective view of a compact linear Fresnel reflector absorber assembly.

Depending on the application and with proper optimization, the solar selective coatings may be used for other applications because of its expected high-temperature and oxidation resistance properties. Optimizing the design (i.e., cutoff, layer thickness, material stoichiometry, morphology, and substrate) could allow the coating to be used in other solar applications including solar heating systems, volumetric receivers, and Compact Linear Fresnel Reflector (CLFR) absorbers. An example of such an absorber is illustrated in FIG. 21. In this figure, a compact linear Fresnel reflector absorber 140 is mounted on the ground or other flat surface by rails 142 which, support reflectors 144. A pair of inverted cavity receivers 146 are supported above this level by posts 150 and guy wires 148.

CLFR concepts for large scale solar thermal electricity generation plants assume many parallel linear receivers elevated on tower structures that are close enough together for individual mirror rows to direct reflected solar radiation to two alternative linear receivers on separate towers. This provides for more densely packed arrays, where alternating the mirror inclination can eliminate shading and blocking while maximizing ground coverage. Preferred designs use secondary optics to reduce tower height requirements. Avoiding large mirror row spacings and receiver heights lowers the cost of ground preparation, array substructure cost, tower structure cost, stream line thermal losses, and steam line cost. The benefits of the Fresnel approach include small reflector size, low structural cost, fixed receiver position without moving joints, and noncylindrical receiver geometry. The illustrated array uses low emittance all-glass evacuated Dewar tubes as the receiver elements.

CLFR systems use an inverted cavity receiver containing a water/stream mixture which becomes drier as the mixture is pumped through the array. The stream is separated and flows through a heat exchanger, where the thermal energy passes to the power plant system. In the initial plant, the reheat cycle only requires steam, at 265° C. The heat-transfer fluid is water, and passive direct boiling heat transfer can be used to avoid parasitic pumping losses and the use of expensive flow controllers.

An inverted cavity receiver has been designed using steel boiling tubes which can be directly linked with an existing fossil fuel plant steam system. This is much cheaper than evacuated tubes used in trough plants. Direct steam generation is much easier with this absorber than with tubular absorbers in trough collectors. Initially a Chrome Black selective coating will be used but new air stable selective coating is being developed for higher temperature operation required by stand-alone plants (320-360° C.). The optical efficiency of the receiver is very high, and uses no auxiliary reflectors.

The individual materials in the coating can be used for a variety of applications such as antistatic coatings, light-emitting, light-detecting, and light-triggered semiconductor devices, electrical electrodes for flat panel display and electrochromic devices, solar cells, heat mirrors, smart windows, resistivity contacts, bipolar interconnect plates in solid oxide fuel cell, oxidation resistant coatings for alloys and steels, and for thermal barrier coatings for turbine blades, combustor liners, stator vanes, pistons, valve heads, exhaust ports, and diesel engine cylinders, heat exchangers, burner nozzles, hot gas fans and fillers, and pump and valve linings for corrosive environments, high temperature aerospace applications including space shuttle tiles, stealth aircraft skin structures, and jet engine blades and missile radomes.

The solar selective coatings can be optimized for lower temperature use in the solar water heating systems absorber. Solar beating systems generally include solar thermal collectors, a fluid system to move the heat from the collector to its point of usage, and a reservoir or tank for heat storage and subsequent use. There are several types of solar collectors. Most consist of a flat copper plate, painted black, which has water tubes attached to the absorber plate. As solar energy falls on the copper plate and is absorbed, the energy is transferred to water flowing in the tubes. The absorber plate is mounted in a casing that has a clear covering and insulation to protect the absorber plate from heat loss. Other collectors include an integrated collector and storage system and the evacuated tube collector. Integral collector and storage systems combine the function of hot water storage and solar energy collection into one unit. Evacuated tube collectors produce higher temperature water and are more complex than flat plate collectors. Evacuated tube collectors include a series of tubes that contain a heat pipe to absorb solar energy and transfer it to a liquid medium. The tubes are evacuated (vacuum) so that there is very little heat loss from the tube. Most solar collectors are roof-mounted. Solar water heaters are used for domestic hot water, pool heating and space heating needs. The heat can also be used for industrial applications or as an energy input for other uses such as cooling equipment.

The solar selective coatings can be optimized for higher temperature use in the solar power tower receiver. A power tower system uses a large field of mirrors to concentrate sunlight onto the top of a tower, where the receiver sits. It uses an array of flat, movable mirrors, (called heliostats) to focus the sun's rays upon a collector tower (the target). The high energy at this point of concentrated sunlight is transferred to a substance that can store the heat for later use. This heats molted salt flowing through the receiver. Then the salt's heat is used to generate electricity through a conventional steam generator. Molten salt retains heat efficiently, so it can be stored for days before being converted into electricity. That means electricity can be produced on cloudy days or even several hours after sunset. That energy can, in turn, be used to boil water for use in steam turbines. Water had originally been used as a heat transfer medium in earlier power tower versions (where the resultant steam was used to power a turbine). This system did not allow for storage and power generation during the evening. Examples of heliostat based power plants were the 10MWe Solar One and Solar Two demonstration projects in the Mojave Desert, which have now been decommissioned. The 11 MW PS-10, 20 MW PS-20, and 15 MW Solar Tres Power Tower in Spain builds on these projects.

A metallic-tube receiver was tested in 1985-1986, producing 2.45 kg·s$^{-1}$ hot air at 9.5 bar and 800° C. outlet temperature. A second panel with ceramic SiC tubes was tested in 1987, with a mass flowrate of 0.48 kg·s$^{-1}$ at 9.3 bar and 1000° C. The high estimated investment costs and the low incident solar fluxes permitted by the tubes (lower than 200Wk·m$^2$) made it unpractical to pursue the construction of the plant. Several Power lower project initiatives have shifted to air-cooled receivers whose outlet temperature is 800° C. Volumetric receivers use highly porous structures to absorb the concentrated solar radiation. The solar radiation is absorbed within the volume of the structure, not on the outer surface. The heat transfer medium, i.e., air, is forced through the porous structure and is heated by convective heat transfer. Volumetric absorbers show a high open porosity, allowing the radiation to penetrate deeply into the structure to ensure good convective heat transfer. Common volumetric absorbers are mace from thin heat resistant wires (knitting or layered grids) and metallic or ceramic open-cell matrix structures (reticulated foams or matrix structures). A good volumetric absorber shows the volumetric effect where the absorber temperature at the irradiated side is lower than the temperature of the medium leaving the absorber.

FIG. 22 illustrates schematically the operation of an air-cooled power tower receiver 152 with walls 151 and a central void 153 through which air may flow upward (as shown by arrow 155) as it is heated by absorption of solar energy impinging on the outer surfaces of walls 151. The graphs below the schematic show changes in temperature in the walls 151 and the gas inside at the inlet at the lower end of the uit and the exit at the upper end.

FIG. 23 illustrates schematically a volumetric power tower receiver 154 having a series of heat resistant wire screens and metallic or ceramic open cell matrix structures 156 joined together to form a porous structure through which gas 158 can flow from left to right. Solar energy is absorbed by the porous structure from the left and possibly other surfaces and heats the gas as it passes through the structure, as indicated by the temperature graphs below for the absorber structure and gas passing from inlet to exit.

Many of the materials in the solar selective coatings are based on transparent and semiconducting oxides widely used for a variety of applications such as antistatic coatings, light-emitting, light-detecting, and light-triggered semiconductor devices, electrical electrodes for flat panel display and electrochromic devices, solar cells, heat mirrors, and smart, windows. The TCO films are wide band-gap semiconductors whose properties depend strongly on the oxidation state (stoichiometry) and on the nature and quantity of impurities trapped in the film. The properties of TCO films are very sensitive to the deposition techniques, deposition parameters, properties of sputtering targets, and the postdeposition treatments used. Titanium disilicide ($TiSi_2$) is the most widely used silicide for making low resistivity contacts to silicon, in ultra large-scale integration (ULSL) devices. The requirements of low cost and high-temperature corrosion resistance for bipolar interconnect plates in solid oxide fuel cell (SOFC) stacks has directed attention to the use of metallic alloys with oxidation-resistant coatings. Candidate coatings must exhibit chemical and thermal-mechanical stability and high electrical conductivity during long-term (>40,000 hours) exposure to SOFC operating conditions. To increase service lives of aero engines, the technology of protective coatings is widely used in the aero engine turbines to improve the high temperature oxidation resistance of alloys.

Nanomaterials have potential applications in the fields of optics, electronics, catalysis and biomedicine because of unusual chemical and physical properties compared to their bulk, mainly due to their high surface to volume ratio. Oxide nanoparticles are of special interest for their application as coating materials for improvement of high temperature oxidation resistance of various alloys and steel under cyclic heating conditions.

High-temperature application of titanium alloys in aeroengines is often limited by their insufficient resistance to the aggressive environment. Coatings with excellent oxidation resistance are being developed to increase the maximum service temperature of conventional titanium alloys from the present 520-600° C., the temperature limit set by the mechanical capabilities of most advanced alloys. Components that operate under high temperatures and pressures, such as those used in turbines and airplane brakes, require materials with excellent chemical and physical properties. Nickel-based alloys (or superalloys) are the current industry standard for these applications. Thermal barrier coats (TBC) allow the final products to withstand temperatures beyond the melting point of nickel. However, there is a growing need for products with properties that nickel cannot achieve. Molybdenum-silicon-borate (Mo—Si—B) alloys could potentially supersede nickel due to their ability to withstand even greater temperature changes and pressures than existing metals and alloys. However, multilayered coatings that include a diffusion barrier layer, an oxidation resistant, layer and an oxidation barrier layer form a stable gradient of integrated layers that can prevent cracking, peeling and delamination of Mo—Si—B alloys under extreme operating; conditions. Many critical gas turbine engine components are currently made from Ni-base superalloys that are coated with a TBC.

Ceramic-based coatings have enormous commercial potential for applications, such as high-temperature coatings for turbine blades, conductive and erosion-resistant coatings for arc heaters, and protective and wear-resistant coatings for machines and tools. Moreover, they are also used in the electronic industry (high-temperature sensors), the sports industry (golf club heads, snow skis, shoe spikes, etc.), and medical equipment. Immediate commercialization applications for thermal barrier coatings include turbine blades, combustor liners, stator vanes, etc.; aeronautical and land-based turbine engines; and pistons, valve heads, exhaust ports, and cylinders in diesel engines. Other commercial applications include heat exchangers, burner nozzles, hot gas fans and filters, and pump and valve linings for corrosive environments, high temperature aerospace applications including space shuttle tiles, stealth aircraft skin, structures, plus thermal barrier coatings in jet engine components including blades and missile radomes.

EXAMPLES

FIGS. 24-28

Deposition and Testing of Modeled Solar Selective Coatings:

Deposited solar-selective coatings that reproduce the modeled coatings are likely to be successful and meet the optical and durability requirements for concentrated solar power applications. In thin-film deposition, a good general rule of thumb is that the lower the process pressure and the more energetic the process, the more control exists over the film properties, but the higher the cost of the equipment and the coating. To begin solar-selective prototyping, the ion-assisted e-beam chamber in NREL's Pernicka multichamber vacuum system was used, instead of the magnetron-sputtering chamber. Although magnetron sputtering is the process expected to be used for the final product, the targets for the magnetron-sputtering chamber with its three linear arrays of five 1.5 Mini-Mac or two 3'×12' planar magnetron guns are more expensive and less versatile for initial material prototyping. The e-beam gun can deposit six materials sequentially or co-deposit two different materials simultaneously in 7-cc crucibles. Dielectrics can be evaporated directly or reactively, and the ion gun can be used to improve the quality, composition and density of the coating. By controlling the deposition parameters, the oxides can be deposited with microstructures ranging from porous to columnar to amorphous, and with co-deposition, a cermet can be made where the dielectric is filled with metal. The dielectric chemistry can be controlled by activated reactive evaporation (ARE) with the introduction of gases (e.g., $O_2$, $N_2$, $CO_2$) into the process, Which results in materials with widely different material properties. Introducing reactive gases with the evaporation materials selected for this activity provided a great deal of flexibility in the materials that could be prototyped for the high-temperature solar-selective coatings. Initially, the substrate was glass because glass is readily available and lower in cost than a polished stainless-steel substrate. In addition, glass is transparent, allowing the extraction of the refractive indices, of the coatings from the reflectance and transmittance data with the Essential Macleod™ software. Eventually, the entire solar-selective coatings will be deposited on polished stainless-steel, substrates appropriate to high temperatures.

AR coatings are typically one-quarter-wavelength stacks of dielectrics of alternating high and low refractive indices.

Layer thickness control is therefore critical to the optical properties, and deposition parameters are critical to the microstructure, which defines the mechanical and thermal properties. Accordingly, pneumatic shutters were installed and wired to the quartz crystal thin-film controller to allow careful control of the critical layer thicknesses, and the thin-film controller was calibrated. The individual layers for the NREL#6A architecture (see Table VI) were deposited and their properties were characterized: step profilometry for thickness; ellipsometry for thickness and index of refraction; ultraviotet-visible-near-infrared (UV-VIS-NIR), infrared (IR), and Fourier transform infrared (FTIR) spectrophotometry for optical properties; scanning electron microscopy (SEM) and atomic force microscopy (AFM) for morphology and surface roughness, and X-ray photoelectron spectroscopy (XPS) analysis for stoichiometry.

Figure 24:
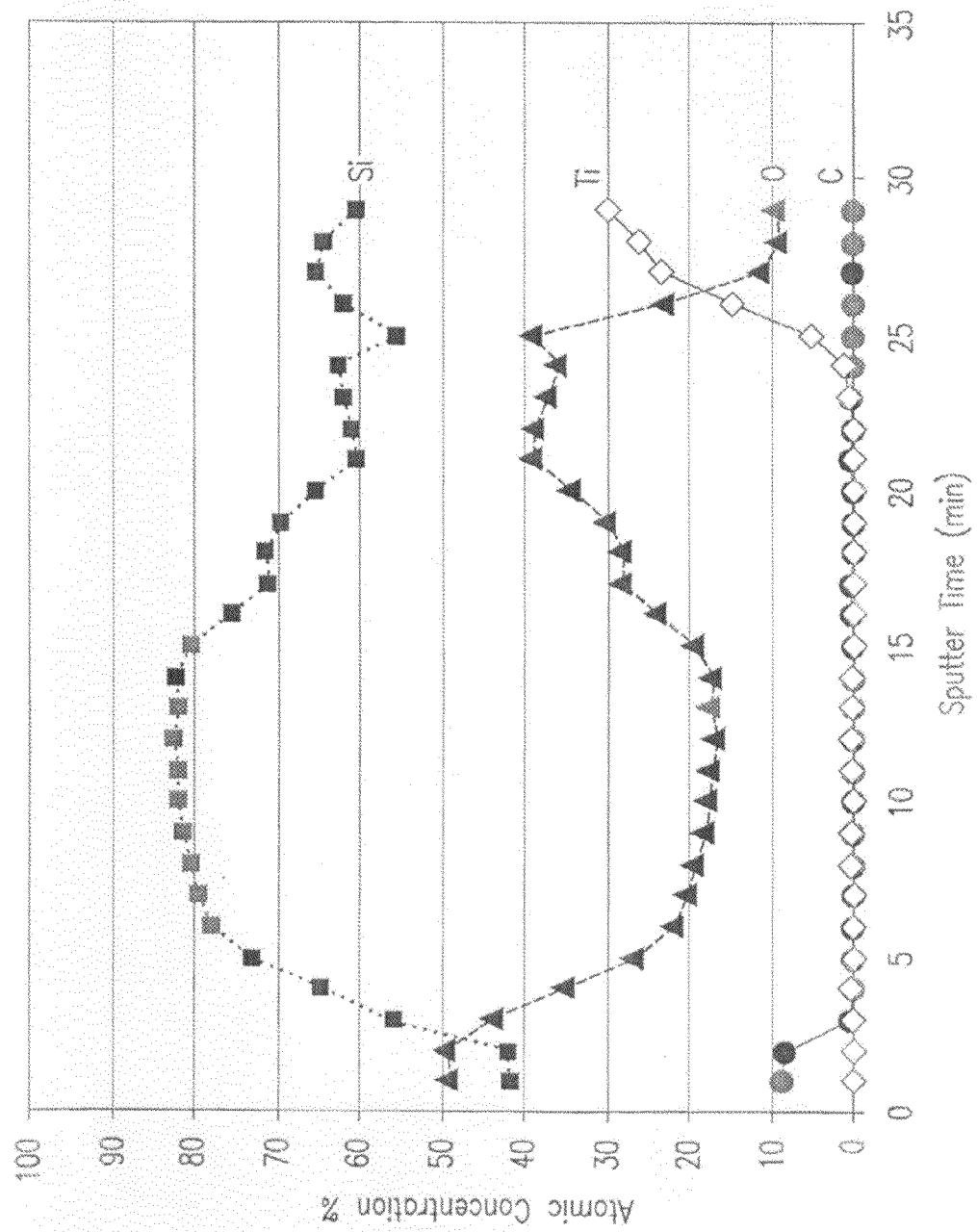
FIG. 24 is a graph of atomic concentration (percent) of Ti, Si and oxygen vs. sputtering time, based upon XPS spectra.

The easiest, simplest, lowest-cost solution of evaporating compounds was tried first for several reasons, even though it was anticipated that the elements in the compounds could evaporate sequentially in order of lowest melting point. First, many compounds could be deposited very easily in order to screen out materials that did not work as well as modeled with a small investment of time and materials. Second, several stoichiometrics for the TiSi, $TiO_2$, and $SiO_2$ could be deposited at low cost. Third, depositing compounds of a specific stoichiometry by co-deposition would require the installation of the co-deposition plate with two e-beam guns and the purchase of a second e-beam sweep control, additional quartz-crystal sensors, and shutters. Therefore, individual layers in the architecture were reactively evaporated from substoichiometric starting materials (i.e., $TiSi_2$, $Ti_5Si_3$, $Ti_3O_5$, $TiO_2$, SiO, $SiO_2$) with increasing amounts of reactive gas (i.e. $O_2$) and ion assist. It should be noted that the binary compounds in the deposited coatings are designated as TiSi (stoichiometric) or $Ti_XSi_Y$ (substoichiometric), and likewise the oxides are $TiO_x$ or $O_Y$ and $SiO_X$ or $Si_XO_Y$. To determine the appropriate level of ion assist for a dense adherent coating, different levels (high, low, and none) of ion assist were examined. SEM and AFM confirmed that the layers' morphology moved from columnar to a dense structure with increasing levels of ion assist. The optical properties, stoichiometry, and optimum reactive gas flow and partial pressure for the individual layers were determined. XPS verified that stoichiometric oxide layers were deposited when the coating color became visually transparent. More importantly, the XPS results showed that the method of directly evaporating; the TiSi binary-compound reflective layers from substoichiometric compounds of $TiSi_2$ or $Ti_3Si_5$ would not be successful because the compounds evaporated preferentially into layers of Ti/mixed $TiO_x$ oxides/Si/mixed $SiO_x$ oxides from bottom to top, as shown in FIG. 24. This result was not unexpected; but the easiest, lowest cost solution of evaporating compounds was tried first before depositing by the more equipment intensive and more expensive method of co-deposition.

Figure 25:
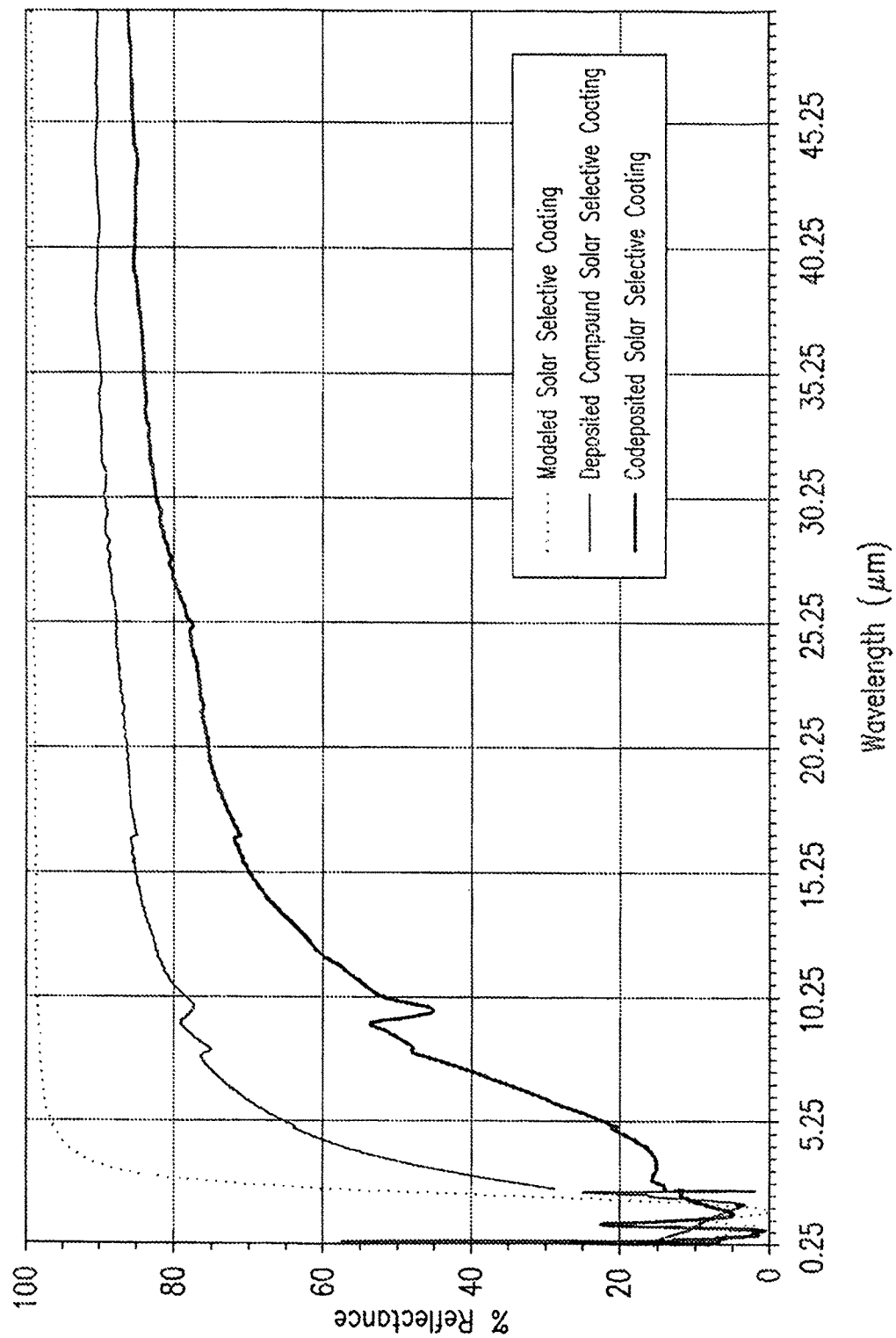
FIG. 25 is a graph of spectral percent reflectance vs. wavelength for deposited and modeled solar selective coatings.

While the individual layers were being characterized, the modeled NREL#6A architecture structure was deposited and characterized. As shown in FIG. 25, the optical performance of the compound NREL#6A was quite encouraging, despite having deposited the coating with known significant errors—including a layered structure that was deposited instead of a TiSi compound for the reflective layer and layer thicknesses that were systematically incorrect; they were overshot by up to 26.1 percent or undershot down to 1.7 percent, as shown in FIG. 26. From these results, it was determined that the compound reflective layer and the solar-selective coating should be deposited by co-deposition to produce a solar-selective coating closer to that modeled. This required extensive upgrades/modifications to the deposition system, including the following: installing the co-deposition plate with two e-beam guns; as a matter of safety, installing a lift for the e-beam deposition plate; installing a second crystal sensor; replacing the e-beam sweep and installing a second e-beam sweep; installing shutters for each e-beam gun and the substrate; modifying the associated wiring and plumbing; upgrading the cooling-water manifold; upgrading the residual-gas analyzer (RGA) and software; upgrading/repairing the gas flow controller; rebuilding a roughing pump; and starting automation of the deposition process.

After the major modifications were completed, the individual layers of the coating architecture were evaporated from elemental starting materials by reactive e-beam co-deposition. By manually varying the power and deposition rate of the Ti and Si materials and/or increasing the amounts of the reactive gas compounds with various compositions were produced. The individual layers and the modeled NREL#6A architecture were deposited and optically characterized; the stoichiometry was analyzed with XPS and the results correlated with the IR spectra. The NREL#6A coating was dark blue and the absorption was improved, but the emittance was much poorer compared to the compound deposited from substoichiometric materials. Reflectance measurements of the optical properties of the co-deposited individual primary reflective layer and the solar-selective coating were lower than the model and the compound deposition, as shown in FIG. 25.

Figure 28:
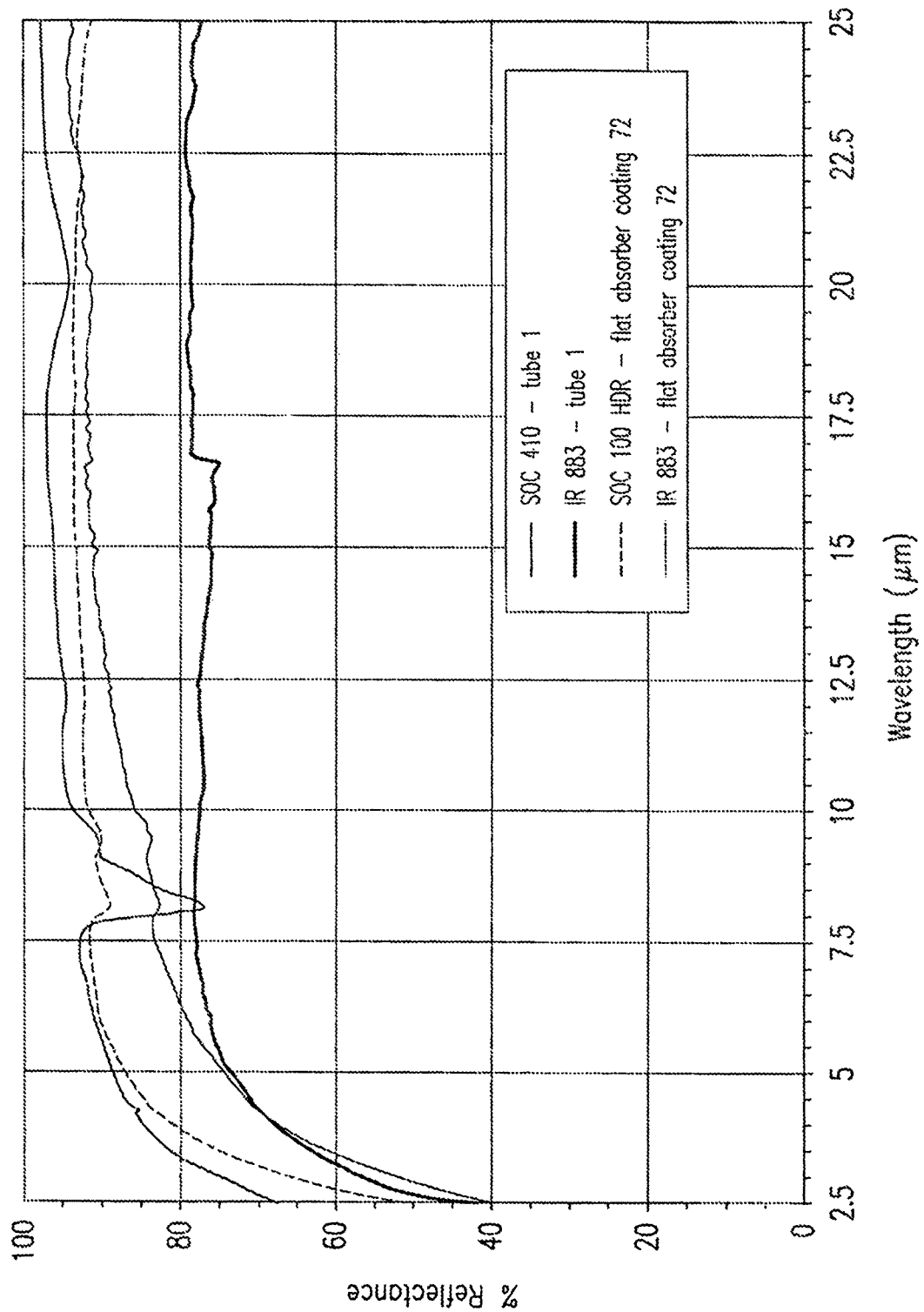
FIG. 28 is a graph of percent reflectance vs. wavelength for various commercial solar absorbers measured with Surface Optics (SOC) 410 or SOC 100 HDR vs. Perkin Elmer IR 883.

From error analysis, errors in layer thickness led to errors in absorption, but errors in the stoichiometry led to errors in both absorption and emittance. The layer thicknesses for the co-deposited solar-selective coating were incorrect; they were badly overshot by up to 52.7 percent and undershot down to −10.3 percent on average, shown in FIG. 26. The primary reflective layers of the solar-selective design are binary compounds, and the modeling software does not differentiate between TiSi-a and the different TiSi compound phases (i.e., $Ti_3Si$, $Ti_5Si_3$, $Ti_5Si_4$, and $TiSi_2$), as shown in FIG. 27. See Pretorius, "Prediction of silicide formation . . . ". The thicknesses of the individual layers and their chemical composition was determined during deposition using a quartz crystal microbalance in situ and the Inficon IC/5 deposition controller. In FIG. 28, the reflectance of the binary compound can be seen to vary significantly depending; on the ratios of the two constituent materials, titanium and silicon. Two significant results can be observed. First, the titanium rich compositions have a higher reflectivity in the IR—corresponding to a low emittance—and a sharper band edge. Second the deposited coating as measured with the XPS has a poor correlation with the predicted composition from the IC/5 during the deposition run. However, it can be seen from FIG. 28 that the IR reflectance spectra values measured on the Perkin Elmer 883 IR spectrophotometer are lower than the spectra of the same samples measured on the newer instruments at Surface Optics Corporation (SOC), the SOC 410 hand-held reflectometer (SOC 410) and the SOC 100 hemispherical directional reflectometer. Therefore, the performance of the co-deposited NREL#6A coating may not actually be as poor as was observed in FIG. 25. Recently, new National Institute of Standards and Technology (NIST) IR standards and a foucusing reflectance attachment were purchased by NREL and the spectrophotometer was recalibrated in order to more accurately measure the deposited samples with the PE 883 IR spectrophotometer. Until a more accurate instrument (e.g. SOC 410 hand-held reflectometer) can be purchased, measurements subcontracted to SOC, or the problem with the low reflectance measurements resolved; the PE 883 IR spectrophotometer can be used to evaluate relative improvements in the deposited coating but not used to determine the final optical properties of the coating.

The performance error between the modeled and deposited coatings can easily be explained by examining the errors in layer thickness and the errors in composition. The composition errors can be resolved by performing rigorous analyses to determine the appropriate compositions that give the highest reflectivity and using the effective heat of formation model by Pretorius to determine the thin-film phase-formation sequence.

In situ optical monitoring (commonly used in the optical coating industry) or ellipsometry (a very good experimental technique that is moving into the optical coating industry) allows the stoichiometry to be monitored while the coating is being deposited. The individual layers and the modeled coating were deposited by directly and reactively evaporating the compound layers from substoichiometric compounds and by elemental co-deposition. The deposited archetype proof-of-concept coating leaves little doubt regarding the coating capability to perform as modeled even though the deposited coatings measured optical performance was lower than the modeled performance because of thickness and compositional errors known to have occurred during the coating deposition. An optical coating is only as good as the optical monitoring and control during deposition. In most cases to achieve high yield for demanding requirements it is necessary to minimize tire optical thickness errors below 1%, particularly at sensitive turning points. As can be seen from FIG. 26, NREL's initial monitoring and control errors greatly exceeded 5% for the deposited thin film thickness, therefore the coatings measured performance was as expected interior to the modeled coating. To resolve the thickness errors, the deposition monitor and control will be upgraded with the addition of an optical monitor, providing positive feedback between the quartz crystal monitor and the optical monitor, and completing the automation of the coating process. Automation will remove human error from the coating deposition process and by providing steering and cutting at sensitive turning points, mid-course corrections can be made for any thickness errors in order to deposit a coating that matches the model. In addition, by varying the ion assist, the optimal coating density will be determined that gives both high absorption and low emittance with excellent oxidation resistance.

Combining these methods the thickness and compositional errors will be eliminated in the final coating. In addition, improvements can be gauged by measuring the deposited samples with the PE 883 IR spectrophotometer compared to the new NIST IR standards, but determination of the final optical properties will require resolving the issue of the lower reflectance values when measured with, the PE 883 IR, sub-contracting the measurements to Surface Optics (SOC Corp.), or purchasing an SOC 410. Depositing these optimized individual materials in the solar-selective coating without the thickness and composition errors and measuring them accurately should result in deposited solar-selective coatings closer to those modeled.

TABLE I

Material Properties of Some Dielectrics of Interest

| Compound | $TiO_2$ | $Ta_2O_5$ | $Z_rO_2$ | $HfO_2$ | $Sc_2O_3$ | $Y_2O_3$ | $Al_2O_3$ | $SiO_2$ | $MgF_2$ |
|---|---|---|---|---|---|---|---|---|---|
| Refractive Index η | 3.01 (2.4-2.2) | 2.1 (2.4-2.5) | 2.22 (2.3-1.94) | 1.94 (2.36-1.96) | 1.9 (1.95-1.85) | 1.94 (1.72->1.9) | 1.66 (1.68->1.58) | 1.46 | 1.38 (1.38-1.34) |
| λ Range (μm) | 0.4-1.2 | 0.4-8 | 0.3-8 | <0.3->10 | 0.25-5 | 0.3-12 | 0.3-5 | — | 1.2-8 |
| Melting Point Tmp (° C.) | 1640 | 1872 | 2715 | 2812 | 2300 | 2410 | 2020 | 1610 | 1261 |
| Abs Bands (μm) | 0.9 | Abs. free | 2.9, 6.9 | Abs. free | — | Abs. free | Abs. free | — | 2%, 3.6 |
| Molecular Weight (g) | 79.87 | 441.80 | 123.22 | 210.49 | 137.91 | 225.81 | 101.96 | 60.08 | 63.30 |
| Crystal Density ρ (g/cc) | TiO 4.9 $TiO_2$ 4.2 rutile, 3.8 Anatase $Ti_2O_3$ 4.6 $Ti_3O_5$ 4.6 | 8.2 | 5.6 | 9.68 | 3.86 | 5.01 | 3.97 | 2.6 | — |
| ΔGf (600K) | 834 | — | 1487 | — | — | — | — | 790 | — |
| Hardness | Excellent | — | Exceptional | Good | Excellent | Excellent | Deposition Dependent | — | Good-Dep Dependent |
| Adhesion | Excellent | — | Excellent | Excellent | — | Excellent | Good | — | Adh layer |
| Color | TiO Gold $TiO_2$ White $Ti_2O_3$ Purple $Ti_3O_5$ Black | White | White or Black | White | White | White | Clear to White | Clear | Clear |
| Method | Ebeam | Ebeam/ Sputter | Ebeam/ Sputter | Ebeam/ Sputter | Ebeam | Ebeam/ Sputter | Ebeam/ Sputter | Ebeam | Ebeam |
| Evap. Temp. (° C.) | TiO 1750 $TiO_2$ 1640 $Ti_2O_3$ 2130 $Ti_3O_5$ 1760 | ~2000 | ~2400 | ~2500 | — | ~2400 | ~2100 | — | ~950 |
| Dep. Rate Å/S | 0.2 | 2-5 | 1-2 | 2-4 | <5 | 1-2 | 2-5 | — | 20 |

TABLE I-continued

Material Properties of Some Dielectrics of Interest

| Compound | $TiO_2$ | $Ta_2O_5$ | $Z_rO_2$ | $HfO_2$ | $Sc_2O_3$ | $Y_2O_3$ | $Al_2O_3$ | $SiO_2$ | $MgF_2$ |
|---|---|---|---|---|---|---|---|---|---|
| Crucible | Cu | Ta/Graphite | Graphite | Cu | Graphite | Graphite | Cu | — | Graphite/Ta/Mo |
| $O_2$ Part. Press. (tow) | 2-20 ×10$^{-5}$ | 2-5 × 10$^{-5}$ | 8 × 10$^{-5}$ | 5-8 × 10$^{-5}$ | 5×10$^{-5}$ | 5-8 × 10$^{-5}$ | 1 × 10$^{-5}$ | 2 × 10$^{-6}$ | low10$^{-6}$ |
| Subs. Temp (° C.) | 250(min.) | 175-300 | ~50-300 | ~50-300 | 200-250 | ~50-300 | ~200-300 | — | 150-250 |

TABLE II

Design for 9-Layer Coating
Design: TiSi-T$_i$O$_2$-pt-AR4 (NREL #6B)
Reference Wavelength (nm): 510.00
Incident Angle (deg): 0.00

| Layer | Material | Packing Density | Refractive Index | Coefficient | Extinction Thickness | Optical (FWOT) | Physical Geometric Thickness (nm) | Void Thickness | Void Material Density |
|---|---|---|---|---|---|---|---|---|---|
| Medium | Air | — | 1.00000 | 0.00000 | — | — | — | — | — |
| 1 | S$_i$O$_2$ | 1.00000 | 1.46178 | 0.00000 | 0.19436185 | 67.81 | 0.13296212 | Air | 0.00000 |
| 2 | T$_i$O$_2$ | 1.00000 | 3.01375 | 0.00000 | 0.02589518 | 4.38 | 0.00859234 | Air | 0.00000 |
| 3 | S$_i$O$_2$ | 1.00000 | 1.46178 | 0.00000 | 0.08197285 | 28.60 | 0.05607728 | Air | 0.00000 |
| 4 | T$_i$O$_2$ | 1.00000 | 3.01375 | 0.00000 | 0.21240473 | 35.94 | 0.07047855 | Air | 0.00000 |
| 5 | Pt | 1.00000 | 2.00403 | 3.50668 | 0.01287470 | 3.28 | 0.00642442 | Air | 0.00000 |
| 6 | T$_i$O$_2$ | 1.00000 | 3.01375 | 0.00000 | 0.21091133 | 35.69 | 0.06998302 | Air | 0.00000 |
| 7 | TiSi-A | 1.00000 | 2.21098 | 2.61715 | 0.08982119 | 20.72 | 0.04062514 | Air | 0.00000 |
| 8 | S$_i$O$_2$ | 1.00000 | 1.46178 | 0.00000 | 0.22937677 | 80.03 | 0.15691568 | Air | 0.00000 |
| 9 | TiSi-A | 1.00000 | 2.21098 | 2.61715 | 8.95563219 | 2065.77 | 4.05053459 | Air | 0.00000 |
| Substrate | SS foil (EP + MP) | | | | 0.00000 | 0.00001 | | | |
| Total Thickness | | | | | 10.01325078 | 2342.22 | 4.59259315 | | |

TABLE III

Design for 9-Layer Coating
Design: TiSi-T$_i$O$_2$-AR4b (NREL #6A)
Reference Wavelength (nm): 510.00
Incident Angle (deg): 0.00

| Layer | Material | Packing Density | Refractive Index | Coefficient | Extinction Thickness | Optical (FWOT) | Physical Geometric Thickness (nm) | Void Thickness | Void Material Density |
|---|---|---|---|---|---|---|---|---|---|
| Medium | Air | | 1.00000 | 0.00000 | | | | | |
| 1 | S$_i$O$_2$ | 1.00000 | 1.46178 | 0.00000 | 0.20614160 | 71.92 | 0.14102060 | Air | 0.00000 |
| 2 | T$_i$O$_2$ | 1.00000 | 3.01375 | 0.00000 | 0.02603967 | 4.41 | 0.00864029 | Air | 0.00000 |
| 3 | S$_i$O$_2$ | 1.00000 | 1.46178 | 0.00000 | 0.09028071 | 31.50 | 0.06176065 | Air | 0.00000 |
| 4 | T$_i$O$_2$ | 1.00000 | 3.01375 | 0.00000 | 0.18143749 | 30.70 | 0.06020323 | Air | 0.00000 |
| 5 | TiSi-A | 1.00000 | 2.21098 | 2.61715 | 0.06402083 | 14.77 | 0.02895592 | Air | 0.00000 |
| 6 | S$_i$O$_2$ | 1.00000 | 1.46178 | 0.00000 | 0.30086100 | 104.97 | 0.20581773 | Air | 0.00000 |
| 7 | TiSi-A | 1.00000 | 2.21098 | 2.61715 | 0.06498043 | 14.99 | 0.02938994 | Air | 0.00000 |
| 8 | S$_i$O$_2$ | 1.00000 | 1.46178 | 0.00000 | 0.65398416 | 228.17 | 0.44738780 | Air | 0.00000 |
| 9 | TiSi-A | 1.00000 | 2.21098 | 2.61715 | 8.08015197 | 1863.83 | 3.65456445 | Air | 0.00000 |
| Substrate | SS foil (EP + MP) | | | | 0.00000 | 0.00001 | | | |
| Total Thickness | | | | | 9.66789786 | 2365.25 | 4.63774062 | | |

TABLE IV

Comparison of Theoretical Optical Properties of NREL's Modeled Prototype Absorber with Actual Optical Properties of Existing Materials

|  | Existing Materials | | | | NREL's Modeled Prototype Absorber | | | Further Refinement of NREL's Modeled Prototype | | | | Finer Model Refinement of Prototype | |
|---|---|---|---|---|---|---|---|---|---|---|---|---|---|
|  | Black Chrome | Luz Cerinet | UVAC A | UVAC B | NREL #1 | NREL #2 | NREL #3 | NREL #4A (21L) | NREL #4A (9L) | NREL #4B (21L) | NREL #4B (9L) | NREL #6A (9L) | NREL #6B (9L) |
| Solar Absorptance | 0.916 | 0.938 | 0.954 | 0.935 | 0.930 | 0.897 | 0.939 | 0.939 | 0.950 | 0.943 | 0.930 | 0.959 | 0.957 |
| Thermal Emittance@ | | | | | | | | | | | | | |
| 25° C. | 0.047 | 0.061 | 0.052 | 0.069 | 0.101 | 0.009 | 0.024 | 0.026 | 0.013 | 0.024 | 0.015 | 0.027 | 0.180 |
| 100° C. | 0.079 | 0.077 | 0.067 | 0.084 | 0.100 | 0.013 | 0.033 | 0.033 | 0.017 | 0.030 | 0.018 | 0.033 | 0.022 |
| 200° C. | 0.117 | 0.095 | 0.085 | 0.103 | 0.114 | 0.021 | 0.040 | 0.041 | 0.028 | 0.035 | 0.025 | 0.040 | 0.031 |
| 300° C. | 0.156 | 0.118 | 0.107 | 0.125 | 0.134 | 0.034 | 0.047 | 0.049 | 0.047 | 0.041 | 0.039 | 0.048 | 0.047 |
| 350° C. | — | — | — | — | — | — | — | 0.055 | 0.059 | 0.046 | 0.049 | 0.053 | 0.058 |
| 400° C. | 0.216 | 0.146 | 0.134 | 0.150 | 0.159 | 0.055 | 0.060 | 0.063 | 0.074 | 0.052 | 0.062 | 0.061 | 0.071 |
| 450° C. | 0.218 | 0.162 | 0.149 | 0.164 | 0.172 | 0.068 | 0.070 | 0.072 | 0.090 | 0.061 | 0.076 | 0.070 | 0.087 |
| 500° C. | 0.239 | 0.179 | 0.165 | 0.178 | 0.186 | 0.083 | 0.082 | 0.083 | 0.110 | 0.071 | 0.093 | 0.073 | 0.104 |

TABLE V

Comparisons of Theoretical Optical Properties of NREL's Modeled Optical Properties of Existing Commercial Selective Coatings

|  | EXISTING MATERIALS | | | | NREL'S MODELED PROTOTYPE NREL | | | | | |
|---|---|---|---|---|---|---|---|---|---|---|
|  | BLACK CHROME E | Original Mo—$Al_2O_3$ Cermet | IMPROVED $Al_2O_3$-BASED CERMET A | IMPROVED $Al_2O_3$-BASED CERMET B | #4A | #4B | #5A | #5B | #6A | #6B |
| # LAYERS | — | — | — | — | 21 | 21 | 9 | 9 | 9 | 9 |
| Layer #5 | — | — | — | — | TiSi | Pt | TiSi | Pt | TiSi | Pt |
| SOLAR α | 0.916 | 0.938 | 0.954 | 0.935 | 0.939 | 0.943 | 0.950 | 0.930 | 0.959 | 0.957 |
| Thermal ε @ | | | | | | | | | | |
| 25° C. | 0.047 | 0.061 | 0.052 | 0.069 | 0.026 | 0.024 | 0.013 | 0.015 | 0.027 | 0.018 |
| 100° C. | 0.079 | 0.077 | 0.067 | 0.084 | 0.033 | 0.030 | 0.017 | 0.018 | 0.033 | 0.022 |
| 200° C. | 0.117 | 0.095 | 0.085 | 0.103 | 0.041 | 0.035 | 0.028 | 0.025 | 0.040 | 0.031 |
| 300° C. | 0.156 | 0.118 | 0.107 | 0.125 | 0.049 | 0.041 | 0.047 | 0.039 | 0.048 | 0.047 |
| 350° C. | — | — | — | — | 0.055 | 0.046 | 0.059 | 0.049 | 0.053 | 0.058 |
| 400° C. | 0.216 | 0.146 | 0.134 | 0.150 | 0.630 | 0.052 | 0.074 | 0.062 | 0.061 | 0.071 |
| 450° C. | 0.218 | 0.162 | 0.149 | 0.164 | 0.072 | 0.081 | 0.090 | 0.076 | 0.070 | 0.087 |
| 500° C. | 0.239 | 0.179 | 0.165 | 0.178 | 0.083 | 0.071 | 0.110 | 0.093 | 0.082 | 0.104 |

TABLE VI

Designs for NREL #6A and NREL #6B Coating

| | NREL #6A | | | | NREL #6B | | | |
|---|---|---|---|---|---|---|---|---|
| Layer | Material | Refractive Index η | Extinction Coefficient κ | Physical Thickness (nm) | Material | Refractive Index η | Extinction Coefficient κ | Physical Thickness (nm) |
| Medium | Air | 1.00000 | 0.00000 | — | Air | 1.00000 | 0.00000 | — |
| 1 | $SiO_2$ | 1.46178 | 0.00000 | 58.61 | $SiO_2$ | 1.46178 | 0.00000 | 85.41 |
| 2 | $TiO_2$ | 3.01375 | 0.00000 | 3.91 | $TiO_2$ | 3.01375 | 0.00000 | 3.70 |
| 3 | $SiO_2$ | 1.46178 | 0.00000 | 34.75 | $SiO_2$ | 1.46178 | 0.00000 | 33.07 |
| 4 | $TiO_2$ | 3.01375 | 0.00000 | 31.92 | $TiO_2$ | 3.01375 | 0.00000 | 32.73 |
| 5 | TiSi-a | 2.21098 | 2.61715 | 2.75 | Pt | 2.00403 | 3.50668 | 8.25 |
| 6 | $TiO_2$ | 3.01375 | 0.00000 | 32.68 | $TiO_2$ | 3.01375 | 0.00000 | 32.75 |
| 7 | TiSi-a | 2.21098 | 2.61715 | 19.36 | TiSi-a | 2.21098 | 2.61715 | 24.33 |
| 8 | $SiO_2$ | 1.46178 | 0.00000 | 73.01 | $SiO_2$ | 1.46178 | 0.00000 | 211.20 |
| 9 | TiSi-a | 2.21098 | 2.61715 | 383.41 | TiSi-a | 2.21098 | 2.61715 | 524.43 |
| Substrate | Stainless Steel | 0.00000 | −0.00319 | — | Stainless Steel | 0.00000 | −0.00319 | — |

The invention claimed is:

1. A method for manufacturing a solar selective absorption material, comprising:
providing a substrate;
applying thereto at least one layer of at least one IR reflective material;
applying to said at least one layer of the at least one IR reflective material at least one layer of at least one solar absorbent material including depositing materials to form said at least one solar absorbent material as a cermet; and
applying at least one surface layer of at least one solar antireflective material, to produce a coated substrate having an overall high solar absorbance and a low IR emittance at elevated temperatures,
wherein the at least one solar absorbent cermet comprising the deposited materials comprises particles of at least one first metal in the form of a metal silicide, an elemental metal, and mixtures thereof dispersed in the solar absorbent material, wherein the at least one solar absorbent material comprises at least one second metal in the form of a metal oxide, a metal nitride, a metal oxynitride, a metal silicide, a metal boride, a metal carbide, a metal ternary compound, and mixtures thereof,
wherein the at least one first metal of the particles comprises at least one of a Group IVA metal, a Group VA metal, a Group VI metal, a noble metal, and mixtures thereof, and
wherein the at least one second metal of the solar absorbent material comprises at least one of a Group IVA metal, a Group VA metal, a Group VI metal, a metalloid, a noble metal, and mixtures thereof
wherein the high solar absorbance is greater than about 0.96.

2. The method of claim 1 wherein said at least one IR reflective material comprises at least one metal in the form of a metal silicide, a metal nitride, a metal oxynitride, a metal boride, metal carbide, a metal ternary compound, and mixtures thereof, wherein the at least one metal comprises at least one of a Group IVA metal, a Group VA metal, a Group VI metal, a metalloid, a noble metal, and mixtures thereof.

3. The method of claim 1 wherein the second metal, is in the form of at least one metal oxide.

4. The method of claim 1 wherein said at least one surface layer of at least one solar antireflective material is characterized by comprising at least two adjacent thin layers of at least one third metal in the form of a metal oxide, a metal nitride, a metal oxynitride, a metal fluoride, and mixtures thereof, wherein the at least one third metal comprises a Group IVA metal, a Group VA metal, a Group VI metal, a metalloid, and mixtures thereof, wherein said at least two adjacent layers have substantially differing indices of refraction such that the at least one layer of the at least one antireflective material forms a surface layer.

5. The method of claim 2 wherein said at least one metal of the at least one IR reflective material is selected from the group consisting of titanium, zirconium, hafnium, vanadium, niobium, tantalum, chromium, molybdenum, tungsten, and mixtures thereof.

6. The method of claim 1 wherein at least one layer of said at least one IR reflective material comprises at least one of platinum, palladium, rhodium, ruthenium, indium, gold, osmium, and mixtures thereof, dispersed in a matrix comprising at least one of a silicide, a boride, a carbide, and a ternary compound.

7. The method of claim 1, further characterized by a step of texturizing a final layer of material, comprising at least one antireflective material, to increase solar absorption and minimize surface reflection and wherein a final layer of the at least one antireflective layer is texturized by a process of depositing said at least one antireflective material at an acute angle to the surface of said final layer.

8. A solar selective coated substrate prepared in accordance with the method of claim 1.

9. A solar selective coating for high temperature applications, comprising at least three layers in physical contact with one another, wherein at least one layer of the at least three layers comprises a cermet,
wherein the at least one cermet comprises particles dispersed within a matrix,
wherein the particles comprise at least one of a first metal in the form of a metal silicide, an elemental metal, and mixtures thereof,
wherein the first metal comprises at least one of a Group IVA metal, a Group VA metal, a Group VI metal, a noble metal, and mixtures thereof,
wherein the matrix comprises at least one of a second metal in the form of a metal oxide, a metal silicide, a metal nitride, a metal oxynitride, a metal boride, a metal carbide, a metal ternary compound, and mixtures thereof,
wherein the second metal comprises at least one of a Group IVA metal, a Group VA metal, a Group VI metal, a metalloid, a noble metal, and mixtures thereof, and
wherein the solar selective coating is stable at temperatures up to about 450° C. and is characterized by a solar absorptance greater than about 0.96.

10. The coating of claim 9, wherein a layer of the at least three layers is a surface layer comprising a third metal in the form of a metal oxide, wherein the third metal comprises at least one of a Group IVA metal, a Group VA metal, a Group VI metal, a metalloid, and mixtures thereof.

11. The coating of claim 10, wherein the surface layer is textured.

12. The coating of claim 10, wherein the surface layer comprises at least one of silica and titania.

13. The coating of claim 9, wherein at least one layer comprises a fourth metal in the form of a metal oxide, a metal nitride, a metal oxynitride, and mixtures thereof, wherein the fourth metal comprises at least one of a Group IVA metal, a Group VA metal, a Group VI metal, and mixtures thereof.

14. The coating of claim 9, wherein at least one layer comprises at least one of AlCO, AlCuRu, AlMnPd, and mixtures thereof.

15. The coating of claim 9, wherein at least one layer comprises a fifth metal in the form of a metal silicide, a metal boride, a metal, carbide, a metal ternary compound, and mixtures thereof, wherein the fifth metal comprises at least one of a Group IVA metal, a Group VA metal, a Group VI metal, a noble metal, and mixtures thereof.

16. The coating of claim 9, wherein the second metal of the matrix comprises at least one of Ti, Zr, Hf, V, Nb, Ta, Cr, Mo, W, and mixtures thereof.

17. New The coating of claim 9, wherein the metal ternary compound is at least one of the second metal is in the form of a silicide carbide, an aluminum silicide, an aluminum nitride, an oxide nitride, and mixtures thereof.

18. The coating of claim 9, wherein the particles comprise at least one titanium silicide in the form of $Ti_xSi_y$, wherein x equals 1, 3, or 5, and y equals from 1 to 4 inclusive.

19. The coating of claim 9, further comprising a stainless steel substrate.

20. The coating of claim 9, comprising a first cermet layer and a second cermet layer, wherein the first cermet layer and second cermet layer are in physical contact, wherein the first cermet layer has a substantially lower metal volume fraction of a particle phase than a volume fraction of a particle phase in the second cermet layer.

\* \* \* \* \*